Nov. 23, 1937.   H. WATERS ET AL   2,100,176
ELEVATOR CONTROL SYSTEM
Filed Jan. 31, 1936   10 Sheets-Sheet 3

Harold Waters
Arthur Willard Paulson
Matthew Trostin, Jr.   INVENTORS
BY Matthew T. Bradley   ATTORNEY Nov. 23, 1937.　　　　H. WATERS ET AL　　　　2,100,176
ELEVATOR CONTROL SYSTEM
Filed Jan. 31, 1936　　　10 Sheets-Sheet 4

Harold Waters
Arthur Willard Paulson
Mathew Trosten, Jr. } INVENTORS
BY Walter E. Bradley ATTORNEY Nov. 23, 1937.  H. WATERS ET AL  2,100,176
ELEVATOR CONTROL SYSTEM
Filed Jan. 31, 1936  10 Sheets-Sheet 5

Harold Waters
Arthur Willard Paulson
Matthew Trotter, Jr.  } INVENTORS
BY Matthew S. Bradley  ATTORNEY Patented Nov. 23, 1937

2,100,176

UNITED STATES PATENT OFFICE

2,100,176

ELEVATOR CONTROL SYSTEM

Harold Waters, Hohokus, and Arthur Willard Paulson, Tenafly, N. J., and Mathew Troster, Jr., New York, N. Y., assignors to Otis Elevator Company, New York, N. Y., a corporation of New Jersey Application January 31, 1936, Serial No. 61,762

79 Claims. (Cl. 187—29)

The invention relates to elevator systems.

The invention is directed to elevator systems of the "collective" type in which push buttons are provided at the landings for operation by intending passengers to call the car to the landings and in which push buttons are provided in the car for the landings for operation by the passengers to send the car to their destinations and in which the car stops at the floors for which calls are registered in the order of succession of floors, regardless of the order in which the calls are registered. The invention especially relates to systems of the above character as applied to two or more elevators in which the push buttons at the landings are common to the elevators, although certain features of the invention are also applicable to single elevators and to elevators with other forms of control.

It is a principle of the invention as applied to two elevators that one car serves as a wild car and the other car as a home station car.

In an embodiment of the invention applied to two elevators, which has been illustrated, either car may be the wild car. When no calls are to be responded to, the wild car stands idle at the floor at which it was stopped in answering the last call, while the other car stands idle at a home station, preferably the lobby floor. Upon the registration of a hall call, the wild car is started in operation from the floor at which it is standing toward the floor for which the call is registered. If no other calls are registered, the car, after answering the call and taking the passenger to his destination, remains at the floor at which the passenger is discharged. Should one or more other hall calls be registered ahead of the wild car, it acts to answer these calls collectively. In answering such calls, the wild car restarts in the same direction after each stop, so long as a call exists for any floor beyond, before reversing to answer calls for floors in the opposite direction.

The wild car continues to answer all hall calls so long as these calls are ahead of the car. However, should a hall call be registered which is behind the wild car, the home station car is started in operation to answer this call.

Each car responds to its own car calls, so that the home station car may also be caused to leave the home station by a passenger entering the car and registering a car call for his destination.

When both cars are in operation, each answers its own car calls and assists the other in the answering of hall calls. Each car, after making a stop in response to a call, leaves the floor at which the stop was made in the same direction as it approached the floor, so long as calls for floors beyond remain to be responded to.

When all calls are answered, one of the cars is automatically returned to the home station and the other remains at the floor at which its last stop is made. Neither car is automatically returned to the home station so long as it has a car call to answer. As regards hall calls, however, the first car to make a stop, under conditions where there is no call ahead of the car or behind the other car, is automatically started on its return to the home station.

The automatic return of a car to the home station may be interrupted to permit it to respond to a hall call behind the other car or to respond to a hall call for a floor ahead of the car for the direction in which the car is travelling.

On occasions, both cars may be at the home station. Upon the registration of a hall call under such conditions, one of the cars starts in operation to answer this call. This car is preferably preselected to be the wild car.

In an embodiment of the invention applied to more than two elevators, which has been illustrated, a car is started from the home station when a hall call is registered which is behind all cars in operation. The car next to be started from the home station is preferably preselected. All but one of the cars are automatically returned to the home station when no more calls remain to be responded to. Any car upon making a stop under conditions where there is no hall call to be responded to ahead of the car and no car call for that car is to be responded to, is automatically started on its return to the home station, provided there is another car in operation. When the only remaining call is a hall call, the car which picks up the call is maintained in operation and all other cars in operation are automatically returned to the home station. A car on its automatic return to the home station may stop to pick up a hall call for the direction in which it is traveling but the automatic return of a car to the home station is not interrupted by the registration of any other hall call, even though such call be behind the other cars in operation.

One feature of the invention is to have the wild car start in operation to answer the first hall call which is registered under conditions where all cars are idle.

Another feature is to cause a home station car to be started in operation to assist the wild car when certain predetermined combinations of calls have been registered.

Still another feature involves the automatic return of all but one of the cars to the home station when all calls have been responded to.

A specific feature of the invention resides in automatically picking out which car is to be a wild car.

Another specific feature resides in having the wild car answer all hall calls, so long as these calls are ahead of the car.

Another specific feature is to cause the wild car, after making a stop, to remain at the floor at which the stop is made if no more calls are in registration.

Another specific feature resides in starting another car from the home station when a hall call is registered which is behind the wild car or, if more than one car is in operation, which is behind all such cars.

A further specific feature resides in automatically selecting the cars which are to be returned to the home station.

Another specific feature resides in interrupting the return of a car to the home station under certain operating conditions.

There are many other features and advantages of the invention. These will appear from the following description and appended claims.

Figure 9:
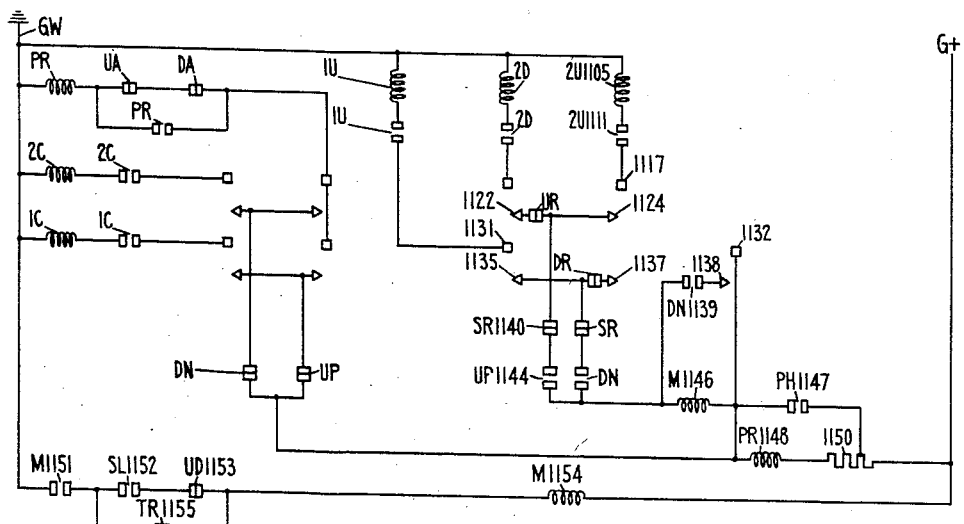
Figure 5:
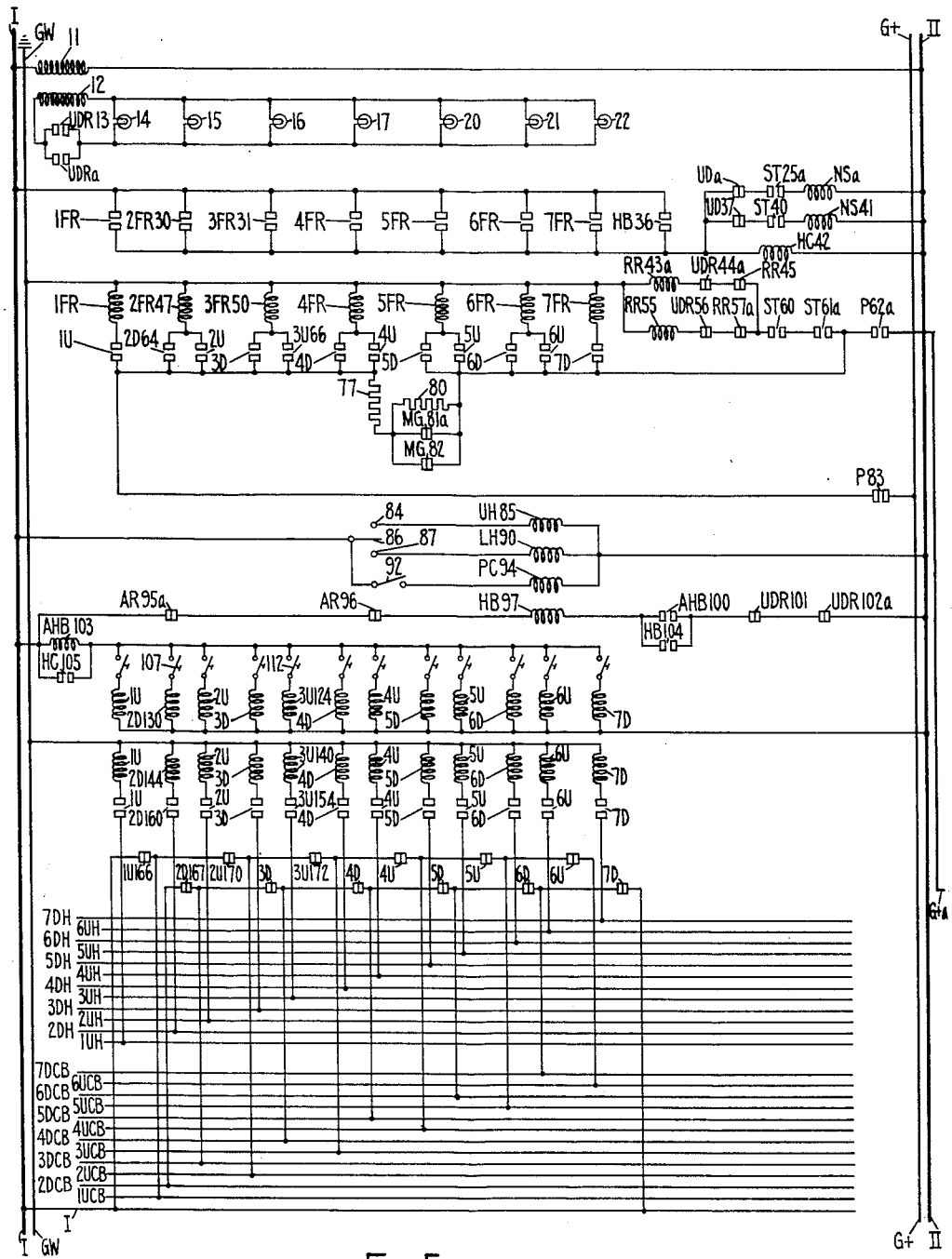
Figure 6:
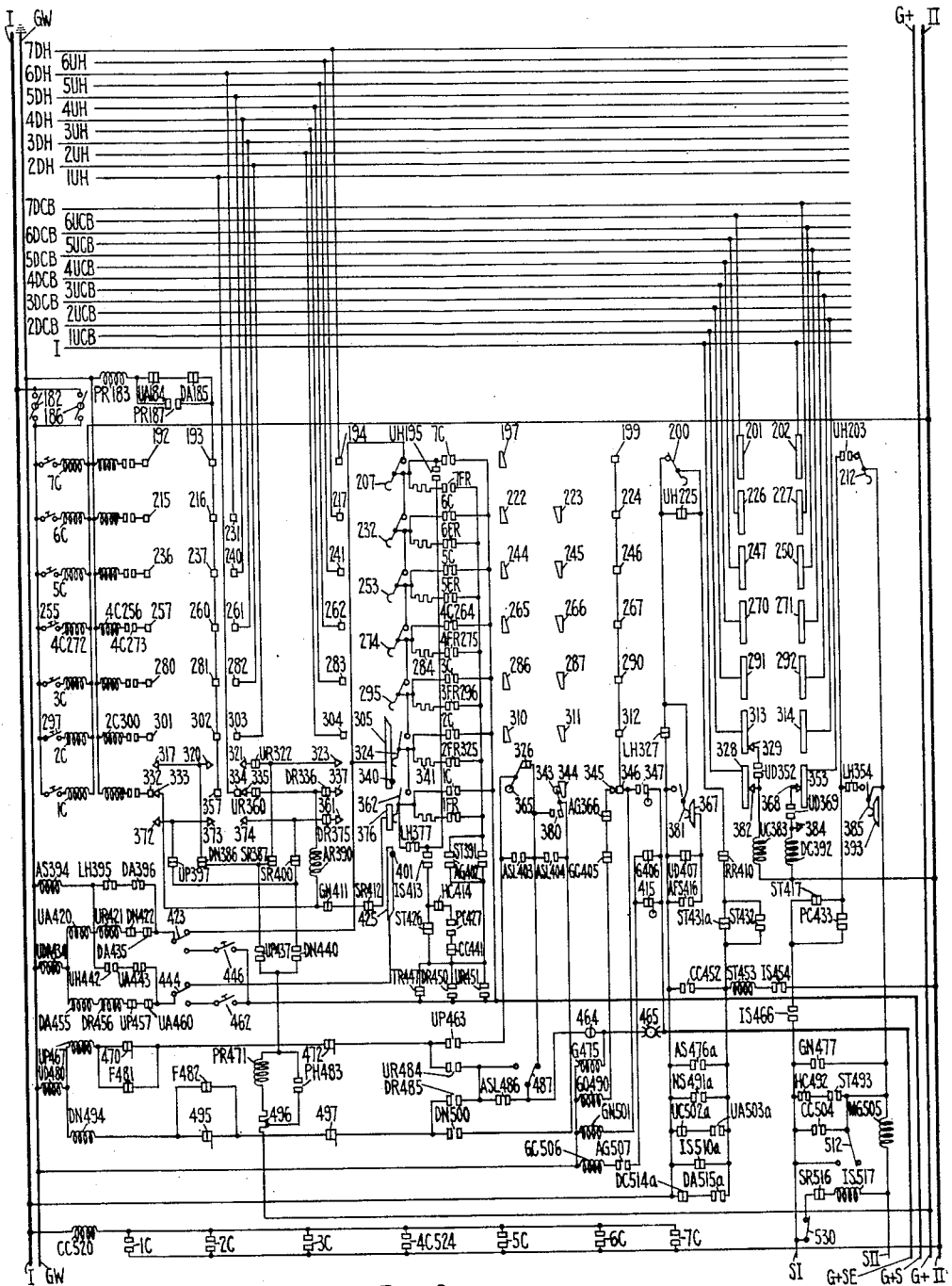
Figure 6A:
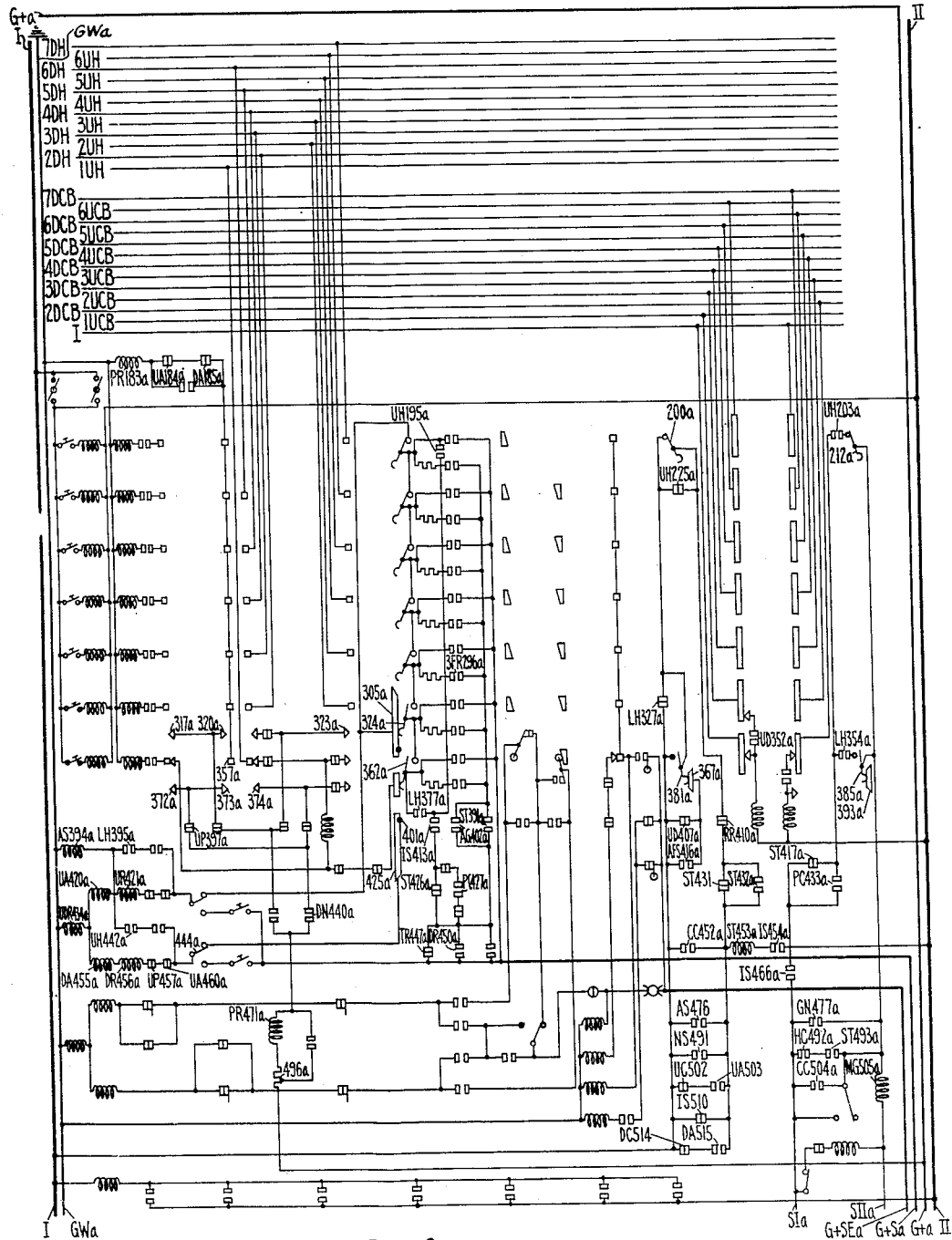
Figure 7:
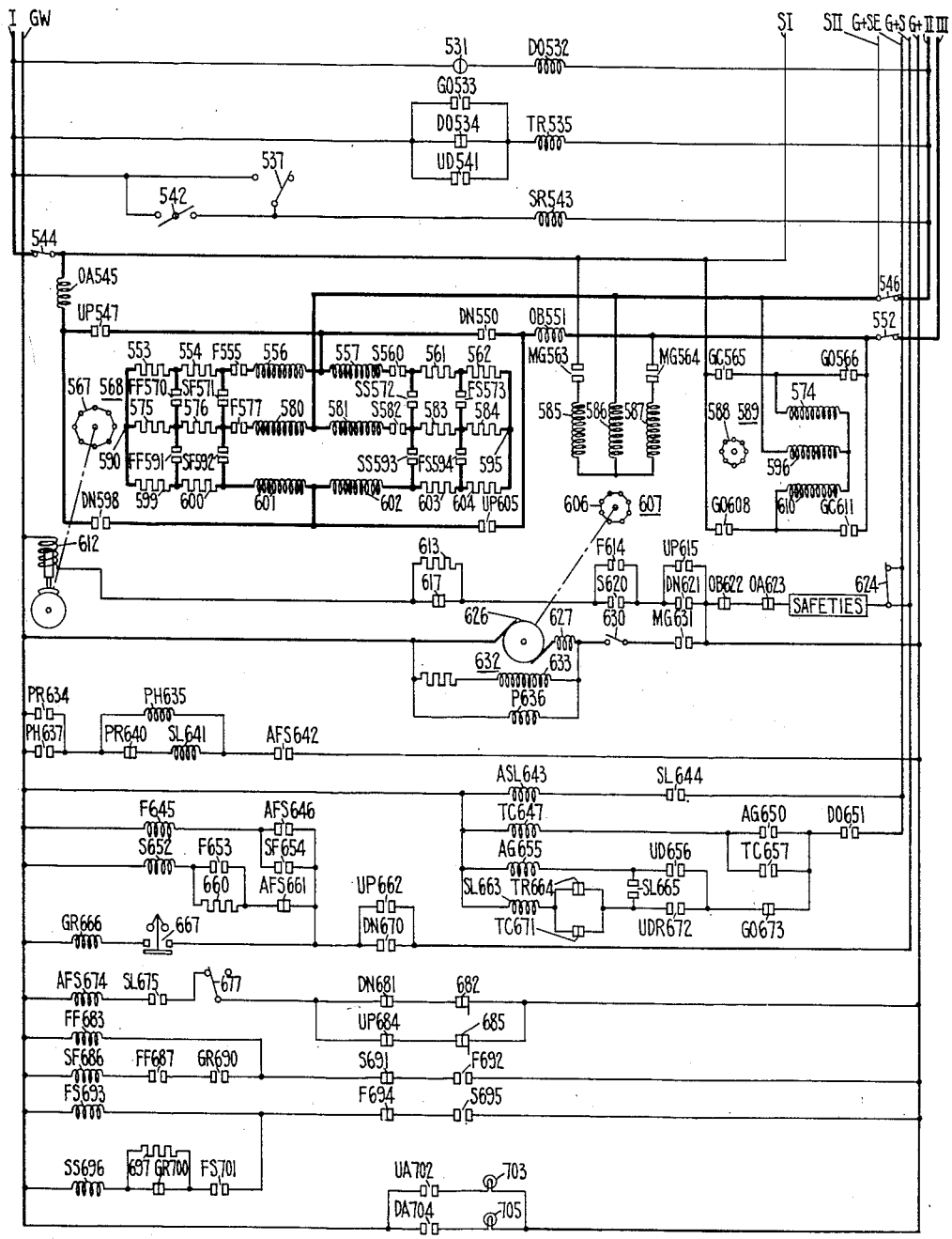
Figure 8:
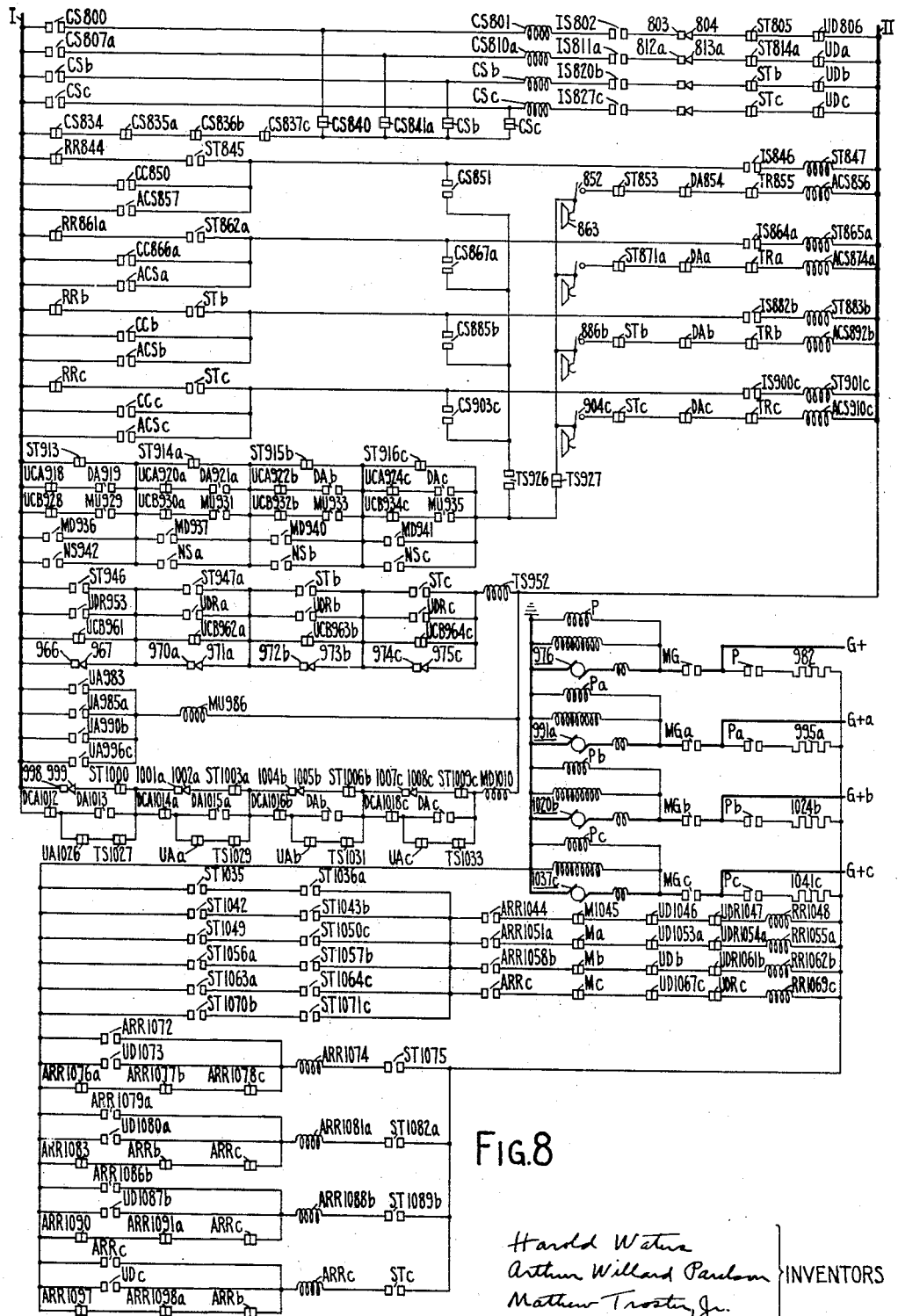
Figure 10:
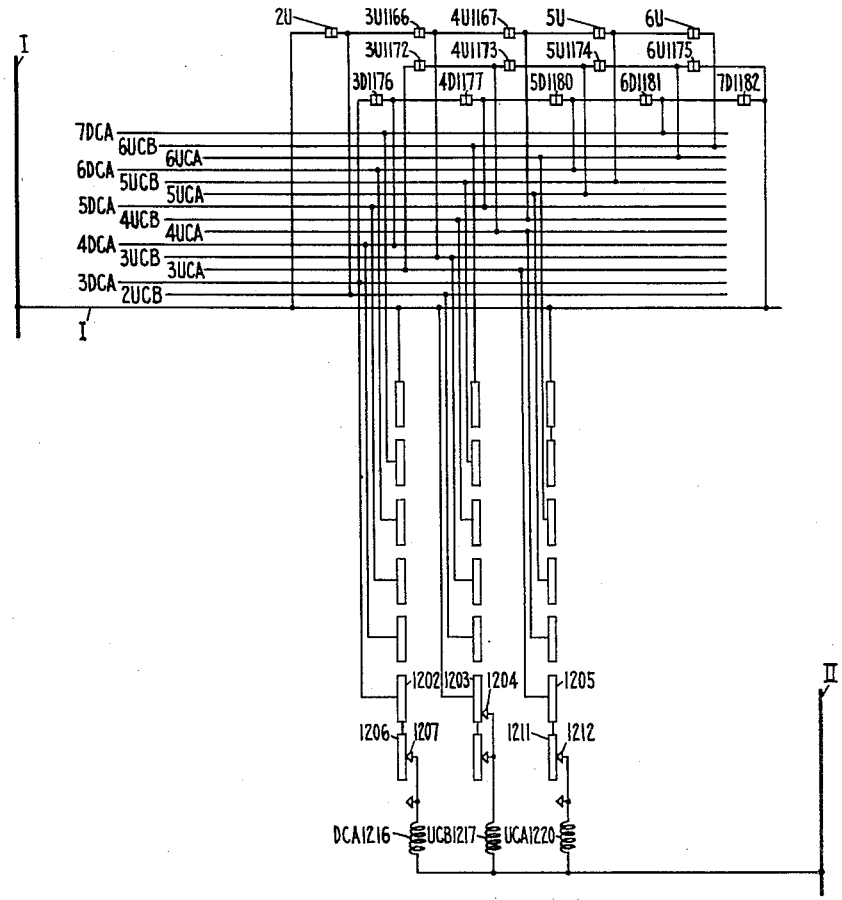

Figures 5, 6 and 7, taken together, constitute a simplified wiring diagram of the power and control circuits for one elevator, Figure 5 having circuits thereon which are common to both elevators;

Figure 6a is a simplified wiring diagram of a portion of the control circuits for the second elevator, this figure corresponding to Figure 6 of the wiring diagram for the first elevator; and Figures 8, 9 and 10 constitute a simplified wiring diagram of certain of the control circuits which may be utilized in applying the invention as exemplified by Figures 5, 6, 7 and 6a to more than two elevators.

Figure 1:
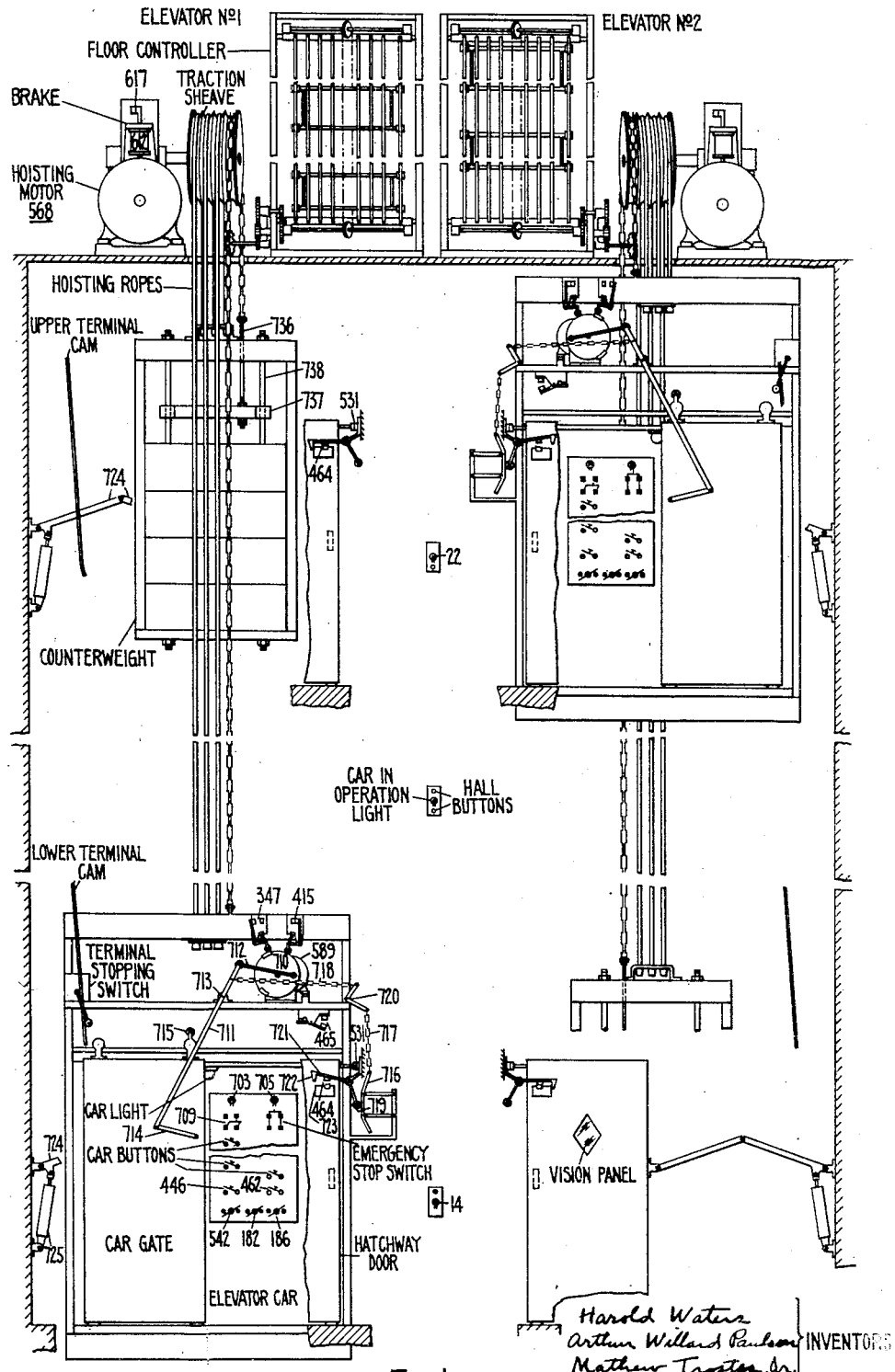
Figure 1 is a simplified schematic representation of an elevator installation of two elevators in accordance with the invention.

For a general understanding of the invention, reference may be had to Figure 1, wherein various parts of the system, chosen to illustrate the principles of the invention, are indicated either by reference characters or by legend. Particular reference may be had to the left half of the figure, wherein the parts of one elevator, hereinafter to be known as elevator No. 1, are represented. The elevator car is raised and lowered by means of a hoisting motor 568. This motor drives a traction sheave over which pass the hoisting ropes for the car and counterweight. An electromechanical brake is provided and is applied to effect the final stopping operation and to hold the car when at rest.

The floor controller is driven by the elevator car, this drive being illustrated by means of a chain connected at one end to the top of the car framework and extending upwardly therefrom to the traction sheave, passing around this sheave in a groove provided thereon. The other end of the chain is connected through a rod 736 to a weight 737. This weight is arranged within the frame of the counterweight, being guided therein for relative movement with respect to the counterweight by guide rods 738. The chain meshes with a sprocket wheel between the car and the traction sheave, the shaft for the sprocket wheel being connected to the floor controller by a train of gears.

The car gate is power operated, whereas the various hatchway doors are manually opened but automatically returned to closed position, a grip for each door being indicated in dotted lines.

A plurality of push buttons are arranged in the car, one button being provided for each floor. These push buttons, to be known as car buttons, are for operation by entering passengers to dispatch the car to the desired destinations.

Direction indicating lamps and certain other switches are provided in the elevator car, all of which will be referred to later. A car light is provided in the car. This light is controlled by switch 709 which is closed to cause the lamp to be lighted all the time the car is in service. This light not only serves to illuminate the car for occupants of the car but also serves to advise intending passengers when the car arrives at a floor at which an intending passenger is waiting or, if already at the floor, that the car is standing at the floor. The hatchway doors are provided with vision panels, as illustrated in connection with elevator No. 2, to permit intending passengers to look into the hatchway, thus enabling them to see the car light when the car is at the floor, the car gate being opened as the car arrives at each floor at which a stop is made.

A terminal stopping switch is provided on the elevator car to be operated by cams, one for the lower terminal and one for the upper terminal. The cam for the lower terminal floor swing the operating arm of the switch counterclockwise from a neutral position as the car arrives at the lower terminal floor while the cam for the upper terminal floor swings the operating arm clockwise from a neutral position as the car arrives at the upper terminal floor. The contacts of this switch are shown in the wiring diagram.

The other elevator is arranged in an identical manner as illustrated in the right half of Figure 1. Up and down push buttons, common to both elevators, are arranged at the intermediate floors. An up push button is arranged at the bottom floor and a down push button at the top floor, these push buttons also being common to both elevators. The push buttons at the floors, to be known as hall buttons, are for calling a car and for causing one or the other of the cars to be brought to a stop at the floor at which the push button is provided. The hall buttons and car buttons are preferably arranged to act through floor relays. These relays are illustrated as mounted on the control panel for the switches common to both elevators (see Figure 3). Indicating lights are arranged preferably in the push button boxes at the various floors for advising intending passengers when a car is in operation.

Mechanism for each car suitable for operating the gate for that car is schematically illustrated in Figure 1. Referring to elevator No. 1, this mechanism comprises a gate operating motor 589 which operates through gearing to drive a disc 710. This disc is connected to the gate operating lever 711 by a link 712. The lever is pivoted at 713 to the car framework and is connected at its other end by a link 714 with the car gate. The car gate is provided with hangers which operate on a track to support the gate as it is moved to open and closed position. One of these hangers has a roller 715 which engages and closes contacts 465 when the gate reaches closed position. Cams are provided on disc 710 for operating limit switches 347 and 415.

Motor 589 is energized to close the gate when a call is in registration which affects that car. Upon thus being energized, the motor rotates disc 710 counterclockwise, moving operating lever 711 about its pivot in a direction to close the gate. As the gate starts to close, gate open limit switch 347 is released by its cam on disc 710 and, as the gate reaches closed position, gate close limit switch 415 is opened by the other cam on disc 710. Also, gate contacts 465 are moved into engagement at this time. Energization of gate operating motor 589 to open the gate is effected as the car comes to a stop at a floor. The direction of rotation of the motor is reversed under these conditions so that the disc is rotated clockwise back into the position shown. This causes the operating lever to be moved in a direction to open the gate. As the gate starts to open, gate contacts 465 are released and separate. Also, gate close limit switch 415 is released and closes. As the gate reaches open position, gate open limit switch 347 is engaged and opened by its cam.

A door lock cam 716 is provided for unlocking the hatchway door at the floor at which a stop is made. This cam is biased into position to unlock the door and is arranged to be retracted by the gate operating mechanism. For this purpose the cam is connected to the gate operating lever 711 by means of chains 717 and 718 connected through a bell crank 720 pivoted on the car framework. With this arrangement, as the gate moves toward open position, the door lock cam falls into position to engage the operating roller 719 for the door lock. This door lock has been illustrated as comprising a lever 721 having a catch 722 on its outer end for engaging a block 723 secured to the back of the door. When the cam is extended, this lever is moved clockwise about its pivot so that the catch disengages the block, unlocking the door and thereby allowing it to be manually opened. At the same time, the contacts 464 of the door lock are separated. As the door starts to open it separates contacts 531 which, to differentiate from the door lock contacts 464, will be termed door sequence contacts. The door is connected by toggle levers 724 to a spring closer 725 so that upon the door being released it is automatically returned to closed position. This engages door sequence contacts 531. The door lock contacts 464, however, remain separated until the gate operating motor is energized to close the gate and the gate has been moved to within a certain distance, say six inches, or closed position. When this point is reached the door lock cam is retracted sufficiently to permit lever 721, which is biased to door locking position, to lock the door, the catch on the end of the lever engaging the block to lock the door before the door lock contacts engage.

Figure 2:
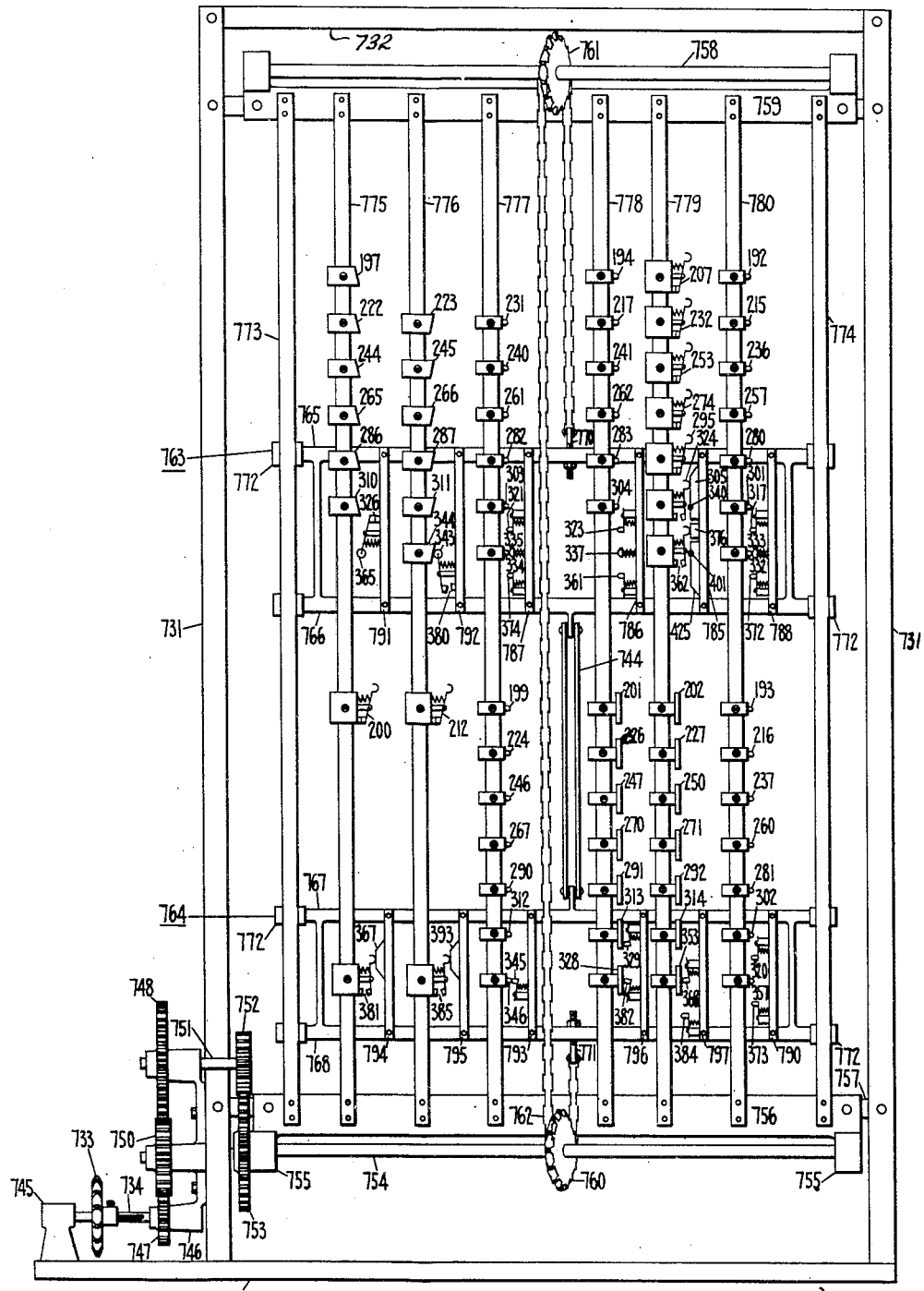
Figure 2 is a schematic representation of a floor controller used in the control system for each elevator.

Reference may now be had to Figure 2, which illustrates schematically a floor controller suitable for the control circuits for each elevator. It is not intended by this illustration to show any details of construction, for these may be widely varied without destroying their utility in the control circuits illustrated. Furthermore, inasmuch as the control circuits themselves may be varied without departing from the principles of the invention, it is to be understood that the floor controller would be arranged to suit the control circuits employed.

In the arrangement illustrated, the floor controller comprises a frame formed by a base 730, standards 731 and top 732. The driving sprocket 733 is arranged on a shaft 734 supported at one end by a bearing pedestal 745 and at the other end in a boss formed on a bracket 746 secured to the frame. A gear 747 is arranged on this shaft and drives another gear 748 through an idler gear 750, the shafts for the latter two gears being supported in bosses formed on bracket 746. On the other end of shaft 751 for gear 748 is another gear 752, which acts through gear 753 to drive a shaft 754. These gears thereby constitute a train of reduction gears for driving shaft 754 in accordance with movement of the elevator car but at reduced speed.

Shaft 754 extends crosswise of the floor controller and is supported at its ends by bearing lugs 755 formed on an elongated bracket 756 secured to a cross member 757 of the framework. A like shaft 758 is arranged at the top of the floor controller. This shaft is rotatably supported in bearing lugs formed on elongated bracket 759 secured to another cross member at the top of the floor controller. Each of these shafts 754 and 758 has sprocket wheels 760 and 761 respectively mounted thereon for rotation therewith. These sprockets and a chain 762 act to drive the floor controller crossheads.

Two crossheads are illustrated, an upper crosshead 763 and a lower crosshead 764. These crossheads are joined by links 744. The upper crosshead comprises a pair of joined cross members 765 and 766. The bottom crosshead similarly comprises a pair of joined cross members 767 and 768. One end of chain 762 is secured to the top cross member 765 of the upper crosshead by means of an eye bolt 770. The other end of the chain is similarly secured by eye bolt 771 to the bottom cross member 768 of the lower crosshead. The ends of cross members 765, 766, 767 and 768 are provided with slotted guides 772, which cooperate with vertically extending guide members 773 and 774 to guide the crossheads in their upward and downward movement. The vertically extending members are secured at the top and bottom to brackets 759 and 756 respectively. Thus, upon rotative movement of sprocket wheel 733 by movement of the elevator car for which the floor controller is provided, the crossheads are actuated through the train of gears, sprockets 760 and 761 and chain 762 in accordance with movement of the car.

In addition to the guide members 773 and 774, six vertically extending bars 775, 776, 777, 778, 779 and 780 are secured to brackets 759 and 756. These bars carry stationary contacts, switches and operating cams for cooperating with elements carried by the crossheads to control the operation of the elevator car. The elements on the vertical bars are arranged in two sections, an upper one for cooperating with the elements carried by the upper crosshead and a lower one for cooperating with the elements carried by the lower crosshead. The various elements carried by these bars are provided for the floors of the installation and are stationed on these members in accordance with the positions of the floors for which they are provided.

Referring first to the elements provided on vertical bar 779 in the upper section, each of these elements comprises a switch having a pair of contacts, the movable one of which is carried by a contact arm which is a conductor of current and which is biased by a spring into contact engaging position. These switches are known as floor brush switches. Seven of them are provided, one for each floor, they being designated 362, 324, 295, 274, 253, 232 and 207 for the first to the seventh floor respectively. The end of each contact arm opposite the movable contact is formed with a hook for cooperation with the travelling cam mounted on a panel section 785 carried by the crosshead. This cam is divided into three sections designated 305, 376 and 425, the upper and lower sections having their outer ends bevelled. Each of these cam sections is current conducting. The upper and lower cam sections cooperate with the floor brush switches to establish the direction circuit for the car, thereby determining the direction of car travel. This cam will therefore be termed a direction cam and the floor brush switches will be termed direction switches.

When a floor brush direction switch is engaged by the upper or lower cam section, the floor brush switch arm is swung about its pivot against its biasing spring to separate the contacts of the switch. However, the circuit is taken up through the contact arm by the cam section, thereby maintaining the direction circuit established. The center section 376 is insulated from the upper and lower sections. When the car is stopped at a floor, the hooked end of the floor brush direction switch for that floor is in engagement with the center section 376 of the direction cam. This isolates the push buttons for this floor from the direction establishing circuits.

On the upper section of bar 778 are provided a plurality of stationary contacts 304, 283, 262, 241, 217 and 194 for the second to the seventh floor respectively. These contacts are adapted to be engaged by brushes 323, 337 and 361 mounted on another panel section 786 on the upper crosshead. Each of these brushes is spring biased to contacting position. Brush 323 cooperates with the stationary contacts during upward car travel to pick up any up hall call which is registered, this brush engaging the respective contacts just before the car arrives at its normal slow down distance from the floors for which the contacts are provided.

Stationary contacts 334, 303, 282, 261, 240 and 231 for the first to the sixth floor respectively are provided on the upper section of bar 777 for cooperation with spring biased brushes 374, 335 and 321 on panel section 787 carried by the upper crosshead. Brush 374 cooperates with the stationary contacts during downward car travel to pick up any down hall call which is registered, this brush engaging the respective contacts just before the car arrives at its normal slow down distance from the floors for which the contacts are provided.

Stationary contacts 332, 301, 280, 257, 236, 215 and 192 for the first to the seventh floor respectively are provided on the upper section of bar 780 for cooperation with spring biased brushes 372, 333 and 317 on panel section 788 carried by the upper crosshead. Brush 317 cooperates with the stationary contacts during upward car travel to pick up any car call which is registered, this brush engaging the respective contacts at the same time brush 323 engages the corresponding contacts on bar 778. Brush 372 cooperates with the stationary contacts on bar 780 during downward car travel to pick up any car call which is registered, this brush engaging the respective contacts at the same time brush 374 engages corresponding contacts on bar 777.

Brush 361 is for cooperation with the stationary contacts provided on bar 778, during downward travel of the car, to pick up any up hall call which may be registered under conditions where no call is registered for a floor below the floor at which the up call is registered. Similarly, brush 321 is for cooperation with the stationary contacts provided on bar 777, during upward travel of the car, to pick up any down hall call which may be registered under conditions where no call is registered for a floor above the floor at which the down call is registered. Brush 321 engages these contacts during upward car travel at the same time brush 323 engages the corresponding contacts on bar 778. Similarly, brush 361 engages the contacts on bar 778 during downward car travel at the same time the corresponding contacts on bar 777 are engaged by brush 374.

Insulated rollers 340 and 401 are provided for cooperation with the floor brush direction switches on bar 779. Roller 340 acts to lift the contact arm of each switch off upper cam section 305 during upward car travel just as or slightly before brush 321 engages the stationary contact on bar 777 for the floor for which the floor brush direction switch is provided. Similarly, roller 401 acts to lift the contact arm of each switch off lower cam section 425 during downward car travel just as or slightly before brush 361 engages the stationary contact on bar 778 for the floor for which the floor brush direction switch is provided. If, at the time the contact arm of the floor brush switch is lifted off cam section 305 by roller 340, no circuit is established through any floor brush direction switch for a floor above to maintain the up direction circuit for the car, this circuit is broken. The breaking of the up direction circuit renders brush 321 effective. Similarly, if, at the time the contact arm of the floor brush switch is lifted off cam section 425 by roller 401, no circuit is established through any floor brush direction switch for a floor below to maintain the down direction circuit for the car, this circuit is broken. The breaking of the down direction circuit renders brush 361 effective.

Stationary contacts 357, 302, 281, 260, 237, 216 and 193 for the first to the seventh floor respectively are provided on the lower section of bar 780 for cooperation with spring biased brushes 320 and 373 on panel section 790 carried by the lower crosshead. These contacts and brushes are for controlling the point at which slow down is initiated in making a stop at any floor. Brush 320 is effective during up car travel while brush 373 is effective for down car travel. During upward car travel, when a call is picked up the stationary contact on the lower section of bar 780 is rendered effective for cooperation with brush 320. This brush is set so as to be in engagement with the contact at the time the call is picked up. The circuits are arranged so that the car is maintained in operation at full speed until brush 320 leaves the contact, whereupon slow down begins. A similar operation is effected by means of brush 373 during downward travel of the car.

The car is brought to a stop at a floor for which slow down has been initiated by means of the stop switches mounted on panel sections 791 and 792 carried by the upper crosshead. Each of these switches comprises a pair of contacts and an operating arm which carries the movable one of these contacts at one end and an operating roller at the other. Each arm is biased by a spring to contact engaging position. The contacts of the up stop switch are designated 326, while those of the down stop switch are designated 380. The operating roller 365 for the up stop switch is for engaging a plurality of cams 310, 286, 265, 244, 222 and 197 for the second to the seventh floor respectively. These cams are mounted on the upper section of bar 775 and are positioned to be engaged by roller 365 to open contacts 326 just before the car arrives at the floor for which the respective cams are provided. Similarly, the operating roller 343 for the down stop switch is for engaging a plurality of cams 344, 311, 287, 266, 245 and 223 for the first to the sixth floor respectively. These cams are mounted on the upper section of bar 776 and are positioned to be engaged by roller 343 to open the contacts just before the car arrives at the floor for which the respective cams are provided. Each of the cams is arranged at an acute angle at the point where it is engaged by the roller so as to insure a quick separation of the stop switch contacts.

Brushes 333, 335 and 337 are for cooperating with their respective stationary contacts to insure reset of the floor relay for the floor at which a stop is made and to prevent the registration of a call at that floor while the car is standing there. Stationary contacts 346, 312, 290, 267, 246, 224 and 199 for the first to the seventh floor respectively are provided on the lower section of bar 777 for cooperation with spring biased brush 345 on panel section 793 carried by the lower crosshead. When the car is stopped at a floor, this brush is in engagement with the contact for that floor. When the car is brought to a stop at a floor, this brush, in cooperation with the stationary contact for that floor on the lower section of bar 777, acts to cause the automatic opening of the car gate and the unlocking of the hatchway door at that floor.

Floor brush switches 381 and 200 are provided on the lower section of bar 775 for the first and seventh floor respectively. Switch 381 is engaged by a current conducting cam 367 when the car is at the first floor to control energization of a starting relay for that car. This is effective when the home station for the car is at the first floor. Switch 200 is for cooperation with cam 367 for controlling the energization of this same starting relay when the car is stopped at the top floor. This is effective when the home station is at the top floor. Cam 367 is mounted on panel section 794 carried by the lower crosshead.

Floor brush switches 385 and 212 are provided on the lower section of bar 776 for the first and seventh floor respectively. Switch 385 is engaged and opened by an insulated cam 393 when the car is at the first floor. Switch 385 is effective when the home station for the car is at the first floor to control the energization of a starting relay for a motor generator set employed in the system as illustrated. Switch 212 is engaged and opened by cam 393 when the car is at the top floor. This switch is effective to control energization of the motor starting relay when the home station for the car is at the top floor. Cam 393 is mounted on panel section 795 carried by the lower crosshead.

Relatively elongated stationary contacts 328, 313, 291, 270, 247, 226 and 201 for the first to the seventh floor respectively are provided on the lower section of bar 778 for cooperation with spring biased brushes 329 and 382. These brushes are mounted on panel section 796 carried by the lower crosshead. These brushes in cooperation with these contacts are effective during up car travel to cause the starting of the other car from the home station when an up call behind the car for which these elements are provided is registered. Elongated stationary contacts 353, 314, 292, 271, 250, 227 and 202 for the first to the seventh floor respectively are provided on the lower section of bar 779 for cooperation with spring biased springs 368 and 384. These brushes are mounted on panel section 797 carried by the lower crosshead. These brushes in cooperation with these contacts are effective during down car travel to cause the starting of the other car from the home station when a down call behind the car for which these elements are provided is registered.

Up cam section 305 in cooperation with the floor brush switches also controls circuits to cause, when the home station for the car is at the first floor, either an up call or a down call behind the car during its downward travel to start the other car from the home station. Down cam section 425 in cooperation with the floor brush switches also controls circuits to cause, when the home station for the car is at the top floor, either an up call or a down call behind the car during its upward travel to start the car from the home station. When the system is installed to have the home station always at the first floor, the stationary contacts on the lower section of bar 779, their cooperating brushes and floor brush switches 200 and 212 may be omitted.

Reference may now be had to Figures 5, 6 and 7, which illustrate diagrammatically the various control and power circuits for a pair of elevators. No attempt is made in these figures to show the coils and contacts of the switches in their associated positions, "straight" diagrams being employed. The coils and contacts of the switches are separated in such manner as to render the circuits comparatively simple.

Figure 5 shows the control circuits which are common to both elevators.

Figures 6 and 7 show control and power circuits which are individual to elevator No. 1.

Figure 6a illustrates the floor controller circuits and certain other circuits for elevator No. 2, it being understood that elevator No. 2 is provided with additional control circuits and also power circuits, which may be identical with those illustrated for elevator No. 1 in Figure 7.

The circuits for the elevators are illustrated for only seven floors. It is to be understood, however, that the invention is applicable to any number of floors, seven being chosen merely for purposes of description.

The numerals employed in designating the various elements of the wiring diagrams are arranged in sequence, the lowest number appearing in the upper left hand corner of Figure 5, with the succeeding numbers following in numerical sequence from left to right downwardly of the sheet of drawings. The circuits of Figures 6 and 6a are joined to those of Figure 5 by means of bus bars. The numbers are continued in Figure 6 and are arranged in the same sequence. The circuits in Figure 6 are continued in Figure 7, indicated by continuance of wires I, GW, SI, SII, etc. from the bottom of the sheet of Figure 6 to the top of the sheet of Figure 7, and the numbers continue in Figure 7 in the same sequence. The arrangement of numerals in this sequence facilitates the location of any element referred to in the description. The same reference characters are employed for the switches and other control apparatus of elevator No. 2 as are employed for the corresponding parts of elevator No. 1, with the exception that the letter "a" is affixed to each designating character for elevator No. 2 as a means of differentiation.

The invention is applicable to either direct current or alternating current power supply. A three-phase alternating current power supply has been illustrated. The supply mains are designated I, II and III.

The wiring diagram of elevator No. 1 will first be described. The hoisting motor 568 of elevator No. 1 is illustrated for convenience as a two-speed alternating current induction motor. It is provided with two separate primary or stator windings, one for producing a low number of poles and therefore for causing the motor to run at a fast speed and the other for producing a high number of poles, for causing the motor to run at slow speed. The phase windings of the slow speed stator winding are designated 557, 581 and 602, while the phase windings of the fast speed stator winding are designated 556, 580 and 601. A secondary or rotor winding is illustrated as of the squirrel cage type and is designated 567. Resistances 553, 554, 575, 576, 599 and 600 are provided for controlling the torque exerted by the motor when connected on the fast speed winding, while resistances 561, 562, 583, 584, 603 and 604 are provided for controlling the torque exerted by the motor when connected on the slow speed winding. 612 is the release coil for the hoisting motor electromechanical brake.

544, 546 and 552 are the blades of a triple pole knife switch for connecting the elevator hoisting motor and certain other parts of the control system of elevator No. 1 to the supply mains. Some elements of the control system, including the floor relays, are supplied directly from the supply mains, subject to a service switch (not shown in the wiring diagram but shown in Figure 3 where it is designated 706), while other control parts are supplied with direct current from the generator of a motor generator set. The negative supply wire from the generator is grounded (see top of Figure 5) and is designated GW. The positive supply wire from the generator is for convenience divided into three branches on the wiring diagram, these branches being designated G+, G+S, and G+SE.

The armature of the generator 632 is designated 626, its series field winding 627 and its shunt field winding 633. Power is supplied to driving motor 607 for the generator from the supply mains. The phase windings of the stator of the driving motor are designated 585, 586 and 587, and the rotor is designated 606. The motor 589 for operating the gate is illustrated as an alternating current motor having its stator phase windings designated 574, 596 and 610. Power is supplied to the gate motor from the supply mains. The rotor of the gate operating motor is designated 588.

The gate contacts, as previously set forth, are designated 465. The door sequence contacts are arranged in series relation and are represented in the diagram by a single set of contacts designated 531. Similarly, the door lock contacts are arranged in series relation and are indicated by a single set of contacts designated 464.

An emergency stop switch is provided in the car. This switch has two blades 624 and 530 which in conforming with the type of wiring diagram employed are shown separated. 423, 444, 487, 512, 537 and 677 are blades of an inspection switch. This switch is mounted on the control panel of Figure 4 and its purpose will be explained later. 446 and 462 are up and down start push buttons in the car for operating the car when the inspection switch is thrown into position other than that in which it is illustrated. 542, 182 and 186 are key operated service switches in the car. 630 is a knife switch on the control panel of Figure 4. Switches 86 and 92 are arranged on the control panel of Figure 3. The purpose of all of these switches will be explained later.

The electromagnetic switches have been designated as follows:

AFS—Auxiliary fast and slow speed switch
AG—Auxiliary gate close relay
AHB—Auxiliary hall button relay
AR—Auxiliary reset relay
AS—Auxiliary starting relay
ASL—Auxiliary slow down switch
CC—Car call relay
DA—Down auxiliary direction relay
DC—Down call relay
DN—Down reversing switch
DO—Door relay
DR—Down direction relay
F—Fast speed switch
FF—First fast speed accelerating switch
FS—First slow speed retarding switch
G—Gate contact relay
GC—Gate close relay
GN—Generator holding relay
GO—Gate open relay
GR—Governor relay
HB—Hall button relay
HC—Hall call relay
IS—In service relay
LH—Lower home landing relay
MG—Motor-generator starting relay
NS—Non-start relay
OA, OB—Overload relays
P—Potential relay
PC—Parking control switch
PH—Pick up holding relay
PR—Pick up relay
RR—Return relay
S—Slow speed switch
SF—Second fast speed accelerating switch
SL—Slow down switch
SR—Service relay
SS—Second slow speed retarding switch
ST—Starting relay
TC—Time cancelling relay
TR—Time relay
UA—Up auxiliary direction relay
UC—Up call relay
UD—Up and down switch
UDR—Up and down relay
UH—Upper home landing relay
UP—Up reversing switch
UR—Up direction relay Throughout the description which follows, these letters, in addition to reference numerals, will be applied to parts of the above designated switches. For example, "contacts UP547" indicates that the contacts are on the up reversing switch UP, while "operating coil DN494" indicates that the coil operates the down reversing switch DN. The relationship of the coils and contacts of the above switches which are individual to elevator No. 1 may be seen from Figure 4, where the switches are arranged in alphabetical order. The relationship of the coils and contacts of the switches common to the cars may be seen from Figure 3.

Figure 3:
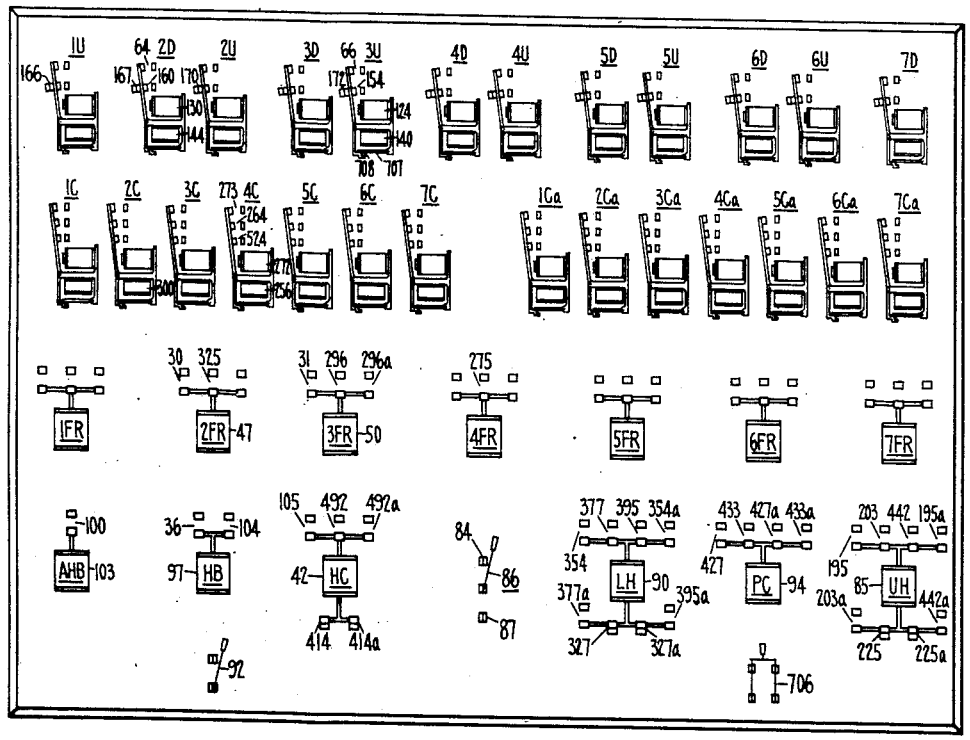
Figure 3 is a diagrammatic representation of the panel having relays and switches mounted thereon common to both elevators and illustrating the relationship of the coils and contacts of the various electromagnetic switches and floor relays mounted thereon.

Referring to Figure 3, the switches common to the cars and the floor relays for the push buttons are arranged on the same panel. The floor relays which operate in response to hall buttons are arranged on the panel in accordance with the floors for which they are provided, those for intermediate floors being arranged in pairs. The floor relays which operate in response to the car buttons are arranged in groups, one group for each elevator. The floor relays have been characterized generally in accordance with the floors and push buttons which they represent. For example, 2D indicates that the floor relay is for the second floor and is controlled by the down hall button for that floor and 3Ca indicates that the floor relay is for the third floor and is controlled by the car button for that floor for elevator No. 2. A down hall button being provided at the top floor (in the present case, the seventh floor), the hall button seventh floor relay has been characterized 7D. Similarly, an up hall button being provided at the bottom floor (in this case, the first floor), the hall button first floor relay has been characterized 1U.

The hall button and car button floor relays have been illustrated as of the latching type. Such a relay comprises an operating coil for causing the operation of the relay, latching mechanism for latching the relay in operated condition, and a reset coil energizable to release the latching mechanism. Referring to the up hall button third floor relay, for example, the operating coil is designated 124, the reset coil 140 and the contacts 66, 154 and 172. The latching mechanism for this relay comprises armature 707 operated by coil 140 and a notch 708 arranged on the operating lever for cooperation with this armature. When the relay is operated, armature 707 falls into the notch, latching the relay in operated condition. The reset coil of an operated floor relay is not energized and therefore the relay is maintained in operated condition until circuits are set up to answer the call registered thereby. When the reset coil is energized, armature 707 is pulled out of the notch, unlatching the relay. The reset of the relay cancels the call.

Auxiliary floor relays are utilized to provide in effect additional contacts on the hall button floor relays. One auxiliary floor relay is provided for each floor, those for the intermediate floor acting in response to the operation of either the up or the down hall button floor relay for that floor. These auxiliary floor relays are designated in accordance with the floor for which they are provided. For example, 4FR indicates that this auxiliary floor relay is for the fourth floor up and down hall buttons.

Referring back to Figures 5, 6 and 7, all electromagnetic switches are illustrated in deenergized condition. Also, all latching switches are illustrated in reset condition. The gate contacts 465, door sequence contacts 531 and door lock contacts 464 are all shown in engagement.

Assume that the car is standing at the first floor. The floor controller circuits of Figure 6 are illustrated in accordance with this assumption. As the car is idle, the first floor hatchway door is closed but not locked, and the car gate is open. Door lock contacts 464 and gate contacts 465 are therefore both separated. The door sequence contacts 531, however, are in engagement. Thus the circuit is complete for coil DO532 of door relay DO from power supply main I to supply main II. Contacts DO534, therefore, are separated and coil TR535 of time relay TR is deenergized. Also, contacts DO651 are in engagement preparing the circuit for coil SL663 of the slow down switch SL.

In order that the operation of elevator No. 1 may be described, it will be assumed that the starting relay ST of elevator No. 1 is operated instead of the starting relay of elevator No. 2. The operation of elevator No. 1 starting relay is effected by elevator No. 1 in service relay IS. A circuit is completed for coil IS517 of relay IS from main I through blade 544 of the service switch, by wire SI to Figure 6, blade 530 of the emergency stop switch, contacts SR516, coil IS517, by wire SII back to Figure 7, blade 546 of the service switch, to main II. Thus contacts IS510 (Figure 6a) are separated and contacts IS466, IS413 and IS454 are in engagement. Contacts IS510 are in a circuit for coil ST453a of the elevator No. 2 starting relay. Contacts IS466 are in a circuit for coil MG505 of the motor-generator starting relay, this circuit being open, however, at floor controller switch 385, which is held open by a cam 393 due to the fact that the car is at the first floor. Contacts IS413 have to do with returning the car to the home station, and will be explained later. Contacts IS454 connect coil ST453 of the starting relay to mains I and II, the circuit being through contacts UD407 of up and down switch UD, cam 367 and the arm of floor controller switch 381, contacts UH225 of the upper home landing relay and floor controller switch 200 in parallel, contacts RR410 of the return relay and contacts ST431a of elevator No. 2 starting relay. Starting relay ST for elevator No. 1 is therefore operated. Its contacts ST432 are in engagement to maintain the relay operated after operation of elevator No. 2 starting relay to separate contacts ST431a. Contacts ST60 are in engagement preparing a circuit common to coils RR55 and RR43a of the return relays for the elevators. Contacts ST493 are in engagement, preparing another circuit for the motor-generator starting relay coil MG505. Contacts ST391 are in engagement, preparing the circuit for the coils of direction relays. Contacts ST40 are in engagement preparing the circuit for coil NS41 of the non-start relay. Contacts ST426 in series with contacts IS413 are separated, and contacts ST417 in series with contacts IS466 are separated, the purpose of these contacts being explained later. Contacts ST431 which control the energization of coil ST453a of elevator No. 2 starting relay are separated (see Figure 6a).

Assume now that an intending passenger at the third floor desiring to be carried in the up direction presses the up third floor push button 112. This connects coil 3U124 of the up third floor relay 3U to mains I and II through coil AHB103 of the auxiliary hall button relay. The voltage applied to coil 3U124 is insufficient to operate floor relay 3U but does cause the operation of relay AHB. This relay, upon operation, engages contacts AHB100 to complete a circuit for coil HB97 of the hall button relay. This circuit is from main I through contacts AR95a and AR96 of the auxiliary reset relays, coil HB97, contacts AHB100 and contacts UDR101 and IDR102a of the up and down relays for both elevators, to main II. Relay HB, upon operation, engages contacts HB104 to establish a self-holding circuit. It also engages contacts HB36, completing a circuit for coil HC42 of the hall call relay. These contacts also complete a circuit for coil NS41 of the non-start relay through contacts UD37 and contacts ST40.

The non-start relay NS does not operate immediately the circuit for its coil is completed, its operation being delayed for a certain time interval, for a purpose to be set forth later. The hall call relay HC, however, operates to engage contacts HC105, short-circuiting coil AHB103. Relay AHB drops out to separate contacts AHB100, the circuit for coil HB97 being maintained through contacts HB104. The short-circuiting of coil AHB raises the voltage applied to coil 3U124 of third floor relay 3U sufficiently to cause this floor relay to operate. Upon operation, the relay engages contacts 3U66, preparing the circuit for coil 3FR50 of the auxiliary third floor relay and engages contacts 3U154, connecting up third floor floor controller contact 283, via bus bar 3UH, through restoring coil 3U140 of relay 3U to ground. The purpose of this circuit will be explained later. Relay 3U also separates contacts 3U172 which are arranged in series with like contacts on the floor relay for the first floor and the up floor relays for the second, fourth, fifth and sixth floors. The purpose of this arrangement also will be explained later. The floor relay, being latched, remains in operated condition after the up third floor hall button is released.

The hall call relay HC, upon operation, also engages contacts HC492 and HC492a. The engagement of contacts HC492a is without effect as contacts ST493a are separated (see Figure 6a). The engagement of contacts HC492 connects coil MG505 of the motor-generator starting relay to wires SI and SII through contacts ST493 of the starting relay. The motor-generator starting relay operates to engage contacts MG631, MG563 and MG564 and separates contacts MG82. The purpose of contacts MG82 will be explained later. The engagement of contacts MG563 and MG564 connects stator windings 585 and 587 of the driving motor for the generator to mains I and III. Phase winding 586 being connected with main II, the driving motor starts in operation, bringing the generator up to full speed. Contacts MG631 connect the generator to its supply wires GW, G+, G+S and G+SE. Wires G+, G+S and G+SE are all positive supply wires, wire G+S being fed by the generator through contacts OB622 and OA623 of the overload relays and contacts of the various safety devices indicated by legend, such as a safety brake operated switch, governor overspeed switch, floor controller broken chain switch, and final limit switches. Wire G+SE is fed through the same contacts of the overload switches and of the safety devices and in addition through one blade 624 of the emergency switch in the car. Upon the voltage of the generator reaching a predetermined value, say 85% of full value, coil P636 of the potential relay is energized sufficiently to effect the engagement of contacts P83. This connects coil 3FR50 of the auxiliary third floor relay to generator feed wires GW and G+.

Relay 3FR engages contacts 3FR31, by-passing contacts HB36 and thereby establishing a holding circuit for coil HC42 of the hall call relay. It also engages contacts 3FR296 and 3FR296a (see Figure 6a), contacts 3FR296 connecting coils UR421, UA420 and UDR434 of the up and down relay, up auxiliary direction relay and up direction relay respectively to supply wires GW and G+S. This circuit is from wire GW, through coil UDR434, coil UA420, coil UR421, contacts DN422, contacts DA435, blade 423 of the service inspection switch, floor brush direction switches 207, 232, 253, 274 and 295, contacts 3FR296, contacts ST391 and contacts TR447, to wire G+S.

Up auxiliary direction relay UA, upon operation, separates contacts UA184 in a circuit for coil PR183 of the pick up relay. It also separates contacts UA460, these contacts serving as an electrical interlock. It engages contacts UA503 in a circuit for the coil ST453a of elevator No. 2 starting relay, the purpose of which will be seen from later description. It engages contacts UA443, preparing a circuit for coil AS394 of the auxiliary starting relay. It also engages contacts UA702, completing the circuit for up direction lamp 703 in the elevator car.

Up direction relay UR, upon operation, separates contacts UR322 and UR360 in the circuits to floor controller brushes 321 and 335 respectively. It also engages contacts UR451, by-passing contacts TR447 and engages contacts UR484, preparing the circuit for coil UP467 of the up reversing switch and coil UD480 of the up and down switch respectively.

Up and down relay UDR, upon operation, separates contacts UDR56 in the circuit for coil RR55. The purpose of these contacts will be explained later. Relay UDR also separates contacts UDR101 to break the circuit for coil HB97 of the hall button relay. The hall button relay drops out, separating contacts HB104 and HB36. Coil HC42 is maintained energized after the separation of contacts HB36 by contacts 3FR31. Relay UDR also engages contacts UDR13, connecting the car in operation lights 14, 15, 16, 17, 20, 21 and 22 across the secondary winding 12 of an operating transformer, the primary winding 11 of which is connected across supply mains I and II. One of these lights is provided at each landing and is arranged preferably in the face plate of the push button unit at that landing. The purpose of the lights is to advise intending passengers that a car is in operation. Relay UDR also engages contacts UDR672, completing a circuit for operating coil SL663 of the slow down switch. This circuit is from wire GW through coil SL663, contacts TR664 and TC671 in parallel, contacts UDR672, contacts GO673, contacts DO651, to wire G+SE.

Slow down switch SL, upon operation, engages and latches contacts SL644, SL675 and SL665. Contacts SL644 connect coil ASL643 of the auxiliary slow down switch to wires GW and G+SE, this switch serving in effect to provide additional contacts for switch SL. Switch ASL, upon operation, engages contacts ASL486, ASL403 and ASL404. Contacts ASL486 further prepare a circuit for coils UD480 and UP467. The purpose of contacts ASL403 and ASL404 will be explained later.

Contacts SL675 connect coil AFS674 of the auxiliary fast and slow speed switch to wires GW and G+ through blade 677 of the inspection switch, contacts DN681 of the down reversing switch and contacts 682 of the terminal stopping switch. Switch AFS, upon operation, engages contacts AFS642, AFS416 and AFS646 and separates contacts AFS661. Contacts AFS661 are in the circuit for coil S652 of slow speed switch S, preventing the energization of this coil by the operation of fast speed switch F and up reversing switch UP. Contacts AFS642 prepare the circuit for coil PH635 of the pick up holding relay and reset coil SL641 of the slow down switch. Contacts AFS416 by-pass contacts UD407 in the circuit for coil ST453 of the starting relay. Contacts AFS646 prepare the circuit for coil F645 of the fast speed switch.

Contacts SL665 connect coil AG655 of the auxiliary gate close relay to supply wires GW and G+SE through contacts UDR672, GO673 and DO651. The auxiliary gate close relay AG, upon operation, engages contacts AG402 to by-pass contacts ST391 for a purpose to be explained later. It also engages contacts AG650, completing a circuit for coil TC647 of the time cancelling relay through contacts DO651, the time cancelling relay engaging contacts TC657 to establish a self-holding circuit and also separating contacts TC671 by-passing contacts TR664, for a purpose to be described later. Relay AG also separates contacts AG366 in the circuit for gate open relay coil GO490 and engages contacts AG507, completing a circuit for coil GC506 of the gate close relay through gate close limit switch 415.

Gate close relay GC, upon operation, separates contacts GC405 in a circuit for coil GO490 of the gate open relay and engages contacts GC565 and GC611, connecting stator phase windings 574 and 610 of the gate operating motor to mains I and III respectively. The energization of the gate operating motor by the gate close switch causes the gate operating mechanism to move the gate to closed position as previously described. As the gate starts to close, gate open limit switch 347 closes, connecting coil GN501 of the generator holding relay to wires GW and G+SE. This relay operates to engage contacts GN477 in a circuit for coil MG505 for a purpose to be described later, and separates contacts GN411, the purpose of which also will be described later. The closing of gate open limit switch 347 does not complete the circuit for coil GO490 through brush 345 and contact 346 as this circuit is open at contacts GC405 and AG366. As the gate reaches closed position, gate close limit switch 415 opens. Also, gate contacts 465 close to connect coil G475 of the gate contact relay to wires GW and G+SE. The gate contact relay operates to separate contacts G406 which, together with the opening of switch 415, breaks the circuit for coil GC506 of the gate close relay. If the gate meets an obstruction in closing, coil GC506 is maintained energized by contacts G406, should the gate operating mechanism get sufficiently ahead of the gate to open switch 415, until the gate reaches closed condition. In the gate closing operation, cam 716 (see Figure 1) is retired, which locks the hatchway door at the first floor, closing door lock contacts 464. This, together with the engagement of gate contacts 465, connects coil UP467 of the up reversing switch and coil UD480 of the up and down switch to wires GW and G+SE through contacts F481 of the fast speed switch and terminal stopping switch contacts 470 in parallel, terminal stopping switch contacts 472, contacts UR484, contacts ASL486, door lock contacts 464 and gate contacts 465.

Up and down switch UD, upon operation, separates contacts UD37 in the circuit for coil NS41, breaking the circuit for this coil before the relay has operated to engage its contacts NS491 (see Figure 6a). The up and down switch also separates contacts UD407, the circuit for coil ST453 being maintained, however, through contacts AFS416. It engages contacts UD656 to establish another circuit for coil AG655 of the auxiliary gate close relay. It also engages contacts UD541, completing the circuit for coil TR535 of the time relay, which operates to separate contacts TR664 and TR447. The separation of contacts TR447 has no effect at this time as they are by-passed by contacts UR451. Also, the separation of contacts TR664 has no effect at this time as the slow down switch SL is latched in operated condition. The purpose of relay TR will be seen from later description.

Up reversing switch UP, upon operation, engages contacts UP463, UP437, UP615, UP547, UP605 and UP662 and separates contacts UP457, UP684 and UP397. Contacts UP457 are in the circuit for coils DA455 and DR456 and serve as an electrical interlock. Contacts UP684 are in the circuit for coil AFS674 of the auxiliary fast and slow speed switch and serve to render this switch subject to terminal stopping switch 682 in making an upper terminal stop. The separation of contacts UP397 renders down car stop brush 372 and auxiliary down stop brush 373 ineffective for up car travel. Contacts UP463 establish an additional circuit for coils UP467 and UD480 through contacts ASL403. The purpose of this additional circuit is served during the stopping operation, and will be described later. Contacts UP437 connect brushes 317, 320 and 323 to wire G+ through contacts DN386 and SR387 and coil PR471 of the pick up relay. Contacts UP615 prepare the circuit for brake release coil 612. Contacts UP547 and UP605 are in the circuits for the stator windings of the elevator hoisting motor. Contacts UP662 connect coil F645 of the fast speed switch to wires GW and G+S through contacts AFS646.

The fast speed switch, upon operation, separates contacts F481 and F482, paralleling terminal stopping switch contacts 470 and 495, respectively. The purpose of these contacts is served in making a terminal stop. Switch F also separates contacts F694 in the circuit for coils FS693 and SS696 of the first and second slow speed retarding switches respectively. Switch F engages contacts F653, these contacts being provided to insure against operation of slow speed switch S to connect the slow speed stator windings to the power mains in a starting operation in the event of failure of switch AFS to operate, the purpose of which is served during slow down of the car. Contacts F614 connect brake release coil 612 to wires GW and G+S through switch 617 on the brake and contacts UP615. It also engages contacts F555 and F577 which, together with contacts UP547 and UP605, complete the circuits for the fast speed stator phase windings 556, 580 and 601 of the elevator hoisting motor. The circuit for phase winding 556 is from power main I through blade 544 of the service switch and coil OA545 of one of the overload relays, contacts UP547, phase winding 556, contact F555, resistances 554 and 553, to star point 590. The circuit for phase winding 580 is from power main II through blade 546 of the service switch, phase winding 580, contacts F577, resistances 576 and 575, to star point 590. The circuit for phase winding 601 is from power main III through blade 552 of the service switch, coil OB551 of the other overload relay, contacts UP605, phase winding 601, resistances 600 and 599, to star point 590.

The brake being released as a result of the energization of the brake release coil and the stator phase windings of the elevator motor being energized, the elevator motor starts the car in operation. Owing to the direction established by contacts UP547 and UP605 of up reversing switch UP, the motor starts the car upwardly. The brake, upon being released, opens switch 617 to insert cooling resistance 613 in circuit with the brake release coil.

Fast speed switch F, upon operation, also engages contacts F692, connecting coil FF683 of the first fast speed accelerating switch to wires GW and G+ through contacts S691 and prepares the circuit for coil SF686 of the second fast speed accelerating switch.

Figure 4:
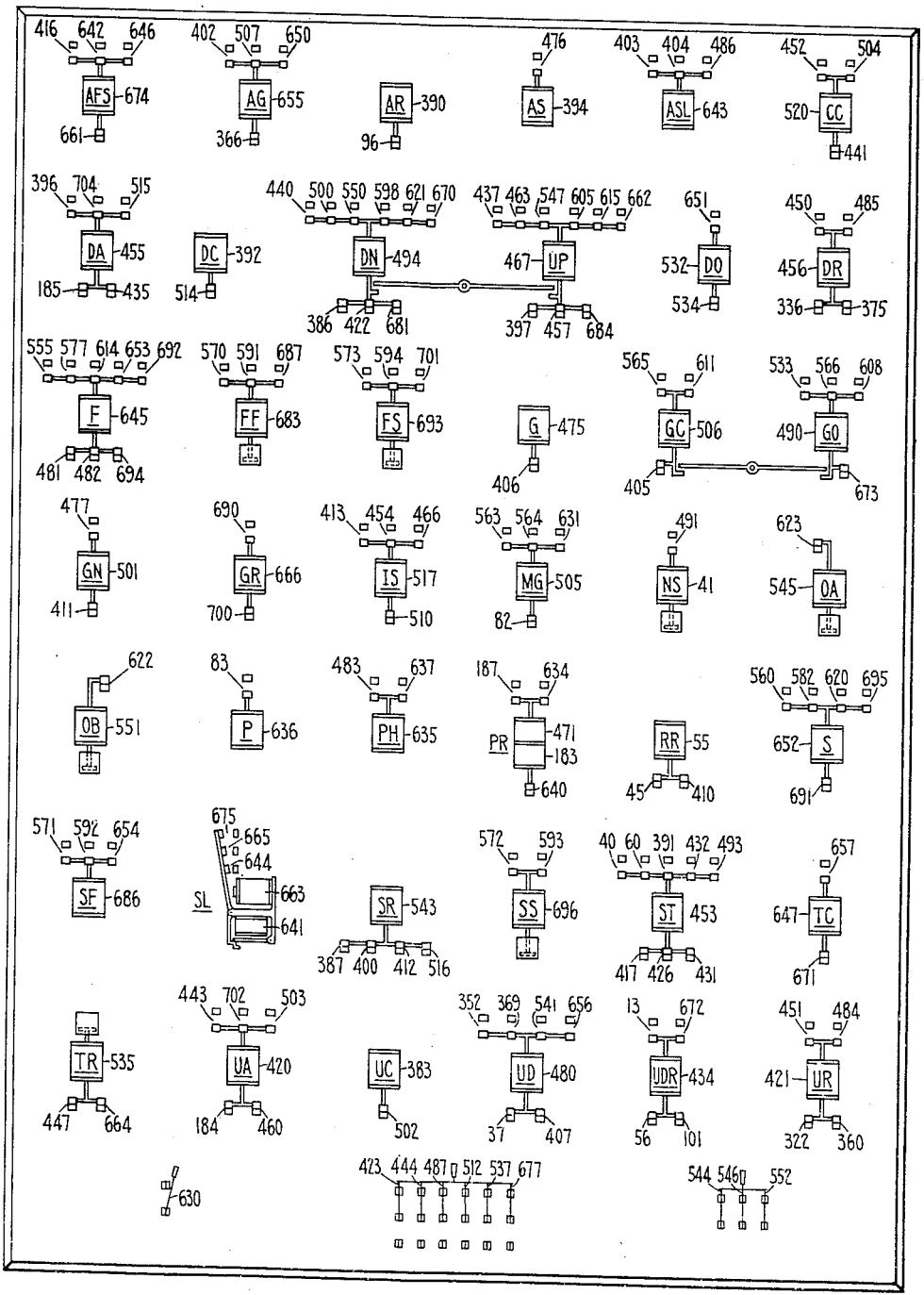
Figure 4 is a diagrammatic representation of the control panel of one elevator, showing particularly the relationship of the coils and contacts of the various electromagnetic switches mounted thereon.

The first fast speed accelerating switch FF does not operate immediately the circuit for its coil is established, being delayed as by a dashpot as shown in Figure 4. Upon operation, switch FF engages contacts FF570 and FF591, short-circuiting resistances 553, 575 and 599, thereby increasing the voltage applied to the fast speed stator windings of the elevator hoisting motor and thus increasing the torque exerted by the motor. It also engages contacts FF687, further preparing the circuit for coil SF686 of the second fast speed accelerating switch.

As the speed of the elevator hoisting motor increases, a switch 667 operated by the governor closes, connecting coil GR666 of the governor relay to wires GW and G+S through contacts UP662. This relay separates contacts GR700, for a purpose to be described later, and engages contacts GR690, completing a circuit for coil SF686 of the second fast speed accelerating switch. Switch SF, upon operation, engages contacts SF654, by-passing contacts AFS646 in the circuit for coil F645 of the fast speed switch. It also engages contacts SF571 and SF592, short-circuiting resistances 554, 576 and 600, connecting the fast speed stator windings of the hoisting motor directly to the supply mains for full speed operation.

When the car was positioned at the first floor, center direction cam section 376 was in engagement with the arm of first floor direction switch 362, and the up direction cam section 305 was in engagement with the arm of the second floor direction switch 324. As the car moves in the up direction, the up cam section moves into engagement with the arm of the third floor direction switch 295, opening this switch and transferring the circuit for coils UDR434, UA420 and UR421 to cam section 305 and the arm of switch 295. Also, the center direction cam section 376 successively disengages the first floor and second floor direction switches 362 and 324 as the car moves in the up direction, and these switches are transferred to down circuits.

As the car nears the third floor landing, up brushes 323 and 320 engage third floor stationary contacts 283 and 281 respectively. The engagement of brush 323 with contact 283 completes a circuit from wire GW through restoring coil 3U140 and contacts 3U154 of relay 3U, bus bar 3UH, contact 283, brush 323, contacts SR387, contacts UP437, coil PR471 of the pick up relay, resistance 496, to wire G+. The voltage thus applied to the reset coil of the third floor relay is not sufficient to reset this relay. Pick up relay PR, however, operates to separate contacts PR640 and engages contacts PR187 and PR634. The separation of contacts PR640 prevents the energization of restoring coil SL641 of the slow down switch upon engagement of contacts PR634. The engagement of contacts PR187 establishes a circuit for holding coil PR183 of the pick up relay from wire GW through brush 320 and stationary contact 281, contacts DN386, contacts UP437, coil PR471, resistance 496, to wire G+.

The engagement of contacts PR634 completes a circuit for coil PH635 of the pick up holding relay from wire GW through contacts AFS642 to wire G+. The pick up holding relay PH, upon operation, engages contacts PH637, by-passing contacts PR634 to establish a self-holding circuit. It also engages contacts PH483, establishing a short-circuit for coil PR471 of the pick up relay and a portion of resistance 496. The pick up relay is maintained operated, with coil PR471 short-circuited, by coil PR183. The short-circuit of coil PR471 and resistance 496, however, increases the voltage applied to restoring coil 3U140 of the up third floor relay sufficiently to cause this relay to be reset, restoring contacts 3U154 and 3U66 to open condition and contacts 3U172 to closed condition. The opening of contacts 3U66 breaks the circuit for coil 3FR50 of the auxiliary third floor relay, causing this relay to drop out. The dropping out of relay 3FR separates contacts 3FR31 to deenergize coil HC42 of the hall call relay. This relay in turn separates contacts HC492, the circuit for coil MG505, however, being maintained through contacts GN477, and separates contacts HC105 to remove the short-circuit for coil AHB103 of the auxiliary hall button relay, the circuit for this coil being open as no button is operated.

Just as or slightly before the engagement of brushes 320 and 323 with stationary contacts 281 and 283 takes place, up insulating roller 340 engages and lifts the arm of floor brush direction switch 295 for the third floor off cam section 305. This, together with the separation of contacts 3FR296, breaks the circuit for coils UDR434, UA420 and UR421 of the up and down relay, up auxiliary direction relay and up direction relay respectively. Up and down relay UDR drops out to reengage contacts UDR56 and UDR101 and separates contacts UDR13 and UDR672. Up auxiliary direction relay UA drops out to reengage contacts UA184 and UA460 and to separate contacts UA503, UA443 and UA702. Up direction relay UR drops out to reengage contacts UR322 and UR360 and to separate contacts UR451 and UR484. The function of contacts UDR56, UA184, UA503, UA443, UR322 and UR360 will be explained later. The purposes of contacts UA460, UDR101 and UR451 were served in starting the car. The circuit for coil AG655 is maintained through contacts UD656 after the separation of contacts UDR672. The separation of contacts UA702 extinguishes up direction indicating light 703 in the car while the separation of contacts UDR13 extinguishes the car in operation lights of the various floors. The separation of contacts UR484 in the circuit for coils UD480 and UP467 of the up and down switch and up reversing switch respectively does not effect the deenergization of these coils, the circuit for them being maintained through contacts UP463 and ASL403 and also through the contacts 326 of the up stop switch provided the car has passed sufficiently beyond the second floor to permit the switch to be reclosed.

Coil PR183 maintains the pick up relay operated until brush 320 leaves contact 281. When this disengagement occurs, the circuit for coil PR183 is broken and the pick up relay drops out to separate contacts PR187 and PR634 and to reengage contacts PR640. Inasmuch as the pick up holding relay PH is self-holding through contacts PH637, the reengagement of contacts PR640 completes the circuit through contacts PH637 for restoring coil SL641 of the slow down switch.

The energization of coil SL641 effects the unlatching of the slow down switch, and, due to the fact that the operating coil SL663 of the switch is deenergized, causes the separation of contacts SL644, SL665 and SL675. The separation of contacts SL665 is in preparation for the operation of restarting the car from the third floor. The separation of contacts SL644 deenergizes coil ASL643 of the auxiliary slow down switch, which separates its contacts ASL403, ASL404 and ASL486. The separation of contacts ASL486 is without effect as contacts UR484 have already opened. Contacts ASL404 perform the same function during downward operation of the car as is performed by contacts ASL403 during up operation. The separation of contacts ASL403 renders the up and down switch UD and up reversing switch UP subject to contacts 326 of the up automatic stop switch, these contacts being now closed. The separation of contacts SL675 deenergizes coil AFS674 of the auxiliary fast and slow speed switch. This switch drops out to reengage contacts AFS661 and to separate contacts AFS642, AFS416 and AFS646. The purpose of contacts AFS416 will be explained later. The separation of contacts AFS646 is without effect at this time as the circuit for coil F645 is maintained through contacts SF654. The separation of contacts AFS642 deenergizes coil PH635 of the pick up holding relay, this relay having now served its purpose. The reengagement of contacts AFS661 connects coil S652 of the slow speed switch to wires GW and G+S through contacts F653 and contacts UP662.

Slow speed switch S operates to engage contacts S620, S695, S560 and S582 and separates contacts S691. Contacts S620 by-pass contacts F614 of the fast speed switch in the circuit for the brake release coil. Contacts S695 prepare the circuit for coils FS693 and SS696 of the first and second slow speed retarding switches respectively. Contacts S560 and S582 connect the slow speed stator windings of the elevator hoisting motor to the supply mains. The separation of contacts S691 deenergizes coils FF683 and SF686 of the first and second fast speed accelerating switches respectively. The separation of contacts SF654 of the second fast speed accelerating switch, as a result of the deenergization of this switch, breaks the circuit for coil F645 of the fast speed switch, which drops out to separate contacts F555 and F577 to disconnect the fast speed stator windings of the elevator hoisting motor from the supply mains. The slow speed stator windings 557, 581 and 602 of the hoisting motor having already been connected to the supply mains by the engagement of contacts S560 and S582, the elevator motor circuits are changed over to slow speed stator windings. The circuit for phase winding 557 is from power main I through blade 544 of the service switch and coil OA545 of one of the overload relays, contacts UP547, phase winding 557, contacts S560, resistances 561 and 562 to star point 595. The circuit for phase winding 602 is from power main III through blade 552 of the service switch, coil OB551 of the other overload relay, contacts UP605, phase winding 602, resistances 603 and 604, to star point 595. The circuit for phase winding 581 is from power main II to blade 546 of the service switch, phase winding 581, contacts S582, resistances 583 and 584, to star point 595. The separation of contacts FF570, FF591 and FF687, as a result of the deenergization of coil FF683 and of contacts SF571 and SF592 as a result of the deenergization of coil SF686 is without effect, these contacts having already served their purposes. The purposes of contacts F481 and F482 will be explained later. The function of contacts F692 was served during the starting of the car. The separation of contacts F653 does not break the circuit for coil S652 of the slow speed switch, a circuit for this coil being maintained through resistance 660.

The change-over of the connections for the elevator hoisting motor from the fast speed stator windings to the slow speed stator windings causes the motor to act as a generator, exerting a regenerative braking effect to slow down the car. The electro-mechanical brake is maintained released during this change-over, the circuit for the brake release coil being through contacts S620 after the separation of contacts F614. At the instant this changeover is effected, resistances are in circuit with the slow speed stator windings softening the regenerative braking action to prevent any jolt to the car. The reengagement of contacts F694 upon the dropping out of the fast speed switch connects coil FS693 of the first slow speed retarding switch to wires GW and G+ through contacts S695. Switch FS does not operate immediately the circuit for its operating coil is completed, being delayed as by a dashpot (see Figure 4). This switch, upon operation, engages contacts FS573 and FS594, to short-circuit resistances 562, 584 and 604, thereby increasing the excitation of the motor for the regenerative braking action. Switch FS also engages contacts FS701 to complete the circuit for coil SS696 of the second slow speed retarding switch. This switch also does not operate immediately the circuit for its coil is completed, being delayed as by a dashpot (see Figure 4). The coil of switch SS is also subject to resistance 697 and contacts GR700 of the governor relay to control the timing and to insure the operation of the switch even though the load is such that it tends to keep contacts GR700 separated. Upon operation, switch SS engages contacts SS572 and SS593, short-circuiting resistances 561, 583 and 603, thereby applying full line voltage to the slow speed stator windings for the regenerative braking action. The control of regenerative braking in this way provides substantially constant retardation.

As the car arrives at a short distance from the third floor landing, roller 365 of the up automatic stop switch engages cam 286. This opens contacts 326 of the up automatic stop switch which, owing to the fact that the auxiliary slow down switch ASL has dropped out, breaks the circuit for coils UD480 and UP467 of the up and down switch and up reversing switch respectively.

The up and down switch UD, upon dropping out, separates contacts UD656 and UD541 and reengages contacts UD37 and UD407. The reengagement of contacts UD37 is without effect at this time as the circuit for coil NS411 of the non-start relay is open due to the fact that neither the hall button relay HB nor any of the auxiliary hall button relays are operated. The reengagement of contacts UD407 also is without effect at this time as cam 367 is disengaged from the arm of switch 381, this switch being closed, bypassing the cam and contacts UD407. The separation of contacts UD541 breaks the circuit for coil TR535 of the time relay. The separation of contacts UD656 breaks the circuit for coil AG655 of the auxiliary gate close relay.

The up reversing switch UP, upon dropping out, separates contacts UP463, UP437, UP615, UP547, UP605 and UP662 and reengages contacts UP457, UP684 and UP397. The purposes of contacts UP457, UP397 and UP437 were served during the starting and running of the car. The purpose of contacts UP684 is served at the upper terminal. The separation of contacts UP547 and UP605 disconnects the hoisting motor slow speed stator windings from the power mains. The separation of contacts UP615 breaks the circuit for brake release coil 612. The brake is thereupon applied to bring the elevator car to a stop at the third floor.

It is to be noted that, as the car arrives at the third floor, up direction cam section 305 disengages the arm of floor brush direction switch 295 and this arm is engaged by the center cam section 376. Thus, with the car at the third floor landing, the arm of the third floor direction switch is disconnected from the actuating coils of the direction relays.

Contacts UP463 served their purpose upon operation of switch UP, establishing a circuit for coils UD480 and UP467 which is subject to contacts 326 of the up automatic stop switch, thereby causing switches UD and UP to remain operated during up car travel until the car arrives at each floor at which a stop is made. The separation of contacts UP662 breaks the circuit for coil S652 of the slow speed switch, which drops out to separate contacts S620, S695, S560 and S582 to reengage contacts S691. The purposes of these contacts were served during slowing down of the car. The separation of contacts S695 breaks the circuit for coils FS693 and SS696 of the slow speed retarding switches, the purposes of the contacts of these switches also being served in effecting the slow down of the car.

The auxiliary gate close relay AG dropped out upon the breaking of the circuit for its coil AG655 by the separation of contacts UD656, separating contacts AG402, AG650 and AG507 and reengaging contacts AG366. The separation of contacts AG650 is without effect as the time cancelling relay TC is self-holding by way of contacts TC657. Contacts AG507 are in the circuit for the coil GC506 of the gate close relay, already broken at contacts G406 and gate close limit switch 415. The purpose of contacts AG402 will be described later. The reengagement of contacts AG366 connects coil GO490 of the gate open switch to wires GW and G+SE through contacts GC405, brush 345, contact 290, and gate open limit switch 347.

The gate open relay GO, upon operation, engages contacts GO533 to reestablish a circuit for coil TR535 of the time relay. The reestablishment of this circuit takes place before the expiration of the time interval provided for the time relay, causing the time relay to be restored to operated condition. The gate open relay also separates contacts GO673, these contacts serving as an electrical interlock for coil AG655 of the auxiliary gate close relay. The gate open relay also engages contacts GO566 and GO608, connecting the stator windings of the gate operating motor to the power supply mains for operating the gate operating mechanism to move the gate to open position as the car comes to a stop. As the gate starts to open, the gate close limit switch 415 closes in the circuit for coil GC506 of the gate close relay. Also, gate contacts 465 separate, breaking the circuit for coil G475 of the gate contact relay, which reengages contacts G406 in parallel with gate close limit switch 415. Contacts G406 and switch 415 are in the circuit for coil GC506, the circuit being open, however, at contacts AG507 of the auxiliary gate close relay. As the gate reaches open condition, gate open limit switch 347 opens, breaking the circuit for coils GN501 and GO490 of the generator holding relay and gate open relay respectively. The gate open relay drops out, separating its contacts GO566 and GO608 to deenergize the gate operating motor and to separate contacts GO533, deenergizing coil TR535 of the time relay. The time relay thereupon again starts to drop out.

The generator holding relay, upon dropping out, seperates contacts GN477 and reengages contacts GN411. The purpose of contacts GN411 will be explained later. The separation of contacts GN477 breaks the circuit for coil MG505 of the motor-generator starting relay.

The motor-generator starting relay, upon dropping out, separates contacts MG631, MG563 and MG564 and reengages contacts MG82. The purpose of contacts MG82 will be explained later. The separation of contacts MG563 and MG564 disconnects the stator windings of the generator driving motor from the supply mains, the separation of contacts MG631 disconnecting the generator from its positive feed wires G+, G+S and G+SE.

The motor-generator set slows down upon the discontinuance of the supply of power to its driving motor. As the slow down takes place, the voltage applied to coil P636 decreases to a value permitting potential relay P to drop out. This relay, upon dropping out, separates contacts P83, these contacts having already served their purpose.

As previously described, cam 716 (see Figure 1) is reextended in the gate opening operation. This unlocks the hatchway door at the third floor, separating door lock contacts 464. The door being unlocked, the intending passenger at the third floor may open the door in order to enter the car. As the door starts to open, door sequence contacts 531 separate, deenergizing coil DO532 of the door relay. This relay, upon dropping out, separates contacts DO651 and reengages contacts DO534.

The separation of contacts DO651 breaks the circuit for coil TC647 of the time cancelling relay. The time cancelling relay drops out, separating its holding contacts TC657 and reengaging contacts TC671, the purpose of which will be explained later. The reengagement of contacts DO534 reconnects coil TR535 of the time relay to power mains I and II, causing this relay to be restored to its operated condition.

Assume that the intending passenger at the third floor desires to be carried to the fourth floor and that he enters the car and presses the fourth floor car button 255. The hatchway door, upon being released, closes automatically, reengaging door sequence contacts 531 to reenergize coil DO532 of the door relay. This relay separates contacts DO534 to deenergize coil TR535 of the time relay and reengages contacts DO651, preparing the circuit for coil SL663 of the slow down switch as before. The pressing of the fourth floor car button connects coil 4C272 of the fourth floor car button relay 4C to mains I and II through service switch 182. This relay operates to engage contacts 4C273, connecting fourth floor floor controller contact 257 through restoring coil 4C256 of relay 4C to ground. Relay 4C also engages contacts 4C264, preparing the circuit for coils UDR434, UA420 and UR421 of the up and down relay, up auxiliary direction relay and up direction relay respectively. This relay also engages contacts 4C524, connecting coil CC520 of the car call relay to mains I and II. The fourth floor car button relay, being latched, remains in operated condition after the fourth floor car button is released.

The car call relay CC operates to engage contacts CC452 and CC504. Contacts CC452 are in the circuit for coil ST453 of the starting relay, the circuit for this relay being already completed through contacts ST432 and RR410, switch 200 and contacts UH225 in parallel, and switch 381. The engagement of contacts CC504 connects coil MG505 of the motor-generator starting relay to wires SI and SII, to cause the operation of the motor-generator starting relay to start the motor-generator set in operation and connect the generator to its supply wires G+, G+S and G+SE. This completes the circuit for the coils of the up and down relay UDR, up auxiliary direction relay UA and up direction relay UR. When the voltage of the generator builds up to a certain value, these relays operate to cause the closing of the gate and the starting of the car in the up direction in the manner previously described for starting the car in response to the up third floor hall button. It is not believed that the description of this operation need be repeated. The car is started whether the time relay has dropped out or not as contacts 4C264 are not subject to contacts TR447 of the time relay and as contacts TR664 of the time relay are by-passed by contacts TC671 of the time cancelling relay. The circuit for the coils of these relays is from grounded wire GW through coils UDR434, UA420, UR421, contacts DN422, contacts DA435, switch blade 423, up direction cam section 305, the arm of floor brush direction switch 274, contacts 4C264, to wire G+S.

As the car nears the fourth floor landing, up brushes 317 and 320 engage fourth floor stationary contacts 257 and 260 respectively. The engagement of brush 317 with contact 257 completes a circuit from wire GW through restoring coil 4C256 and contacts 4C273 of relay 4C, contact 257, brush 317, contacts DN386, contacts UP437, coil PR471 of the pick up relay, resistance 496, to wire G+. Pick up relay PR operates to establish a circuit for its holding coil PR183 and to complete the circuit for coil PH635 of the pick up holding relay, as before. The pickup holding relay PH operates to establish a short-circuit for coil PR471 and a portion of resistance 496 to increase the voltage applied to coil 4C256 sufficiently to cause relay 4C to be reset. The consequent separation of contacts 4C264 together with the engagement of up insulating roller 340 with the arm of fourth floor direction switch 274 which occurs at the same time breaks the circuit for coils UDR434, UA420 and UR421 of the up and down relay, up auxiliary direction relay and up direction relay respectively. The separation of contacts 4C524 breaks the circuit for coil CC520 of the car call relay. The resultant separation of contacts CC504 does not break the circuit for coil MG505 of the motor-generator starting relay, the circuit for this coil being maintained as before by contacts GN477 of the generator holding relay.

Coil PR183 maintains the pick up relay operated until brush 320 leaves contact 260. When this occurs, relay PR drops out to complete a circuit for restoring coil SL641 of the slow down switch. This causes the circuits for the hoisting motor to be transferred to the slow speed windings, slowing down the car.

Just before the car reaches the fourth floor landing, the up automatic stop switch 326 is opened by cam 265, causing the hoisting motor stator windings to be disconnected from the power supply mains and the brake to be applied to bring the car to a stop. Circuits are set up incident to the stopping of the car at the fourth floor to cause the gate operating mechanism to move the gate to open position. Gate open limit switch 347 is opened as the gate reaches open condition, causing the deenergization of generator holding relay GN. Relay GN, upon dropping out, causes the disconnection of the driving motor of the motor-generator set from the supply mains. The fourth floor hatchway door is unlocked incident to the gate opening operation so that the passenger in the car may open the door and step from the car, the door upon being released returning automatically to closed condition.

If a push button is pressed which requires travel of the car in the down direction in order to respond thereto, the car is started in the down direction and slowed down and stopped at the landing for which the push button is provided in a manner similar to that which has been described for the up direction of car travel. Assume that with the car positioned at the fourth floor an intending passenger at the second floor desires to be carried to the first floor and presses the second floor down hall button 107. This completes a circuit for coil 2D130 of the down second floor relay 2D. The operation of relay 2D is effected through the operation of relays AHB, HB and HC as described for starting the car in the up direction in response to the pressing of the third floor up hall button 112. Relay 2D engages contacts 2D160 to connect floor controller contact 303 to grounded wire GW through restoring coil 2D144. It also engages contacts 2D64 preparing a circuit for coil 2FR47 of the auxiliary second floor relay. The hall call relay HC, by effecting the operation of motor-generator starting relay MG, also causes the reconnection of the driving motor of the motor-generator set to the power mains. Upon the operation of potential relay P as the generator voltage reaches a predetermined value, a circuit is completed for coil 2FR47 of the auxiliary second floor relay, which engages contacts 2FR325 connecting coils UDR434, DA455 and DR456 of the up and down relay, down auxiliary direction relay and down direction relay respectively to the supply wires GW and G+S. This circuit is from wire GW through coils UDR434, DA455 and DR456, contacts UP457 and UA460, blade 444 of the service inspection switch, down section 425 of the direction cam, the arm of third floor direction switch 295, second floor direction switch 324, contacts 2FR325, contacts ST391, and contacts TR447 (assuming the time interval of time relay TR has expired), to wire G+S.

Down auxiliary direction relay DA upon operation separates contacts DA185 in a circuit for holding coil PR183 of the pick up relay. It also separates interlock contacts DA435 in the circuit for coils UA420 and UR421. It engages contacts DA515 in a circuit for coil ST453a of elevator No. 2 starting relay and engages contacts DA396 in the circuit for coil AS394 of the auxiliary starting relay. It also engages contacts DA704, completing a circuit for down direction lamp 705 in the elevator car.

Down direction relay DR, upon operation, separates contacts DR375 and DR336 in circuits for floor controller brushes 361 and 337 respectively. It also engages contacts DR450, by-passing contacts TR447, and engages contacts DR485, preparing a circuit for coil DN494 of the down reversing switch and coil UD480 of the up and down switch respectively.

The operation of up and down relay UDR has already been described. It deenergizes the hall button relay HB, which separates contacts HB36 in the circuit for coil HC42. Coil HC42 is maintained energized through contacts 2FR30. Relay UDR also energizes the car in operation lights and completes the circuit for coil SL663 of the slow down switch.

The slow down switch SL operates as before to effect the operation of auxiliary slow down switch ASL and auxiliary fast and slow speed switch AFS and to effect the operation of auxiliary gate close relay AG to cause the closing of the car gate and the locking of the fourth floor hatchway door. The resultant closing of gate contacts 465 and door lock contacts 464 connects coil DN494 of the down reversing switch and coil UD480 of the up and down switch to wires GW and G+SE through contacts F482 of the fast speed switch and terminal stopping switch contacts 495 in parallel, terminal stopping switch contacts 497, contacts DR485, contacts ASL486, door lock contacts 464 and gate contacts 465.

The operation of the up and down switch UD has already been described. Down reversing switch DN, upon operation, engages contacts DN500, DN440, DN621, DN598, DN550 and DN670, and separates contacts DN422, DN681 and DN386. Contacts DN422 serve as an electrical interlock in the circuit for coils UA420 and UR421. Contacts DN681 are in the circuit for coil AFS674 of the auxiliary fast and slow speed switch and serve to render this switch subject to terminal stopping switch 685 in making a lower terminal stop. The separation of contacts DN386 renders up car stop brush 317 and auxiliary up car stop brush 320 ineffective during down car travel. Contacts DN500 establish an additional circuit for coils UD480 and DN494 through contacts ASL404. Contacts DN440 connect brushes 374, 372 and 373 to wire G+ through contacts UP397 and SR400 and coil PR471 of the pick up relay. Contacts DN621 prepare the circuit for brake release coil 612. Contacts DN598 and DN550 are in the circuits for the stator windings of the elevator hoisting motor. Contacts DN670 connect coil F645 of the fast speed switch to supply wires GW and G+S through contacts AFS646. The operation of fast speed switch F has already been described, contacts F614 completing a circuit for brake release coil 612 and contacts F555 and F577 completing the circuits for the fast speed stator windings 556, 580 and 601 of the elevator hoisting motor to start the car. Owing to the fact that contacts DN598 and DN550 are in engagement instead of contacts UP547 and UP605, phase winding 556 is connected to power main III instead of power main I and phase winding 601 is connected to power main I instead of power main III. Thus the car is started in the down direction. The first and second fast speed accelerating switches FF and SF operate as previously described to short-circuit the resistances in series with the fast speed stator windings to connect these windings directly to the power mains. The circuit for the down direction relays is maintained during downward travel of the car owing to the fact that down cam section 425 is made long enough so that at the time a direction switch arm is lifted off the cam section by insulating roller 401, the cam section has already moved into engagement with the direction switch arm next below.

As the car nears the second floor landing, down brushes 374 and 373 engage second floor stationary contacts 303 and 302 respectively. The engagement of brush 374 with stationary contact 303 completes a circuit from wire GW through restoring coil 2D144 and contacts 2D160 of relay 2D, bus bar 2DH, contact 303, brush 374, contacts SR400, contacts DN440, coil PR471 of the pick up relay, resistance 496, to wire G+. The pick up relay operates as before to energize its holding coil PR183 and coil PH635 of the pick up holding relay. The circuit for holding coil PR183 is from wire GW through contacts PR187, floor controller stationary contact 302, brush 373, contacts UP397, contacts DN440, coil PR471 and resistance 496, to wire G+. The pick up holding relay operates as before to establish a short-circuit for coil PR471 and a portion of resistance 496 to increase the voltage applied to coil 2D144 sufficiently to cause relay 2D to be reset. The resultant separation of contacts 2D64 breaks the circuit for coil 2FR47 of the auxiliary second floor relay, causing this relay to drop out. Down insulating roller 401 engages and lifts the arm of second floor brush switch 324 off cam section 425 at the same time the brushes engage the second floor stationary contacts. This, together with the separation of contacts 2FR325 as a result of the deenergization of the auxiliary second floor relay, breaks the circuit for coils UDR434, DA455 and DR456 of the up and down relay, down auxiliary direction relay and down direction relay respectively. Up and down relay UDR drops out to reengage contacts UDR56 and UDR101 and separates contacts UDR13 and UDR672. Down auxiliary direction relay DA drops out to reengage contacts DA435 and to separate contacts DA515, DA396 and DA704. Down direction relay DR drops out to reengage contacts DR375 and DR336 and to separate contacts DR450 and DR485. The function of contacts UDR56, DA185, DA515, DA396, DR375 and DR336 will be explained later. The purposes of contacts UDR672, DA435, UDR101 and DR450 are served in starting the car. The separation of contacts DA704 extinguishes down direction indicating light 705 in the car while the separation of contacts UDR13 extinguishes the car in operation lights. The separation of contacts DR485 does not deenergize coils UD480 and DN494, the circuits for these coils being maintained through contacts DN500 and ASL404 and also through contacts 380 of the down stop switch provided the car has passed sufficiently below the third floor to permit the switch to be reclosed.

Coil PR183 maintains the pick up relay operated until brush 373 leaves contact 302. When this occurs, relay PR drops out, completing a circuit for restoring coil SL641 of the slow down switch. This causes the circuits for the hoisting motor to be transferred to the slow speed windings, slowing down the car. The reset of the slow down switch also effects the deenergization of the auxiliary slow down switch ASL to separate its contacts ASL404, rendering coils UD480 and DN494 of the up and down switch and down reversing switch respectively subject to the control of the down automatic stopping switch 380.

Just before the car reaches the second floor landing, down automatic stop switch 380 is opened by cam 311, breaking the circuit for coil DN494 of the down reversing switch and coil UD480 of the up and down switch. The resultant separation of contacts DN598 and DN550 disconnects the hoisting motor stator windings from the power supply main. Also, the separation of contacts DN621 breaks the circuit for brake release coil 612. The brake is thereupon applied to bring the elevator car to a stop at the second floor. As the car comes to a stop the gate is opened and the hatchway door unlocked as previously described, so that the passenger may open the hatchway door and enter the car.

Response to a car button requiring down car travel is effected in a similar manner, and it is believed that such operation will be understood from a brief outline of the operations involved in view of previous description. Assume that a passenger enters the car at the fourth floor and presses the second floor car button 297. The second floor car button relay 2C operates, causing the operation of the car call relay CC, which acts to start the motor-generator set in operation. Relay 2C also prepares a circuit for the coils of the down direction relays which is completed, upon operation of the motor-generator starting relay MG in response to operation of the car call relay CC, to cause the down direction relays to operate when the voltage of the generator builds up to a certain value. The closing of the gate and the closing and locking of the fourth floor hatchway door cause the car to be started in the down direction. As it nears the second floor landing, brushes 372 and 373 engage contacts 301 and 302 respectively. The engagement of brush 372 with contact 301 completes a circuit for restoring coil 2C300 of the second floor car button relay through coil PR471 of the pick up relay via contacts UP397 and DN440. The pick up relay operates as before to effect the operation of pick up holding relay PH which, by short-circuiting a portion of resistance 496, effects the reset of relay 2C. When brush 373 disengages contact 302, the pick up relay drops out to complete the circuit for restoring coil SL641 of the slow down switch. This switch is therefore reset, which causes the hoisting motor circuits to be transferred to the slow speed windings, slowing down the car. As the car reaches the second floor, down automatic stop switch 380 is opened by cam 311, causing the car to be brought to a stop.

The car is slowed down and stopped in response to a down hall button during up car travel and in response to an up hall button during down car travel under conditions where no circuits are set up which require the car to travel beyond the floor at which the button is located. Assume, for example, that with the car at the ground floor an intending passenger at the second floor desires to be carried to the first floor and presses the down second floor hall button 107. This causes the operation of down second floor relay 2D and the auxiliary second floor relay 2FR as previously described. The resultant engagement of contacts 2FR325 connects coils UDR434, UA420 and UR421 of the up and down relay, up auxiliary direction relay and up direction relay respectively to supply wires GW and G+S. This circuit is from wire GW through coils UDR434, UA420, UR421, contacts DN422 and DA435, switch blade 423, up section 305 of the direction cam, the arm of second floor direction switch 324, contacts 2FR325, contacts ST391, contacts TR447, to wire G+S. This causes the closing of the gate and the locking of the first floor hatchway door, whereupon the car is started in the up direction as previously described.

As the car nears the second floor landing, up insulating roller 340 engages and lifts the arm of second floor brush switch 324 off cam section 305 which breaks the circuit for coils UDR434, UA420 and UR421 of the direction relays. Brush 321 engages stationary contact 303 at the same time or immediately after roller 340 engages the arm of switch 324. Thus, the reengagement of contacts UR322 as a result of the deenergization of up direction relay UR completes a circuit from wire GW through restoring coil 2D144 and contacts 2D160 of relay 2D, bus bar 2DH, contact 303, brush 321, contacts UR322, contacts SR387, contacts UP437, coil PR471 of the pick up relay, resistance 496, to wire G+. The pick up relay operates as before to effect the operation of the pick up holding relay PH which, by short-circuiting the portion of resistance 496, effects the reset of relay 2D.

Pick up relay PR is maintained operated until brush 320 leaves contact 302. When this occurs, relay PR drops out to complete a circuit for restoring coil SL641 of the slow down switch. The reset of the slow down switch causes the hoisting motor circuits to be transferred to the slow speed windings, slowing down the car. As the car reaches the second floor landing, up automatic stop switch 326 is opened by cam 310, causing the car to be brought to a stop.

The system operates in a similar manner to start the car in the down direction in response to the pushing of an up hall button for a floor below the one at which the car is positioned and to stop the car, while travelling in the down direction, at the floor for which the hall button is pushed, under conditions where no circuits are set up for causing the car to travel below that floor. Brush 361 is rendered "alive" for this operation by the reengagement of contacts DR375 as a result of the lifting of the arm of the floor brush switch for the floor at which the button is located off the down section of the direction cam.

In each of the above examples it was assumed that only one button was pushed and it was shown that the car may be started in response to either a car button or a hall button, with the direction of travel determined by the position of the car with respect to the floor for which the button was pushed, regardless of whether it was a car button or an up or a down hall button. It was also shown that the car was stopped automatically at the floor for which the button was pushed. The system also operates to stop the car at each floor at which a button was pushed in the event more than one button was pressed, thus giving "collective" push button operation. This stopping is in the natural order of floors in each direction of travel regardless of the order in which the buttons are pushed.

In order that the operation of the system to provide "collective" operation may be readily understood, it will be assumed that, with the car at rest at the first floor, a passenger enters the car and pushes the fourth floor car button 255. This causes the operation of fourth floor car button relay 4C which, through the engagement of its contacts 4C524, causes the operation of car call relay CC to effect the starting of the motor-generator set. The engagement of contacts 4C273 renders floor controller contact 257 "alive", and the engagement of its contacts 4C264 completes the circuit for the coils of the up and down relay UDR and up direction relays UA and UR. Relay UR prepares the circuit for the coils of the up and down switch and up reversing switch which operate, upon the closing of the car gate and locking of the hatchway door, to start the car in the up direction.

Assume further that before the engagement of brush 321 with contact 303 the down second floor hall button 107 is pressed to render contact 303 "alive". The engagement of this contact by brush 321, however, does not complete a circuit as contacts UR322 are opened, rendering brush 321 "dead". Thus the car passes the second floor without responding to the down hall button at that floor.

Assume still further that before the engagement of brush 323 with contact 283 up third floor hall button 112 is pressed to render contact 283 "alive". It is to be noted that with the hall call relay HC already operated as a result of the pressing of the down second floor hall button, contacts HC105 are in engagement so that the up third floor relay 3U is operated without the operation of relays AHB and HB. The engagement of brush 323 with contact 283 completes a circuit through restoring coil 3U140 of the up third floor relay for coil PR471 of the pick up relay. The pick up relay operates as before to cause operation of the pick up holding relay PH which, by establishing a short-circuit for coil PR471 and a portion of resistance 496, effects the reset of relay 3U. The restoration of the third floor relay causes relay 3FR to drop out. The separation of contacts 3FR296 and the lifting of the arm of third floor direction switch 295 off cam section 305, however, do not break the circuit for the coils of the direction relays, this circuit being maintained through cam section 305, the arm of fourth floor direction switch 274, and contacts 4C264 of the fourth floor car button relay. When brush 320 leaves contact 281, relay PR drops out to complete a circuit for the restoring coil of slow down switch SL. This, as previously explained, causes the car to be slowed down and as it reaches the third floor it is brought to a stop by the opening of automatic stopping switch 326.

The car gate being open and the third floor hatchway door being unlocked as the car is brought to a stop, the intending passenger may open the door and step into the car. The time relay TR acts to prevent the restarting of the car until the intending passenger has had a reasonable time to open the door. As previously explained, the coil of the time relay is maintained energized during operation of the car by contacts UD541 of the up and down switch. As the car comes to a stop, the separation of contacts UD541 deenergizes the coil of the time relay but this coil is immediately reenergized by the engagement of contacts GO533 of the gate opening relay as the gate starts to open. When the gate reaches open position, contacts GO533 separate, again deenergizing the coil of the time relay.

Time relay contacts TR664 are therefore maintained separated, preventing the energization of coil SL663 of the slow down switch to effect the reclosing of the gate and the starting of the car until the time interval for which the time relay is set has expired. This gives the intending passenger time to open the hatchway door and enter the car.

When the intending passenger opens the door, door sequence contacts 531 separate and deenergize coil DO532 of the door relay. The door relay reengages contacts DO534 to reenergize time relay coil TR535, restoring the time relay from the point to which it has dropped out to operated condition. The door relay also separates contacts DO651, which breaks the holding circuit through contacts TC657 for coil TC647 of the time cancelling relay. This relay reengages contacts TC671, by-passing contacts TR664 of the time relay in the circuit for coil SL663 of the slow down switch. Thus, upon the passenger releasing the door as he steps into the car, the circuit for operating coil SL663 of the slow down switch is completed immediately the door reaches closed position to effect, through the engagement of door sequence contacts 531, the operation of door relay DO to engage contacts DO651. The slow down switch SL, acting through auxiliary gate close relay AG and gate close relay GC, as previously explained, causes the gate operating mechanism to start closing the gate immediately without waiting upon the expiration of the time interval provided by time relay TR to engage contacts TR664. The direction of travel being established, owing to the fact that the direction relays are maintained operated by contacts 4C264 of the fourth floor car button relay, the car is started in the up direction as the gate reaches closed position.

It will be assumed that the passenger who entered the car at the third floor also desires to be taken to the fourth floor and presses the fourth floor car button. This has no other effect than to reenergize operating coil 4C272 of the fourth floor car button relay, this relay being operated as a result of the previous pressing of the fourth floor car button by the passenger who entered the car at the first floor. Upon the engagement of floor controller stationary contacts 257 and 260 by brushes 317 and 320 respectively, circuits are set up which cause the fourth floor car button relay to be reset and the car slowed down and brought to a stop at the fourth floor landing as previously described. The direction relays are dropped out during this operation for, with no buttons pushed for floors above the fourth floor, there is no circuit remaining to maintain the coils of the direction relays energized.

Upon the passengers stepping from the car and the reclosure of the fourth floor hatchway door, contacts DO651 reengage to prepare the circuit for coil SL663 of the slow down switch, this circuit being open at contacts UDR672 of the up and down relay. Upon the reengagement of contacts TR447 of the time relay, a circuit is established for coil UDR434 of the up and down relay, coil DA455 of the down auxiliary direction relay and coil DR456 of the down direction relay through down direction cam section 425, the arm of third floor direction switch 295, second floor direction switch 324, and contacts 2FR325 of the second floor auxiliary floor relay, operated as a result of the previous operation of the down second floor hall button. This causes the direction relays to operate, the engagement of contacts DR485 preparing a circuit for coil UD480 of the up and down switch and coil DN494 of the down reversing switch. The engagement of contacts UDR672 completes the circuit for coil SL663 of the slow down switch. This switch causes the closure of the car gate and the locking of the fourth floor hatchway door, thereby reengaging gate contacts 465 and door lock contacts 464. This completes the circuit for coil UD480 of the up and down switch and coil DN494 of the down reversing switch, causing the starting of the car in the down direction. As the car arrives at a certain distance from the second floor, it is caused to slow down and finally brought to a stop at the second floor landing. This operation has previously been described and repetition is believed unnecessary.

It will be seen from the above description that, when the car is travelling in the up direction, stops are made in response to up hall buttons and car buttons in the natural order of floors regardless of the order in which the buttons are pressed. A stop is also made in response to a down hall button provided no push buttons for floors beyond remain to be responded to. So long as a car button or hall button for a floor above the floor at which a stop is about to be made has been pressed before the reset of the floor relay for the floor at which the stop is about to be made, a circuit is maintained for the coils of the up direction relays through contacts UR451, thereby causing the car to restart in the up direction after the transfer of passengers at that floor has been effected and the door reclosed. Similarly, when the car is travelling in the down direction, stops are made in response to all down hall buttons and car buttons in the natural order of floors regardless of the order in which the buttons are pushed. A stop is also made in response to an up hall button provided no push buttons for floors beyond remain to be responded to. These operations and the restarting of the car after each stop are effected in a manner similar to that in which corresponding operations are effected during travel in the up direction.

During collective operation, the car, if it is to continue in the same direction, is restarted immediately upon the closure of the door and car gate without waiting on the expiration of the time interval of the time relay TR to reengage contacts TR447, additional circuits for the direction relays during up car travel being established through contacts UR451 of the up direction relay and additional circuits for the direction relays during down car travel being established through contacts DR459 of the down direction relay. A down hall button is not responded to during up car travel when push buttons are operated for floors above the one at which the down hall button is located. Also, an up hall button is not responded to during down car travel when push buttons are operated for floors below the one at which the up hall button is located. This has been illustrated for up car travel by showing that the second floor down hall button is not responded to during up car travel under conditions where the third floor up hall button and fourth floor car button were operated due to the fact that brush 321 is "dead". If the up third floor hall button had been pressed in the previous example where the car travelled from the fourth floor to the second floor in response to the down second floor hall button, a stop at the third floor during downward car travel in response to the up third floor hall button would not be made owing to the fact that brush 361 is "dead" during down car travel, its circuit being open at contacts DR375, thereby preventing the establishment of a circuit for the pick up relay upon the engagement of this brush with third floor contact 283. The car therefore does not respond to this button during its downward travel but will make a stop in response thereto on its next up trip. In other words, contacts UR322 and DR375 serve to prevent response to any push button for the direction opposite to that in which the car is travelling when buttons have been operated for floors beyond.

Where both an up hall button and a car button for the same floor are pressed, the car, in travelling in the up direction toward the floor for which these buttons are provided, is caused to slow down and stop at that floor. Both the car button floor relay and the up hall button floor relay for that floor are reset incident to this operation by the action of the pick up holding relay PH to increase the voltage applied to the restoring coils of these relays. The same is true where for down car travel a car button and a down hall button for the same floor are pressed. If, however, a down hall button is pressed at a floor and a car button or the up hall button for the same floor is pressed, the car in its travel in the up direction is caused to slow down and stop at that floor but the floor relay for the down hall button is not reset if any push button for a floor above has been pressed owing to the fact that contacts UR322 are separated, preventing the establishment of a circuit for the down floor relay restoring coil. The down floor relay is therefore maintained operated so as to stop the car at that floor as it arrives thereat in the down direction. The up direction light 103 in the car, being lighted when the stop is made at that floor in the up direction, advises the intending passenger who pressed the down hall button that the car is to leave that floor in the up direction and therefore not to enter the car. Similar operation is had where an up hall button is pressed at the same floor for which a car button or down hall button is pressed and the car arrives at that floor in the down direction under the condition where a button for any floor below has been pressed.

The motor-generator set is maintained operated until all push buttons have been responded to and the gate has been moved to open position at the floor at which the last stop is made. Either the car call relay CC or the hall call relay HC or both act to maintain coil MG505 of the motor-generator starting relay operated and therefore the motor-generator set in operation so long as push buttons remain to be responded to. When no further push buttons remain to be responded to, upon a stop being made, so that both contacts CC504 and HC492 are open, the circuit for coil MG505 is maintained through contacts GN477 of the generator holding relay until the car has been brought to a stop and the gate moved to fully open condition. This insures a supply of power for the various control switches fed by the generator until all control operations have been performed to effect the slow down and stopping of the car and the opening of the gate.

A push button at a floor may be pressed more than once before the car is brought to a stop at the floor at which the button is located. Such repressing of the push button may occur after the floor relay for that button has been reset incident to the answering of the call. A floor relay operated in response to such late pressed push button is again reset by means of brushes 335 and 337, brush 337 serving for up car travel and brush 335 for down car travel. Assume, for example, that the car in its upward travel is slowing down at the third floor in response to a call registered by the up third floor hall button and that this hall button is repressed while the car is being slowed down. This causes the reoperation of the third floor relay 3U to engage contacts 3U154. As the car arrives at the third floor, brush 337 moves into engagement with contacts 283. Upon the car being brought to a stop and the gate moved to open position, contacts GN411 reengage, completing a circuit for reset coil 3U140 of the relay. This circuit is from wire GW through coil 3U140, contacts 3U154, bus bar 3UH, contact 283, brush 337, contacts DR336, coil AR390 of the auxiliary reset relay, contacts GN411, contacts SR412, center section 376 of the direction cam, the arm of third floor direction switch 295, contacts 3FR296, contacts ST391, contacts UR451 if the up direction relay is maintained operated, if not, through contacts TR447, to wire G+S. This causes the up third floor relay to be again reset.

A similar action takes place in case of a late repressed down hall button under conditions where the car during downward travel is stopping at the floor at which the button is located. It is believed that this will be understood from the description given of the reset of the floor relay reoperated in response to a late pressed up hall button.

Contacts UR360 render brush 335 ineffective during up car travel unless a stop is made at a floor under conditions where no further calls in the up direction remain to be responded to. Similarly, contacts DR336 render brush 337 ineffective during down car travel unless a stop is being made at a floor under conditions where no further calls in the down direction remain to be responded to. Contacts GN411 prevent the reset of a floor relay by these intermediate brushes when the car is running past the floor for which the relay is provided.

It may happen that a push button at the floor at which the car is standing may be pressed. Under such conditions, the above arrangement acts to effect the reset of the floor relay provided the car gate has not started to close. In order that this may be understood, assume that the car is standing at the third floor and that an intending passenger presses the up third floor hall button without noticing that the car is there. If this button is pressed before the car gate starts to close, as for example due to the pressing of a push button at some other floor, the floor relay is reset as above described. Should the gate operating mechanism be energized to start the closure of the car gate, coil GN501 of the generator holding relay is energized, effecting the separation of contacts GN411 and preventing the establishment of the circuit through brush 337 to effect the reset of the up third floor relay. If, before the hatchway door becomes locked, the intending passenger opens the door, the gate is returned to open condition. This is caused by the separation of the door sequence contacts to deenergize auxiliary gate close relay AG and thus effect the separation of contacts AG597 to deenergize gate close relay GC, and the engagement of contacts AG366 to energize gate open relay GO. In this way the intending passenger may enter the car and, owing to the reopening of gate open limit switch 347 to deenergize coil GN501 of the generator holding relay, contacts GN411 reengage, effecting the reset of the up third floor relay.

Should a push button at a floor at which a car is standing be pressed under conditions where a car is idle at that floor with the motor-generator set shut down, the reset of the floor relay is assured by preventing the completion of the reset circuit until the corresponding auxiliary floor relay has operated. Assume again that the up third floor hall button is pressed and that the car is idle at the third floor. The pressing of this push button operates hall button relay HB and hall call relay HC as before. Hall call relay HC causes the starting of the motor-generator set. Upon the building up of the generator voltage to a certain value, the auxiliary third floor relay 3FR is operated to complete by its contacts 3FR296 the circuit previously described through brush 337 and contact 283 for restoring coil 3U140 of the up third floor relay. At the same time it engages contacts 3FR31 to by-pass contacts HB36 in the circuit for the coil of relay HC. The auxiliary reset relay AR operates, upon the completion of the reset circuit for the up third floor relay, to separate contacts AR96, deenergizing relay HB. Relay HC, however, is maintained operated by contacts 3FR31 to insure the continuance of operation of the motor-generator set until the up third floor relay is reset. The reset of the up third floor relay causes deenergization of the auxiliary third flood relay which separates contacts 3FR31 to deenergize relay HC, stopping the motor-generator set.

In the case of the pressing of the car button for a floor at which the car is idle, the motor-generator set is maintained in operation by contacts CC504 of the car call relay until the car button relay for that floor has been reset.

When the car is idle at a floor a passenger, upon entering the car, is given preference in starting the car so that he may cause the car to travel in the direction toward the floor to which he desires to be carried. This preference starts immediately he opens the hatchway door, since this causes the operation of time relay TR to separate its contacts TR447. This prevents the establishment of a circuit for the coils of either set of direction relays in response to a hall button as the hall button acts through contacts of the corresponding auxiliary floor relay FR, the circuit through which is subject to the contacts TR447 of the time relay. The car button, however, establishes a direction circuit through contacts of its floor relay which are not subject to contacts TR447 but are connected to wire G+S direct. The passenger therefore, upon entering the car, has the time interval provided by time relay TR after the hatchway door closes in which to press his car button. The hatchway door, upon reclosing causes the separation of contacts DO534 to deenergize coil TR535 of the time relay. Thus, if the car button is not pressed before the time interval provided by the time relay expires, the reengagement of contacts TR447 permits the establishment of the direction circuit by a hall button.

This preference is also given to a passenger entering the car at a floor at which the last stop is made in the direction in which the car has been travelling. This is due to the fact that the established circuit for the direction relays is broken incident to answering the call at the floor at which such last stop is to be made, and cannot be reestablished by a hall button except upon reengagement of contacts TR447 of the time relay. A passenger entering the car at that floor may establish a direction circuit without waiting on the time interval of the time relay as the contacts of the car button relay are not subject to contacts TR447 of the time relay. Thus, an intending passenger at the floor at which the last stop is made, upon being taken into the car, may be carried to his destination without the possibility of having first to travel in the opposite direction.

This preference to entering passengers is given even though hall buttons have previously been pressed which, if then responded to, would cause the car to travel in a direction from the floor at which the last stop is made opposite to that in which it approached the floor. If, in answering the farthest call in the direction in which the car is travelling, a hall button is pressed for a floor beyond after the engagement of the brush with the stationary floor controller contact for such farthest call and the lifting of the arm of the direction switch for the floor for which such farthest call is registered to break the circuit for the direction relays for the direction in which the car is travelling, such hall button for a floor beyond cannot reestablish the circuit for the direction relays as contacts TR447 are separated and the direction relay contacts (UR451 or DR450) previously by-passing these contacts are opened as a result of the breaking of the direction circuit. Therefore, the direction preference which is given an intending passenger on a last stop in either direction is in effect started from the instant the call which was registered by this passenger is picked up.

The time relay TR, as previously explained, also serves to provide sufficient time for the opening of the hatchway door at a floor at which a stop is made. However, should the door not be opened within this time interval, as for example when an intending passenger changes his mind and does not desire the use of the car, and other calls are to be responded to, the gate is reclosed upon engagement of contacts TR664 and the car started.

It is seen from previous description that response is had to all push buttons regardless of the time or order in which the buttons are pushed, since the contacts of the floor relays, once in engagement, are maintained so until released by reset operations. Stops are made in the natural order of floors even though the buttons are pressed out of said order. Car buttons cause the stopping of the car regardless of whether it is travelling in the up or down direction. As regards the hall buttons, however, during up car travel the car stops in response to all up hall buttons, and also in response to a down hall button provided no buttons remain unresponded to for floors above the floor corresponding to this down hall button. Similarly, during down car travel the car stops in response to all down hall buttons, and also in response to an up hall button provided no buttons remain unresponded to for floors below the floor corresponding to this up hall button. It is to be noted that when, with the car travelling in a certain direction, a hall button for that direction is pressed after brush 320 for up car travel and brush 373 for down car travel disengages its stationary contact for the floor at which the push button is located and the car is not making a stop at that floor in response to the car button or other hall button for that floor, the car reverses after its last stop in that direction and stops at that floor while travelling in the opposite direction provided there are no push buttons pressed for floors beyond that floor. If such buttons are pressed, the car reverses again after its last stop in the opposite direction and proceeds to that floor, where it is stopped. Thus, response is had to all push buttons regardless of the time the buttons are pressed.

As regards starting the car, with the car at rest at any floor, it starts in response to the pushing of any button, either car or hall button, other than for the floor at which the car is positioned. The car cannot be started in response to the pressing of a button for the floor at which the car is standing owing to the fact that the floor controller direction switch for that floor is in engagement with the center section 376 of the direction cam which is disconnected from the coils of both sets of direction relays. The direction of travel of the car is determined by the position of the car with respect to the floor corresponding to the button pressed and not, in the case of a hall button, whether an up or a down hall button is pressed. Once the car is started in a certain direction, additional circuits may be established by car and hall buttons to maintain that direction of travel. Once the direction of travel has been established and additional circuits have been completed for the coils of the direction relays for that direction of travel, the car is started automatically in the same direction after each stop immediately the door and gate reach closed position, so long as any of these additional circuits exists. Should push buttons also be operated for floors in a direction from the car opposite to that in which the car is travelling, the car is reversed, after completing its travel in the first direction, to answer these other calls.

Should the car be at rest at a certain floor and an intending passenger at that floor open the hatchway door prior to the pushing of any hall button, he is given preference as to the establishing of the direction of car travel. Also, should the last stop in either direction be in response to a hall button, preference is given the intending passenger as to determining the direction of car travel. To insure this preference when, at the time the car button is pressed to effect the engagement of the car button floor relay contacts in the direction determining circuits, contacts of auxiliary floor relays for floors above and below the car are operated, resistances are included in the circuits for the auxiliary floor relay contacts. This eliminates any possibility of the direction relays for the opposite direction of travel being operated. That this may be understood, assume that the car made a stop at the third floor in response to the up hall button at that floor, that the down hall button for the second floor had previously been operated so that contacts 2FR325 are in engagement and that prior to the pressing of say the fourth floor car button by the passenger who entered the car at the third floor, the up fourth floor hall button is pressed. This would cause contacts 4FR275 as well as contacts 2FR325 to be in engagement at the time contacts 4C264 engage. If resistances were not provided, the engagement of contacts 4C264 under such conditions would not only establish a circuit for the coils of the up direction relays but would also establish a circuit for the coils of the down direction relays, the latter circuit being from the coils of the down direction relays, through down cam section 425, the arm of second floor direction switch 324, contacts 2FR325, contacts 4FR275, contacts 4C264, to wire G+S. With a resistance in series with each of the auxiliary floor relay contacts, resistances 284 and 341 are connected in series relation in the above circuit, thereby preventing sufficient voltage being applied to the down direction relay coils to cause these relays to operate. Thus direction establishing preference for the car buttons is assured.

These resistances also act to cause the car, upon making a stop under conditions where its direction control circuit is broken and no one enters the car and presses a car button but several hall buttons are to be responded to at the time the time interval expires, to start in the direction corresponding to the preponderance of operated hall buttons. For example, if the car travelling upwardly makes a stop at the fourth floor under conditions where the up direction control circuit is broken and no one enters the car and presses a car button but before the time interval expires two hall buttons are pressed for floors above and one hall button is pressed for a floor below, the inclusion of two resistances in parallel in the circuit for the coils of the up direction relays causes more voltage to be applied to these coils than to the coils of the down direction relays, thereby causing operation of the up direction relays instead of the down direction relays. Thus, under such conditions, preference as to the direction in which the car starts is given in accordance with the preponderance of hall calls.

When circuits are set up to cause the car to travel to a terminal floor, the floor controller functions to cause the car to be slowed down and brought to a stop at that floor as in the case of intermediate floors. To obviate running past a terminal floor and thus the possibility of running into the overhead or the pit, contacts on the terminal stopping switch are arranged in the circuits to insure slowing down and stopping of the car at the terminals. Contacts 470, 472 and 682 of the terminal stopping switch function at the upper terminal floor while contacts 495, 497 and 685 of the terminal stopping switch function at the lower terminal floor. Contacts 682 and 685 are set to open at substantially the same time that contacts SL675 separate in a normal slow down operation. Upon a stop at the upper terminal, contacts 682, upon separation, insure the breaking of the circuit for coil AFS674 of the auxiliary fast and slow speed switch and thus insure the slowing down of the car, the circuit paralleling contacts 682 and DN681 being open at contacts UP684. Contacts 685 function in the same manner during a slow down at the lower terminal floor. Contacts 470 and 495 are set to open right after the operation of the slow speed switch in a normal slow down operation. If for any reason the fast speed switch F should not have dropped out to disconnect the fast speed stator windings of the hoisting motor by the time contacts 470 separate upon a stop at the upper terminal, the separation of these contacts, owing to contacts F481 remaining separated, breaks the circuit for the coils of the up and down switch and up reversing switch. This causes the hoisting motor to be disconnected from the supply mains and the brake applied to bring the car to a stop. Contacts 495 function in a similar manner to break the circuit for coils of the up and down switch and down reversing switch when, at the time these contacts open in making a stop at the lower terminal, contacts F482 are separated. Contacts 472 and 497 are set to open at substantially the same time as the automatic stopping switches 326 and 380 respectively, thereby insuring the breaking of the circuit for the operated reversing switch and the up and down switch as the car arrives at the terminal floor. The arrangement of the terminal stopping switch contacts 682 and 685 in parallel circuits, subject to contacts DN681 and UP684 respectively of the reversing switches, permits the starting of the car away from each terminal floor toward the other terminal floor.

The safety or emergency switch is provided for stopping the car in case of an emergency. Upon operating this switch, both blades 624 and 530 are open. The opening of blade 624 breaks the feed for coil SL663 of the slow down switch, coil ASL643 of the auxiliary slow down switch, coil AG655 of the auxiliary gate close relay and coil TC647 of the time cancelling relay. It also breaks the circuit for the coils of the operated reversing switch and the up and down switch. Thus the car is brought to a stop. Owing to the fact that the auxiliary gate close relay is deenergized, the gate remains in closed position. It is to be noted that the opening of blade 624 does not break the circuit for the actuating coils of the operated direction relays, thereby preventing an occupant of the car from reversing the direction of travel of the car by opening the emergency switch and pressing the button. The purpose of blade 530 of the emergency switch will be explained later.

So far the operation of only one elevator has been described on the assumption that the other elevator is not in service. With both elevators in service, certain of the operations above described are modified. This will be understood from the description which follows.

Referring now to Figure 6a as well as to Figures 5, 6 and 7, the operation of two elevators under "duplex" control will be described. It will be understood that the alternating current power mains are common to both elevators. The power and certain of the control circuits for the second elevator will not be shown as they may be identical with those illustrated in Figure 7 for the first elevator, previously described. The hall buttons along with their floor relays are common to both elevators. As has been seen from previous description the reset circuit for each of the hall button floor relays is connected to a bus bar. These bus bars have been characterized generally in accordance with the floor and circuit. For example, 2DH indicates that the bus bar is in the reset circuit for the down second floor hall button. These bus bars are common to both elevators. In other words, these bus bars are connected to corresponding contacts on the floor controllers for both elevators. As has previously been indicated, the hall button floor relays are provided with back contacts, those for the up floor relays being arranged in one circuit in series relation (the circuit including contacts 2U170 and 3U172) and those for the down floor relays being arranged in a separate circuit in series relation (the circuit including contacts 2D167). Connections are taken off these series circuits to additional bus bars. These additional bus bars likewise are common to both elevators and are connected to corresponding contacts on the floor controllers. These additional bus bars also have been described generally in accordance with the floor and circuit in which they are connected. For example, 3UCB indicates that the bus bar is in the third floor up call behind circuit. The significance of "call behind" will be seen from later description. Each elevator car is provided with a set of car buttons, the sets operating independently. The same designating letters are employed for the various switches for the second elevator but differentiation is had in the elements referred to by appending to the switch parts for the second elevator the letter "a".

The wiring diagrams are arranged so that either the top floor or the first or lobby floor may be selected as the home station. To cause the first floor to serve as a home station, the blade of service switch 86 is moved into engagement with contact 87, which completes a circuit for coil LH90 of the lower home landing relay. The lower home landing relay, upon operation, engages contacts LH395, LH377 and LH354 and separates contacts LH327 in the circuits for elevator No. 1 and engages contacts LH395a, LH377a and LH354a and separates contacts LH327a in the circuits for elevator No. 2. Contacts LH377 are connected to floor brush switch 362 of elevator No. 1 for the first floor and contacts LH377a are connected to the corresponding switch of elevator No. 2. Contacts LH395 prepare a circuit for connecting coil AS394 of elevator No. 1 auxiliary starting relay to up direction cam section 305 and contacts LH395a prepare a circuit for connecting coil AS394a of elevator No. 2 auxiliary starting relay to up direction cam section 305a. Contacts LH354 render coil MG505 of the motor-generator starting relay of elevator No. 1 subject to floor controller switch 385 while contacts LH354a render coil MG505a of the motor-generator starting relay of elevator No. 2 subject to floor controller switch 385a. Contacts LH327 render coil ST453 of elevator No. 1 starting relay subject to floor controller switch 381, while contacts 327a render coil ST453a of elevator No. 2 starting relay subject to floor controller switch 381a. To cause the top floor to serve as a home station, the blade of service switch 86 is moved into engagement with contact 84, which completes a circuit for coil UH85 of the upper home landing relay. The upper home landing relay, upon operation, engages contacts UH442, UH195 and UH203 and separates contacts UH225 in the circuits for elevator No. 1 and engages contacts UH442a, UH195a and UH203a and separates contacts UH225a in the circuits for elevator No. 2. Contacts UH195 are connected to floor brush switch 207 of elevator No. 1 for the top floor and contacts UH195a are connected to the corresponding floor brush switch of elevator No. 2. Contacts UH442 prepare a circuit for connecting coil AS394 to down direction cam section 425 while contacts UH442a prepare a circuit for connecting coil AS394a to down direction cam section 425a. Contacts UH203 render coil MG505 of the motor-generator starting relay of elevator No. 1 subject to floor controller switch 212 while contacts UH203a render coil MG505a of the motor-generator starting relay of elevator No. 2 subject to floor controller switch 212a. Contacts UH225 render coil ST453 of elevator No. 1 starting relay subject to floor controller switch 200, while contacts UH225a render coil ST453a of elevator No. 2 starting relay subject to floor controller switch 200a. Floor controller switches 200 and 212 are mounted on the floor bar for the top floor of elevator No. 1 floor controller and switches 200a and 212a are mounted on the corresponding bar of elevator No. 2 floor controller. Similarly, floor controller switches 381, 381a, 385 and 385a are mounted on the floor bars of their respective elevators for the first floor. The functions of the various contacts of the home landing relays will be seen as the description proceeds.

It will be assumed that the blade of service switch 86 is moved into engagement with contact 87 which causes the operation of the lower home landing relay LH to select the first or lobby floor as the home station. It will also be assumed that both cars are in service and are at the home station, the wiring diagrams being illustrated for this condition.

Under such conditions, the in service relays IS for both elevators and preferably the starting relay ST for only one of the elevators are operated. In order to have only one starting relay operate, it will be assumed that the air gaps on relays IS and ST of elevator No. 1 are adjusted so that these relays operate before relays ISa and STa of elevator No. 2 can operate. As previously pointed out, the in service relay for elevator No. 1, upon operation, separates contacts IS510 in the circuit for coil ST453a of elevator No. 2 starting relay and engages contacts IS454 to energize coil ST453 of the starting relay for elevator No. 1. Elevator No. 1 starting relay, in operating, separates contacts ST431 in a circuit for coil ST453a of elevator No. 2 starting relay. In service relay IS for elevator No. 2, upon operation, separates contacts IS510a and engages contacts IS466a, IS413a and IS454a. Contacts IS510a are in a circuit for coil ST453 of elevator No. 1 starting relay, this coil, as above pointed out, being energized through another circuit. Contacts IS466a are in a circuit for coil MG505a of elevator No. 2 motor-generator starting relay, this circuit being open, however, at floor controller switch 385a. Contacts IS413a are in a home station return circuit and will be referred to later. Contacts IS454a are in a circuit for coil ST453a of elevator No. 2 starting relay. This circuit is not complete, however, owing to the prior separation of contacts ST431 of elevator No. 1 starting relay. Under the conditions so far assumed, therefore, the starting relay for elevator No. 2 is not operated. The starting relay for elevator No. 1 being operated, this elevator will respond to the first hall button pressed.

The operation of elevator No. 1 in response to a hall button has previously been described. The operation of this car in response to a car button pressed by the passenger who registered the hall call also has been described. Descriptions of these operations, therefore, will not be repeated. After stopping at the floor for which the car button was pressed, the car remains at that floor, assuming no other push buttons pressed. If while the car is idle at that floor a hall button for another floor is pressed, the car is started in operation and caused to answer the call registered by that hall button, regardless of whether it be an up or a down button and regardless of the floor at which the button is located. This car continues to answer the hall calls that are registered, so long as these calls are not behind the car, operating in effect as a "wild car". The car which functions to answer calls under such conditions will, therefore, hereinafter be termed a "wild car". The other car, car No. 2 under the assumed conditions, which is idle at the home station, acts, so far as hall buttons are concerned, as a standby car ready to help out the wild car. It also serves to receive passengers at the home station to carry them to their destinations. A car waiting at the home station will therefore be termed a "home station car". When a car is operating as a wild car and has a direction of travel established, the registration of a call behind the wild car causes the home station car to be started in operation to assist the wild car. By "call behind", with the lobby floor as the home station, is meant that if the wild car has its direction set for upward travel, an up call is a call behind when its registration occurs after the disengagement of the advance floor controller brush from the corresponding stationary contact. If a call registered under such conditions is a down call, it is not classed as a call behind because the wild car is still in a position to answer this call upon its subsequent travel in the down direction. Should the wild car's direction be down, then either an up or a down call is a call behind when registered after the disengagement of the advance brushes with the corresponding stationary contacts. A previously registered up call becomes a call behind, under conditions where one or more buttons have been pressed for floors below the one for which the up call is registered, as soon as brush 361 disengages the floor controller contact for that call during downward travel of the car. A call is not a call behind a car when the direction of travel of the car is not set as that car may leave the floor at which it is in the proper direction to answer the call.

With car No. 1 positioned at the home station, coil UC383 of elevator No. 1 up call relay is energized, the circuit being from supply main I through floor controller stationary contact 328 via the lower call behind bus bar (designated I because it is connected directly to supply main I), brush 382, coil UC383 to supply main II. This relay is therefore operated and its contacts UC502 in a circuit for coil ST453a of elevator No. 2 starting relay are separated. Assume that car No. 1 is started in the up direction from the home station in response to a push button for a floor above the third floor. Relay UC is maintained operated as car No. 1 moves up the hatch, owing to the fact that the contacts engaged by brush 382 and its advance brush 329 are connected through the back contacts of the corresponding up floor relay. That is, stationary contact 328 is connected to stationary contact 313 by contacts 1U166, contact 313 is connected to contact 291 by contacts 2U170, and so on. Following brush 382 acts to maintain the circuit for coil UC383 as advance brush 329 moves from one stationary contact to the next.

Assume now that after the disengagement of brush 323 with up third floor contact 283, up third floor hall button 112 is pressed. This causes the operation of the up third floor relay 3U to engage its contacts 3U154, rendering contact 283 "alive". This occurs too late to cause car No. 1 to respond to the call in its upward travel. Thus car No. 1 continues past the third floor without stopping and the up third floor relay 3U remains in operated condition. The separation of contacts 3U172, however, disconnects stationary contacts 270 from stationary contact 291. Thus, upon the following brush 382 disengaging the stationary contact 291, the circuit for coil UC383 of elevator No. 1 up call relay is broken. This relay, upon dropping out, reengages contacts UC502 which, together with the fact that contacts UA503 of elevator No. 1 up auxiliary direction relay are in engagement due to car No. 1 being set for upward travel, completes the circuit for coil ST453a of elevator No. 2 starting relay.

Elevator No. 2 starting relay STa operates, upon the completion of the circuit for its coil by elevator No. 1 up call relay, to engage contacts ST432a, ST61a, ST493a, ST391a and ST25a and separates contacts ST426a, ST417a and ST431a. The purpose of contacts ST61a, ST25a, ST426a and ST417a will be explained later. Contacts ST432a, upon engagement, establish a self-holding circuit for the relay. Contacts ST431a are in a circuit for coil ST453 of elevator No. 1 starting relay, the circuit for this coil being maintained, however, through holding contacts ST432. Contacts ST493a complete a circuit through contacts HC492a of the hall call relay for coil MG505a of elevator No. 2 motor-generator starting relay, causing the elevator No. 2 motor-generator set to start in operation. Contacts ST391a, upon engagement, complete a circuit for coils UDR434a, UA420a and UR421a of elevator No. 2 up and down relay and up direction relays through contacts 3FR296a, the auxiliary third floor relay 3FR being operated immediately the up third floor hall button is pressed by voltage applied to its coil by elevator No. 1 generator. As soon as the voltage of elevator No. 2 generator builds up to a certain value, the direction relays for that elevator operate, causing the closing of the car gate and the starting of the car in the up direction. The description of the slowing down and stopping of car No. 2 in response to push buttons will be deferred until further examples have been given of starting this car in operation when calls are registered behind the wild car.

Assume that car No. 1 is travelling downwardly passing the third floor, and that after the disengagement of brushes 374 and 361 from stationary contacts 282 and 283 respectively, either the up or the down third floor hall button is pressed. The operation of either the up or the down third floor relay causes the operation of the auxiliary third floor relay 3FR which engages both contacts 3FR296 and 3FR296a. Upon the engagement of up direction cam section 305 with the arm of third floor direction switch 295, a circuit is completed for coil AS394 of elevator No. 1 auxiliary starting relay from wire GW through the coil, contacts LH395 and DA396, switch blade 423, cam section 305, the arm of switch 295, contacts 3FR296, ST391 and DR459 to wire G+S. Auxiliary starting relay AS, upon operation, engages contacts AS476, completing a circuit for coil ST453a of elevator No. 2 starting relay. Elevator No. 2 starting relay, upon operation, becomes self-holding and causes the starting of the elevator No. 2 motor-generator set. It also completes a circuit for the coils of the elevator No. 2 up direction relays which operate as the generator comes up to speed, to cause the starting of car No. 2 in the up direction.

The registration of a hall call causes the starting up of the home station car regardless of whether the wild car is in motion or is stopped at a floor, so long as the call is behind the wild car, which involves, as previously pointed out, the direction of travel of the wild car being set. Thus, for example, should car No. 1 be stopped at the fourth floor and set for upward travel, due either to a button having been pressed for a floor above the fourth floor prior to the answering of the call at the fourth floor or due to the pressing of such button while the car is standing at the fourth floor, the registration of an up call at the third floor, by causing separation of contacts 3U172 to disconnect contact 270 with which brush 382 is in engagement from contact 291 and thus from supply main I, effects the deenergization of elevator No. 1 up call relay UC. This relay drops out to reengage contacts UC502. This completes a circuit for coil ST453a of elevator No. 2 starting relay, owing to the fact that contacts UA503 are in engagement. Thus, car No. 2 is started in the up direction. Similarly, if car No. 1 is standing at an intermediate floor set for down travel, the pressing of a button at a floor above that floor causes the operation of the elevator No. 1 auxiliary starting relay AS owing to the fact that contacts DA396 of elevator No. 1 down auxiliary direction relay are in engagement, the circuit being through contacts LH395, the contacts of the auxiliary floor relay for the floor above the intermediate floor at which car No. 1 is stopped, contacts ST391 and contacts DR450. The auxiliary starting relay engages contacts AS476 to complete a circuit for coil ST453a of elevator No. 2 starting relay, causing the starting of car No. 2 in the up direction.

If car No. 1 is idle at some intermediate floor, that is, with no direction of travel set, the pressing of an up button for a floor below the floor at which the car is standing does not cause the starting of car No. 2 because the dropping out of elevator No. 1 up call relay UC to reengage contacts UC502 does not complete a circuit for the coil of the starting relay for elevator No. 2, inasmuch as contacts UA503 of elevator No. 1 up auxiliary direction relay are separated. Instead, car No. 1 is started in the down direction in response to the registered up call. It is believed that the manner in which car No. 1 responds to this call will be understood from previous description.

Similarly, should car No. 1 be idle at some intermediate floor and either an up or a down hall button be pressed at a floor above, elevator No. 1 auxiliary starting relay AS is not operated owing to the fact that contacts DA396 are separated. Thus, car No. 2 is not started in operation and instead car No. 1 is started in the up direction to respond to the registered call.

Should car No. 1 be stopped at an intermediate floor and be set for upward travel and should the up or down hall button at that floor be pressed, it is not desired to start car No. 2 in response to the pressing of this button owing to the fact that car No. 1 is in condition to take on the passenger. To prevent the starting of car No. 2 in response to the up hall button, the stationary contact engaged by brush 382 is arranged so that when the car is stopped at a floor the brush is in engagement with the stationary contact for that floor. As the back contacts of the up floor relay for that floor are arranged above this contact in the circuit, the separation of these contacts does not deenergize coil UC383 and the elevator No. 1 up call relay is not dropped out to cause the operation of the starting relay for car No. 2. However, should car No. 1 leave the floor without taking on the passenger, if the button is held pressed until after brush 337 disengages its contact for that floor, or is repressed after the disengagement occurs, the up floor relay is operated so that as brush 382 disengages the contact for that floor, the up call relay is dropped out to cause the starting of car No. 2.

When car No. 1 is stopped at a floor and set for upward travel, the starting of car No. 2 in response to the down hall button at the floor at which car No. 1 is stopped is prevented due to the fact that contacts DA396 are separated. The call is registered because contacts DR336 are separated and is answered by car No. 1 upon its subsequent travel in the down direction.

Should car No. 1 be stopped at an intermediate floor and be set for downward travel, the pressing of the down hall button at that floor does not cause the starting of car No. 2 as car No. 1 is in condition to take on the passenger. However, should car No. 1 leave the floor without taking on the passenger and the down floor relay be operated after brush 335 disengages the contact for that floor, the engagement of the arm of the direction switch for that floor by up cam section 305 completes a circuit for the coil of the auxiliary starting relay AS, causing the starting of car No. 2 in the up direction. Should the up hall button at that floor have been pressed instead of the down hall button, car No. 1 is not, under such condition, in condition to take on the passenger. The call is registered because contacts UR360 are separated. Thus as car No. 1 leaves the floor and up cam section 305 engages the arm of the floor brush switch for that floor, a circuit is completed for the coil of the auxiliary starting relay AS to cause the starting of car No. 2 in the up direction.

Should car No. 1 be idle at some intermediate floor without any direction set and either hall button for that floor be pressed, it is not desired to start car No. 2 in response to this hall button due to the fact that car No. 1 is in condition to take on the passenger. The completion of the circuit for the coil of elevator No. 2 starting relay STa is prevented owing to the fact that contacts UA503 and DA396 are both separated. The floor relay is reset in the manner previously described. This prevents the starting of car No. 2 by the action of non-start relay NS, the operation of which will be described later.

If car No. 1 is travelling in the up direction and a down push button for a floor below the car is pressed, this does not cause the starting of car No. 2 owing to the fact that the down floor relay operated in response to this relay does not affect the energization of coil UC383 of elevator No. 1 up call relay and also does not complete a circuit for coil AS394 of the auxiliary starting relay owing to the fact that contacts DA396 are separated.

It has been previously pointed out that brushes 329 and 382 and the contacts engaged thereby are arranged so that during upward movement of the car the engagement of leading brush 329 with a contact takes place before the following brush leaves the preceding contact, thereby enabling a circuit to be maintained for coil UC383. It is preferred to have these contacts set so that following brush 382 disengages the lower of the spanned contacts before the arm of the direction switch for the floor above the one for which the up floor relay spanning the contacts is provided is lifted off the up section 305 of the direction cam by insulating roller 340. In this way, if the circuit for coil UC383 is to be broken by the disengagement of the following brush with the lower of the spanned stationary contacts, the breaking of the circuit and consequent reengagement of contacts UC502 will occur before the separation of contacts UA503, thereby insuring the starting of car No. 2. If desired, the contacts may be set so that brush 382 leaves the lower one of the spanned contacts just after the disengagement of brush 337 from the stationary contact controlled by the floor relay whose back contacts span the stationary contacts engaged by brushes 382 and 329.

The pressing of any car button for car No. 2 causes the operation of the corresponding car button floor relay preparing the direction circuit causing the operation of elevator No. 2 car call relay CCa. This relay operates to engage its contacts CC452a to complete the circuit for coil ST453a of elevator No. 2 starting relay and engages contacts CC504a to complete a circuit for coil MG505a of elevator No. 2 motor-generator starting relay. Starting relay STa completes the direction circuit prepared by the car button relay. The direction relays in that circuit operate as the elevator No. 2 generator voltage reaches a certain value, causing the starting of the car in the direction established.

Slowing down and stopping car No. 2 in response to car buttons is effected during up car travel in response to the engagement of brush 317a with "alive" stationary contacts controlled by the car button relays for elevator No. 2 and during down car travel in response to the engagement of brush 372a with these contacts. The slowing down and stopping of car No. 2 in response to up hall buttons is effected in response to the engagement of brush 323a with stationary contacts rendered "alive" by the up hall button relays. The slowing down and stopping of car No. 2 in response to down hall buttons is effected in response to the engagement of brush 374a with stationary contacts rendered "alive" by the down hall button relays. Car No. 2 may be stopped in its upward travel in response to a down hall button when no push buttons remain to be responded to for floors above the floor at which the down hall button is located. Similarly, it may be stopped in its downward travel in response to an up hall button when no push buttons remain to be responded to for floors below the floor at which the up hall button is located. The actual initiation of slow down when any call is picked up is, as in the case of car No. 1, initiated during upward travel of the car upon the disengagement of brush 320a from its cooperating stationary contact corresponding to the call and during downward travel of the car upon the disengagement of brush 373a with its contact corresponding to the call.

With both cars in operation, the car which stops at a floor at which a call is registered is the car travelling in the proper direction whose advance brush for that direction of travel first engages the stationary contact for the floor for which the call is registered. When both cars are in operation, they both may be regarded as wild cars. The car which is thereafter returned to the home station is determined by the operating conditions as regards registered hall and car calls. Either car may be returned to the home station in response to the pressing of a push button for the home station. But when no home station push button is operated a car is automatically started on a return to the home station when, upon making its last stop in the direction in which it has been travelling, it has no car call to respond to and no hall call is in registration which is behind the other car. Starting a car on its automatic return to the home station is effected by establishing a home station return circuit for that car.

Having already selected the first floor as the home station by assuming switch 86 operated into position to energize coil LH90 of the lower home landing relay, contacts LH377 and LH377a are in engagement preparing home station return circuits for the first floor for both cars. Contacts IS413 and IS413a are both in engagement in the respective home station return circuits as both cars are in service. The home station return circuit for elevator No. 1 is completed by the engagement of time relay contacts TR447 when the starting relay has been deenergized to effect the reengagement of contacts ST426. Similarly, the home station return circuit for elevator No. 2 is completed by the engagement of contacts ST426a and TR447a. The operation of the time relay to reengage contacts TR447 has already been described. The deenergization of the starting relay ST is effected by breaking its holding circuit under conditions where this relay is not maintained energized by some other circuit. The breaking of the holding circuit for coil ST453 is effected by causing the separation of contacts RR410 of elevator No. 1 return relay. Similarly, the breaking of the holding circuit for coil ST453a is effected by causing the separation of contacts RR410a of elevator No. 2 return relay. Return relay RR for each car is energized to effect the separation of its contacts RR410 whenever a stop is made under conditions where no other call is registered which requires further travel of the car in the direction in which it approached the floor at which the stop is made.

Assume that both cars are travelling in the up direction, each in response to a car button, and that no other push buttons are pressed. Assume further that brush 317a engages its "alive" stationary contact before brush 317 engages its "alive" stationary contact; in other words, car No. 2 picks up its car call before car No. 1 picks up its car call. The deenergization of coil UDR434a of elevator No. 2 up and down relay incident to the answering of the operated elevator No. 2 car button causes the reengagement of contacts UDR44a. This completes a circuit for coil RR43a of elevator No. 2 return relay from wire GW through coil RR43a, contacts UDR44a, RR45, ST60, ST61a, and P62a, to wire G+a. Elevator No. 2 return relay operates to separate its contacts RR57a in the circuit for elevator No. 1 return relay coil RR55 and also separates its contacts RR410a in the holding circuit for elevator No. 2 starting relay coil ST453a. Inasmuch as under the assumed conditions no other circuit is established for coil ST453a, the breaking of the holding circuit deenergizes elevator No. 2 starting relay; which drops out to separate contacts ST432a, ST61a, ST493a, ST391a and ST25a and reengages contacts ST426a, ST411a and ST431a. The purpose of contacts ST25a will be explained later. Contacts ST432a are in the holding circuit for coil ST453a, just broken by the separation of contacts RR410a. The separation of contacts ST61a breaks the circuit for coil RR43a of elevator No. 2 return relay. The consequent reengagement of contacts RR410a does not reenergize coil ST453a as contacts ST432a are now separated. Contacts ST61a also prevent the energization of coil RR55 of elevator No. 1 return relay upon the reengagement of contacts UDR56 incident to car No. 1 picking up its car call. In this, contacts ST61a are assisted by contacts RR57a should car No. 1 pick up its car call at substantially the same time car No. 2 picks up its car call. Thus, the separation of contacts RR410 under the assumed conditions is prevented and elevator No. 1 starting relay is maintained operated. Contacts ST391a are in the direction circuit for car No. 2 already broken incident to car No. 2 answering its car call. Contacts ST431a are in parallel with contacts ST432, which are in engagement. Contacts ST493a are in the circuit for coil MG505a of elevator No. 2 motor-generator starting relay. This coil is maintained energized, however, through contacts GN477a. Furthermore, the reengagement of contacts ST417a establishes an additional circuit for coil MG505a for maintaining elevator No. 2 motor-generator set in operation until the car returns to the home station. The reengagement of contacts ST426a prepares the home station return circuit for car No. 2. Upon the reengagement of contacts TR447a of elevator No. 2 time relay after the stop of car No. 2 in response to its car button is completed, the home station return circuit for car No. 2 is completed. Assume, for example, that the stop has been made at the third floor. This circuit is from wire GWa through coils UDR434a, DA455a, DR456a, contacts UP457a and UA460a, switch blade 444a, lower cam section 425a, the arm of second floor direction switch 324a, first floor direction switch 362a, contacts LH371a, IS413a, ST426a and TR447a, to wire G+Sa. This causes the car to be started in the down direction. The home station return circuit is maintained through contacts DR450a after the separation of contacts TR447a.

As the car nears the first floor, the down direction circuit is broken by the lifting of the arm of first floor direction switch 362a off cam section 425a by insulating roller 401a. The consequent reengagement of contacts DA185a completes a circuit from wire GWa through holding coil PR183a of the pick up relay, contacts UA184a and DA185a, floor controller contact 357a, brush 373a, contacts UP391a and DN440a, operating coil PR471a of the pick up relay and resistance 496a, to wire G+a. This causes operation of elevator No. 2 pick up relay, which acts, upon the disengagement of brush 373a from contact 357a, to cause the car to be slowed down and thereafter brought to a stop at the first floor.

As car No. 2 arrives at the home station, cam 367a engages and opens floor controller switch 381a, thereby opening the circuit by-passing contacts UD407a and AFS416a, contacts LH327a being separated under the assumed conditions. The purpose of this arrangement will be explained later. Also, floor controller switch 385a is opened by cam 393a, which acts to render coil MG505a of the motor-generator starting relay subject solely to contacts GN477a of the generator holding relay. These contacts are maintained in engagement, as previously described, until the car comes to a stop and the gate is moved to open condition. When this has occurred, contacts GN477a separate, deenergizing coil MG505a, to shut down the motor-generator set for elevator No. 2.

Car No. 1, upon completing its stop in response to its car call, remains at the floor at which the stop is made. This is due to the fact that no calls are registered to cause the establishment of a starting circuit for the car and also due to the fact that the holding circuit for coil ST453 of the starting relay is maintained established, thereby preventing the engagement of contacts ST426 to establish the home station return circuit for car No. 1. Thus, car No. 1 remains a wild car and car No. 2 again becomes the home station car. Had car No. 1 picked up its car call before car No. 2 picked up its car call in the above example, the control mechanism would have operated to cause car No. 1 to be returned to the home station instead of car No. 2. Car No. 1 therefore would become the home station car and car No. 2 the wild car.

Assume now that both cars are travelling in the up direction in response to an up hall button and that car No. 2 is carrying a passenger who has pressed a car button for a floor below the one at which the hall button is registered. Assume further that car No. 2 picks up its car call before the up hall call is picked up and that car No. 1 picks up the up hall call before the reclosure of the hatchway door at the floor at which car No. 2 has made a stop. Until the up hall call is picked up, up and down relay UDRa for elevator No. 2 is maintained energized through contacts of the auxiliary floor relay for the floor at which the up hall button is located, thereby causing its contacts UDR44a to be separated. Upon car No. 1 picking up the up hall call, the reset of the up floor relay drops out the auxiliary floor relay, which breaks the circuit for the coil of elevator No. 2 up and down relay UDRa. This relay then drops out to reengage contacts UDR44a, completing a circuit for coil RR43a of elevator No. 2 return relay, which separates its contacts RR410a in the holding circuit for coil ST453a of elevator No. 2 starting relay. The starting relay is thus deenergized and reengages its contacts ST426a which, upon engagement of contacts TR447a, completes the home station return circuit for car No. 2, causing the car to be returned to the home station.

Assume, however, that car No. 1 does not pick up the up hall call until after the reclosure of the hatchway door for the floor at which car No. 2 has made a stop. The closure of the door causes, through the door relay, the operation and latching of the slow down switch for elevator No. 2 in operated condition. This causes the gate operating mechanism to close the gate and start the car in the up direction. This operation has already been described for car No. 1. As no other calls are registered, the picking up of the up hall call by car No. 1 causes the deenergization of the up and down relay UDR, which reengages its contacts UDR56 in the circuit for return relay coil RR55. Thus elevator No. 1 return relay RR is operated to separate its contacts RR410 in the holding circuit for coil ST453 of elevator No. 1 starting relay. The starting relay drops out to reengage its contacts ST426, preparing the home station return circuit for car No. 1. In the meantime, since the up floor relay has been reset and the auxiliary floor relay controlled thereby has been dropped out incident to the answering of the up hall call by car No. 1, the direction control circuit for car No. 2 is broken. This causes the deenergization of elevator No. 2 up and down relay UDRa, which engages its contacts UDR44a in the circuit for coil RR43a of elevator No. 2 return relay. This circuit cannot be completed, however, as contacts ST60 are separated as a result of the deenergization of elevator No. 1 starting relay. The breaking of elevator No. 2 direction control circuit also causes the reengagement of contacts UA184a in the circuit for the holding coil PR183a of elevator No. 2 pick up relay. Upon the engagement of brush 320a with the next stationary floor controller contact, the circuit is completed for the coils of the pick up relay through contacts UA184a and DA185a. Thus, as brush 320a leaves its contact, car No. 2 is caused to slow down and stop at the floor for which the contact is provided.

Assume that the passenger who pressed the up hall button and who is taken into car No. 1 presses a car button for his destination within the time allowed by the time relay. The resultant operation of the car call relay for car No. 1 to engage contacts CC452 reestablishes a circuit for coil ST453 of elevator No. 1 starting relay. As a result, contacts ST60 reengage, causing the operation of the return relay RRa for elevator No. 2. Elevator No. 2 return relay acts to separate its contacts RR410a, breaking the circuit for coil ST453a of elevator No. 2 starting relay. This relay drops out to engage its contacts ST426a which, upon the engagement of contacts TR447a, establishes the home station return circuit for car No. 2. Thus, upon the return of car No. 2 to the home station, it becomes the home station car and car No. 1, which in the meantime proceeds to answer its car call, remains a wild car.

Assume now that car No. 1 is travelling in the up direction in response to a hall call and that car No. 2 is travelling in the down direction in response to a car call. Assume further that car No. 2 picks up its car call before the hall call is picked up by car No. 1. The pick up of the car call by car No. 2 causes elevator No. 2 up and down relay to be deenergized. This relay reengages contacts UDR44a to cause the operation of elevator No. 2 return relay RRa to deenergize elevator No. 2 starting relay STa. The starting relay reengages contacts ST426a to prepare the home station return circuit. The separation of contacts DR450a incident to the breaking of the down direction circuit for elevator No. 2 prevents the establishment of an up direction control circuit for elevator No. 2 by the call to which car No. 1 is responding. Thus, upon the expiration of the time interval of elevator No. 2 time relay, contacts TR447a reengage to complete the home station circuit, causing car No. 2 to return to the home station.

Assume, in the last example, that an up hall call exists between the two cars, car No. 1, which is running in the up direction in response to a hall call, being above car No. 2, which is travelling downwardly in response to a car call. Assume further, as before, that car No. 2 picks up its car call before the hall call is picked up by car No. 1. Under such conditions even though relay UDRa is dropped out to energize return relay RRa for elevator No. 2, starting relay STa is not deenergized. The circuit for coil ST453a is maintained through contacts UC502 of elevator No. 1 up call relay, which are in engagement due to the fact that the up call is a call behind car No. 1, and contacts UA503 which are in engagement because car No. 1 is moving in the up direction. Thus, upon the expiration of the time interval of relay TRa, an up direction control circuit is established for car No. 2 and the car is started in the up direction in response to the up hall call below car No. 1.

Assume now that car No. 1 is travelling in the up direction in response to a call and that car No. 2 is below car No. 1 travelling back to its home station in response to the completion of its home station return circuit. Assume further that an intending passenger at a floor between the two cars presses the up push button at that floor. This, being a call behind car No. 1, causes the deenergization of elevator No. 1 up call relay UC, which reengages contacts UC502 to complete a circuit for coil ST453a of elevator No. 2 starting relay. This relay operates to separate contacts ST426a, breaking the home station return circuit for car No. 2. This deenergizes the down direction relays, causing the reengagement of contacts DA185a, which, upon the engagement of brush 373a with the next stationary contact, completes the circuit for the coils of the pick up relay PRa, thereafter causing the car to be slowed down and brought to a stop at the floor for which the contact is provided. Upon the reengagement of contacts TR447a after the stop is completed at such floor, car No. 2 is started in the up direction.

Assume now that the call registered between the two cars in the last example is a down call instead of an up call. The registration of this call does not cause the reenergization of elevator No. 2 starting relay. This is due to the fact that the call, not being a call behind car No. 1, does not break the circuit for elevator No. 1 up call relay and therefore contacts UC502 are not reengaged to complete a circuit through contacts UA503 for coil ST453a.

Assume that the home station return circuit for car No. 2 is completed and that, as this car is returning to its home station, an up call is registered below the car and also below car No. 1, which will be assumed to be travelling in the up direction. Immediately upon the registration of the call, up call relay UC for car No. 1 is deenergized, causing the operation of elevator No. 2 starting relay to break the home station return circuit. Contacts AG402a of elevator No. 2 auxiliary gate close relay maintain the down direction control circuit for car No. 2 through the auxiliary floor relay contacts operated in response to the pressing of the up hall button, contacts ST391a being connected in parallel with contacts AG402a upon operation of elevator No. 2 starting relay. Thus, contacts DA185a are maintained separated and car No. 2 is not slowed down and brought to a stop until it comes to the floor at which the up hall button was pressed. In this way the home station return circuit is broken and the passenger who enters the car at the floor at which the stop was made can send the car to an upper floor by pressing a car button, without the car first returning to the home station.

Assume now that in the last example the call registered below car No. 2 is a down call instead of an up call. The registration of the down call does not effect the reenergization of elevator No. 2 starting relay as the up call relay for elevator No. 1 is not dropped out and as the auxiliary starting relay AS for elevator No. 1 is not energized. The home station circuit for car No. 2 is therefore not broken. Car No. 2, however, will pick up the down call in its downward travel to the home station. Upon the passenger who entered the car at the floor at which the stop is made in response to the down call pressing a car button, however, the consequent engagement of contacts CC452a of elevator No. 2 car call relay establishes a circuit for the coil of elevator No. 2 starting relay, resulting in the separation of contacts ST426a to break the home station return circuit. If in the meantime car No. 1 has cleared all its calls, it is returned to the home station instead of car No. 2. This is due to the fact that as all calls affecting car No. 1 are cleared the holding circuit for coil ST453 of elevator No. 1 starting relay is broken upon operation of elevator No. 2 starting relay, thus causing the home station return circuit to be established for car No. 1.

Assume that both cars are travelling upwardly and that one car stops at a floor under conditions where, at the time the time interval expires, its home station return circuit would be completed and the car started on its return to the home station. Assume further, however, that the up hall button at that floor is pressed before the time interval expires. Inasmuch as this car is in condition to take on the passenger, the restoring circuit for the floor relay prevents the floor relay being maintained operated once the button is released, thereby preventing the call being registered. Thus, even though the car may be stopping at a floor below the other car and the other car is set for upward travel, no call behind the other car is registered. If the intending passenger does not open the door before the gate nears closed position after the expiration of the time interval, the car is started on its return to the home station.

It is preferred, under conditions where the other car has passed the floor at which the stop is made and the intending passenger has the button depressed at the time the time interval expires, to prevent the starting of the car on its home station return trip until after the button is released. This may be done by interrupting the circuit between brushes 329 and 382 for the stopped car while the car is at rest, thereby permitting the separation of the back contacts of the up floor relay to break the circuit for the coil of the up call relay UC for the other car, and thus cause reoperation of starting relay ST for the stopped car to prevent the establishment of the home station return circuit. Additional contacts UD352 on the up and down switch for the stopped car are illustrated for this purpose. Thus, upon release of the button, the intending passenger has time to open the door before the gate reaches closed position. Such situation is of unlikely occurrence and contacts UD352 may be omitted and the brushes permanently joined if desired.

Assume that both cars have been travelling downwardly and that one car stops at a floor under conditions where, at the time the time interval expires, its home station return circuit would be completed and the car started on its return to the home station. Assume further, however, that either the up or the down hall button at that floor is pressed before the time interval expires. Inasmuch as this car is in condition to take on the passenger, the restoring circuit for the floor relay prevents the floor relay being maintained operated once the button is released, thereby preventing the call being registered. Thus, if the other car is below this floor, no call behind the other car is registered. If the intending passenger does not open the door before the gate nears closed position after the expiration of the time interval, the car is started on its return to the home station. Should the button be depressed at the time the time interval expires, under conditions where the other car has passed the floor, the auxiliary starting relay AS for the other car is operated, causing the starting relay for the stopped car to be reoperated and thus preventing the establishment of the home station return circuit until after the push button is released. Thus, upon release of the button, the intending passenger has time to open the door before the gate reaches closed position.

It is believed that the various conditions under which a car is automatically started on its return to the home station will be understood from the above examples without further detailed description.

If a car is already at the home station, another car may be caused to travel to the home station in response to its car button for that floor but its home station return circuit is not established to automatically start it on its return to the home station so long as circuits are not set up for causing the car already at the home station to leave there.

A car is not started on an automatic return to the home station so long as a car call for that car is in registration upon the reclosure of the hatchway door at a floor at which the car has stopped or is registered before the expiration of the time interval after the door is closed.

As regards hall buttons, if both cars are in operation, either car, upon making a stop under conditions where the hatchway door for that car at the floor at which the stop is made is opened, is automatically started on a return to the home station upon the expiration of the time interval after reclosure of the door, provided there is no call ahead to maintain established the direction circuit for the direction in which the car has been travelling or, if any such call does exist, it is picked up by the other car before reclosure of the door, so that the direction circuit is broken at the time the door reaches closed position, and that no call behind the other car is in registration at the time the time interval expires. If the door at the floor at which the stop is made is not opened, the car is automatically started on its return to the home station upon expiration of the time interval after the car is brought to a stop, provided there is no call ahead to maintain the direction circuit established or, if such call does exist, it is picked up by the other car before the expiration of the time interval and that no call behind the other car is in registration at the time the time interval expires.

If the home station return circuit for a car has been established, this circuit for the other car cannot be established to start the other car on an automatic return to the home station as the holding circuit for the coil of the starting relay for the other car is maintained established. However, a home station return circuit, after having been established, may be broken by the registration of a call behind the other car, thereby interrupting the return to the home station of the car for which the home station circuit was established. If the call is ahead of the car, the car is maintained in operation until it reaches the slow down point for the floor at which the call is registered, whereupon it is slowed down and brought to a stop at the floor. However, if the call is behind the car, it is caused to slow down and stop at the next floor at which normal slow down can be effected, provided no call is registered before initiation of the slow down which would maintain the direction of travel for the car, and to start therefrom in the opposite direction to answer the call behind.

The travel of a car to the home station may be interrupted without breaking the home station return circuit by a call ahead of the car for the direction in which the car is travelling. When such call is in registration, the car upon arrival at its slow down distance from the floor for which the call has been registered slows down and is brought to a stop at that floor. Upon the intending passenger entering the car and pressing the car button for his destination, the starting relay for that car reoperates and the home station return circuit for that car is broken.

Once a car reaches the home station as a result of being automatically returned thereto by the establishment of its home station return circuit, while in a sense it became a home station car as soon as the home station return circuit was established, becomes the home station car in fact. A car also becomes a home station car upon its arrival at the home station in response to a push button for that floor. Once a car reaches the home station, the establishment of the home station return circuit for the other car to automatically return it to the home station is prevented until circuits are set up to start the home station car away from the home station. Also, if a car has its home station return circuit established and the other car reaches the home station first, it breaks the home station return circuit for the first mentioned car which is brought to a stop at the next floor at which normal slow down can be obtained.

When the wild car is caused to return to the home station in response to its car button for that floor, the car already at the home station is selected to be the one next to respond to a hall call. Assume, for example, that car No. 1 has returned to the home station (the first floor, as previously assumed) as a result of the establishment of its home station return circuit, and that car No. 2 is thereafter caused to return to the home station by the pressing of the car button in the car for that floor. The starting relay ST for car No. 1 is deenergized at the time car No. 2 arrives at the home station, this deenergization having occurred incident to the last stop made by car No. 1 before returning to the home station. Thus both contacts ST432 and ST431a are separated, preventing the reestablishment of the circuit for the coil of elevator No. 1 starting relay by way of the circuit in which these contacts are located. Before car No. 2 reaches a point which is slow down distance away from the home station floor, contacts UD407a are separated but contacts AFS416a are in engagement, thereby maintaining established the holding circuit for coil ST453a of the elevator No. 2 starting relay. When this slow down point is reached, however, contacts AFS416a separate and as contacts UD407a remain separated until the car is brought to a stop, this breaks the holding circuit for coil ST453a of elevator No. 2 starting relay. This relay, in dropping out, reengages contacts ST431a which complete a circuit for coil ST453 of elevator No. 1 starting relay through contacts UD407 of elevator No. 1 up and down switch, cam 367, the arm of switch 381, switch 200 and contacts UH225 in parallel, contacts RR410 and contacts IS454. Elevator No. 1 starting relay operates to engage contacts ST432, establishing a self-holding circuit and at the same time separates contacts ST431, preventing the reenergization of coil ST453a of elevator No. 2 starting relay by way of the circuit in which contacts ST431 are arranged. The circuits are now such that car No. 1 is the car which will start away from the home station in response to a hall call, this car in a sense now being the wild car.

Should a passenger enter car No. 2 with both cars at the home station floor under the above assumed conditions and press a car button for his desired destination before a hall call is registered, the operation of the car button relay causes the operation of elevator No. 2 car call relay to engage its contacts CC452a, thereby establishing a circuit for coil ST453a of elevator No. 2 starting relay. Thus both starting relays are operated and contacts ST60 and ST61a are in engagement. Upon separation of contacts UDR44a incident to the starting of car No. 2, elevator No. 1 return relay RR is operated to separate its contacts RR410, breaking the circuit for coil ST453 of elevator No. 1 starting relay. Thus car No. 2 is the one to leave the home station and becomes the wild car.

A similar operation takes place in the event a passenger enters the home station car at the first floor and presses a car button for his destination under conditions where the wild car is idle at some other floor. The operation of the car button relay for the home station car causes, through the action of its car call relay, the operation of the starting relay for the home station car. The starting relay, in turn, drops out the starting relay for the wild car, establishing the home station return circuit for that car. Thus the latter car is started on its return to the home station as the other car is started away from the home station.

It has been previously shown that the registration of a hall call, under conditions where one car is at the home station and the other car (the wild car) is idle at some other floor, causes the starting of the wild car to answer the call. However, if for some reason the wild car does not start in response to this call within a predetermined interval of time, say twenty seconds, the home station car is automatically started in operation. A similar operation is had in the event that the wild car has its direction of travel set and does not leave the floor at which a stop is made to answer a hall call ahead within said time interval after the car is brought to a stop. Such operation is effected by means of the non-start relays NS. Each of these relays is timed so that it does not operate to close its contacts until the expiration of a certain time interval after the circuit for its coil is completed. When a car is in operation, i. e., when the starting relay ST for that car is operated, the circuit for the coil of relay NS for that car is completed each time a stop is made so long as there are hall calls yet to be responded to. In the case of elevator No. 1, this is effected by the reengagement of contacts UD37 and in the case of elevator No. 2 by the reengagement of the corresponding contacts UD24a. In the case of a wild car idle at some floor, the circuit for the coil of the non-start relay is completed upon registration of a call, i. e., by the engagement of contacts HB36. Thus, assuming for example that car No. 1 is the wild car and does not start in operation in response to the pressing of a hall button within a certain time interval after the button has been pressed in case the car is idle at a floor or upon the expiration of a time interval after the car comes to a stop in case the direction circuit is established, the non-start relay of elevator No. 1 operates to engage its contacts NS491, which completes a circuit for coil ST453a of elevator No. 2 starting relay. This causes car No. 2 to start away from the home station in the event it has not already been started due to the call being a call behind the car. In case the call which is registered is behind the wild car, the starting relay circuit for elevator No. 2 is established without waiting on the engagement of contacts NS491 by contacts UC502 in case car No. 1 is set for upward travel or AS476 in case car No. 1 is set for downward travel. Contacts ST40 and ST25a of the starting relays act to prevent the operation of the non-start relay for the home station car, thereby serving as electrical interlocks.

Operations effected in response to the opening of the emergency stop switch of car No. 1 have previously been described. A further operation takes place upon the opening of the emergency stop switch for one of the cars in that the other car is thereafter caused to respond to all hall calls. Assume, for example, that car No. 1 is the wild car and car No. 2 is the home station car. Assume further that the emergency stop switch on car No. 1 is opened. The opening of blade 530 of this switch deenergizes coil IS517 of elevator No. 1 in service relay, which reengages its contacts IS510 to establish a circuit for coil ST453a of elevator No. 2 starting relay. At the same time, it separates contacts IS454 to deenergize coil ST453 of elevator No. 1 starting relay. This causes car No. 2 thereafter to answer all hall calls until the emergency switch for car No. 1 is reclosed. It is believed that this will be understood from previous description.

It has previously been pointed out that to change the home station from the bottom to the top floor, switch 86 is moved into position to cause operation of upper home landing relay UH. Contacts UH442, UH195, UH203 and UH225 of the home landing relay, which are for elevator No. 1, serve the same purpose as served by contacts LH395, LH377, LH354 and LH327 respectively when the home station is at the first floor. Similarly, the contacts of relay UH for elevator No. 2 serve the same purpose as the corresponding ones of relay LH serve when the home station is at the first floor. Briefly stated, in the case of elevator No. 1, contacts UH442 render auxiliary starting relay AS subject to the lower section 425 of the direction cam, thereby rendering this relay effective to control car No. 2 when, during upward travel of car No. 1, either an up or a down call is registered below the car. Contacts UH195 connect the home station return circuit to the top floor direction switch 207 instead of bottom floor direction switch 362. Contacts UH203 render switch 212 for the top floor effective to control the running of elevator No. 1 motor-generator set. Contacts UH225 render switch 200 for the top floor effective to control the energization of the coil of starting relay ST. The back contacts of the down floor relays are connected through previously mentioned bus bars to corresponding stationary contacts on the floor controllers of both elevators. These stationary contacts for elevator No. 1 are engaged by brushes 368 and 384 to control the energization of coil DC392 of the down call relay during downward car travel in the same manner as the coil of the up call relay UC is controlled during up car travel. Brushes 368 and 384 may be connected by contacts UD369 of the up and down switch if desired. The purpose of this will be understood from the description already given in connection with contacts UD352. Each down call relay DC acts through its contacts DC514 to control the energization of the starting relay ST for the other elevator in a manner similar to that described for the control of the starting relays by the up call relays.

With the home station control so far described, only one car is automatically returned to the home station, the other or wild car, unless caused to travel to the home station floor by its car button for that floor, remaining in the hatchway at the floor at which the last stop is made. Both cars may be caused to return automatically to the home station if desired. This may be effected by means of an additional switch 92 which controls the energization of coil PC94 of the parking control switch. When switch PC is operated, it engages contacts PC427 and PC433 for elevator No. 1 and also engages corresponding contacts PC427a and PC433a for elevator No. 2. Inasmuch as the same operation is provided for each elevator, only that for elevator No. 1 will be described. Contacts PC433 are arranged in a circuit by-passing contacts ST417, thereby acting to maintain the motor-generator set in operation until the car returns to the home station. Contacts PC427 are arranged in a by-pass for contacts ST426 in the home station return circuit. This by-pass also contains back contacts HC414 of the hall call relay and back contacts CC441 of the car call relay. Assuming car No. 2 at the home station and car No. 1 the wild car, with contacts PC427 in engagement, car No. 1 is also automatically started on a return to the home station when no call remains to be responded to at the expiration of the time interval after the reclosure of the door at the floor at which the last stop is made. The inclusion of contacts HC414 in this by-pass circuit causes this circuit to be broken when a hall call is registered when the car is on its way to the home station. If the call is for a floor below the car, the direction circuit for the car is maintained, as previously described, until the slow down point for that floor is reached, whereupon the car is slowed down and brought to a stop at the floor. If the call is for a floor above, the car is brought to a stop at the next floor at which normal slow down can be made and reversed to answer the call. The inclusion of contacts CC441 in this by-pass circuit permits an entering passenger who enters the car at the floor at which the last stop is made desiring to be taken to a floor above and who neglects to press the car button for his destination within the time interval allowed, to cause the car, upon the car button being pressed, to be brought to a stop in its travel to the home station at the next floor for which normal slow down can be made and to be reversed to answer the car button.

When the system is arranged so that both cars return to the home station, the cars are started away from the home station in the order in which they arrived there. Thus, assuming no car buttons are operated, the car which has been at the home station floor the longest will be the first to leave in response to a hall call. This operation has already been described in detail and will not be repeated here.

In an installation where it is desired to have the first floor always the home station, not only may switches 200 and 212, stationary contacts 353, 314, 292, 271, 250, 227 and 202 and brushes 368 and 384 for each elevator be omitted, as previously pointed out, but also the down call relay DC for each elevator, switch 86 and home landing relays UH and LH may be omitted. This would also involve, in the circuits for each elevator, the elimination of the circuit through contacts UH442 with the consequent elimination of contacts UA443; the elimination of contacts DA396 and the closing of the circuit at the point where these contacts are removed; the elimination of the circuit containing contacts UH195;

the closing of the circuit at the point where contacts LH377 are removed; the elimination of the circuit containing contacts LH326, UH225 and switch 200 and connecting the arm of switch 381 to contacts RR410; and the elimination of the circuit containing contacts UH203 and switch 212 and the closing of the circuit at the point at which contacts UH354 are removed.

It is at times desirable to operate one car by means of its car buttons only, as for freight service operation to take in and remove furniture from the building. This may be done by closing special service switch 542 in that car, this switch being preferably key operated. This switch, when closed, energizes coil SR543 of the service relay for that car. This relay, upon operation, separates contacts SR516, SR412, SR387 and SR400. The separation of contacts SR412, SR387 and SR400 prevents the energization of the restoring coils of the hall button floor relays by the floor controller for that car. The separation of contacts SR516 deenergizes coil IS517 of the in service relay for that car which reengages contacts IS510 and separates contacts IS454, IS466 and IS413. Contacts IS413 prevent the automatic return of the car to the home station during special service operation. Contacts IS466 prevent the operation of the motor-generator set during special service operation when no car button is operated. Contacts IS454 deenergize the starting relay ST for that car. If the starting relay for the other car is not already energized, the reengagement of contacts IS510 causes the energization of the starting relay for the other car, thereby causing the other car to respond to any hall call that is registered. In other words, one car is caused to answer all hall calls so long as the service relay for the other car is energized. The car whose service relay is energized, however, continues to respond to car buttons.

A similar operation is had when the inspection switch on the controller is thrown from the position illustrated to the other position. As previously set forth, this switch is provided with six blades, designated 423, 444, 487, 512, 537 and 677. Assuming the switch to be operated, blade 537 energizes coil SR543 of the service relay for that car, preventing the car responding to hall buttons as above set forth. Blade 677 prevents the energization of coil AFS674 of the auxiliary fast and slow speed switch, thereby preventing the car operating above a slow speed when the inspection switch is thrown into position for inspection. Blade 512 completes a circuit for coil MG505 of the motor-generator starting relay, thereby maintaining the motor-generator set running for the inspection operation. Blades 423 and 444 render inspection push buttons 446 and 462 respectively in the car effective to control the coils of the direction relays and thereby control the starting of the car, these blades of the inspection switch being moved out of the positions illustrated, rendering the car and hall push buttons for the floors ineffective to cause starting of the car. Button 446 serves to control the up direction relays while button 462 serves to control the down direction relays. Thus, the pressing of button 446 causes the car to operate in the up direction at slow speed while the pressing of button 462 causes the car to operate in the down direction at slow speed. The release of the operated button causes the car to be brought to an immediate stop, blade 487 of the inspection switch breaking up the holding circuits for the reversing switches and rendering these switches directly subject to the direction relay contacts UR484 and DR485. By breaking up these holding circuits, blade 487 renders the car and hall push buttons ineffective to control the stopping of the car. Thus, for inspection operation the car cannot be operated above a slow speed and the starting and stopping of the car is controlled by inspection buttons 446 and 462.

Key operated service switches 182 and 186 are, as previously pointed out, located in the elevator car. For apartment house installations, switch 182 is closed during the day and for a certain time during the evening. However, at night, when it is desirable to prevent operation of the elevators except by tenants, a building attendant provided with a key for operating service switch 182 opens this switch. Thus passengers entering the car cannot operate the car by means of the car buttons unless switch 186 is closed. Each of the tenants is provided with a key for operating switch 186, so that any of them arriving in the building after the change-over has been effected can render the car buttons effective so that he can send the car to his destination by inserting his key and operating the switch. Upon arriving at his destination, he removes the key so that further operation of the car by car buttons is prevented until switch 186 is again operated.

Service switch 630 is for disconnecting the generator armature from its positive supply wires when, as during servicing the elevator, it becomes desirable to do so.

The generators of the two elevators are connected together by means of contacts P83 and P62a through resistance 77 in series with resistance 80, contacts MG81a and contacts MG82 arranged in parallel. The purpose of this arrangement is to permit operation of the auxiliary floor relays FR and return relays RR by voltage applied from either generator. Resistances 77 and 80 are provided to prevent high circulating currents when starting a motor-generator set in operation under conditions where the other motor-generator set is already in operation. Assuming, for example, that the motor-generator set of elevator No. 1 is in operation with contacts MG82 separated, and that the motor-generator starting relay MG for elevator No. 2 is operated. This relay separates contacts MG81a to insert resistances 80 in the interconnecting circuit. This resistance and resistance 77 prevent the circulating current flowing from elevator No. 1 generator to elevator No. 2 generator rising above a predetermined value, resistance 77 holding the value of circulating current down during the separation of contacts MG81a should any arcing take place at these contacts.

So far, the invention has been described as applied to two elevators. It is to be understood, however, that it is applicable to more than two. As an example, the application of the invention to a system of four elevators is illustrated in Figures 8, 9 and 10. Only certain of the circuits involved are illustrated in these figures, these circuits being shown for arrangement in the embodiment of the invention exemplified by Figures 5, 6, 7 and 6a. Figure 8 shows circuits which would be added to or used in place of certain of the circuits of Figures 5, 6, 7 and 6a in applying the circuits of these figures to four elevators. Figures 9 and 10 show further modifications of certain of the circuits of Figure 6 when the circuits of Figure 6 are applied to each of four elevators. It is believed that, with the description which follows, the manner of applying the invention to more than two elevators will be understood from the circuits of Figures 8, 9 and 10, taken in connection with those of Figures 5, 6, 7 and 6a.

To differentiate between the control devices for the different elevators, the letters a, b and c, indicative of elevators 2, 3 and 4 respectively, have been added to the designating characters. The circuits of Figures 8, 9 and 10 include certain electromagnetic switches, not previously referred to. These switches have been designated:

ACS—Auxiliary car selecting relay
ARR—Auxiliary return relay
CS—Car selecting relay
M—Maintaining relay
MD—Master down call above relay
MU—Master up relay
TS—Transfer switch Relays MD and MU and switch TS are common to the elevators. Relays for indicating when calls behind are registered are utilized. These relays have been designated:

UCA—Up call above relay
UCB—Up call below relay
DCA—Down call above relay

The up call below relays UCB and the down call above relays DCA are the up call relays UC and the down call relays DC respectively of Figures 6 and 6a. The up call above relays UCA, in conjunction with the down call above relays DCA, take the place of the auxiliary starting relays AS of Figures 6 and 6a, the auxiliary starting relays being omitted. The bus bars from which connections to the call relays of each elevator are taken are designated in accordance with the floor and circuit in which they are connected. For example, 6DCA indicates that the bus bar is in the sixth floor down call above circuit for all elevators. The car selecting relays CS are provided with different sized air gaps. It is preferred that the in service relays IS and starting relays ST be similarly arranged. It will be assumed that the air gaps of elevator No. 1 car selecting relay CS, in service relay IS and starting relay ST are the smallest, that the air gaps of the corresponding relays of elevator No. 2 are slightly larger, that the air gaps of the corresponding relays of elevator No. 3 are still larger, and that the air gaps of the corresponding relays of elevator No. 4 car selecting relay are the largest. The electromagnetic switches are illustrated in deenergized condition and the maintaining relays M, which are of the latching type, are illustrated as reset.

It will be assumed that the system, as applied to four elevators, is arranged so that the home station is permanently at the first floor. As previously explained, this involves the omission of several of the controlling elements and circuits of Figures 5, 6, 7 and 6a, including the down call relays DC. In the system as applied to four cars, however, the contacts of the down call above relays DCA (corresponding to relays DC) are used in a different way which will be explained later. A modified arrangement for controlling each starting relay ST being illustrated in Figures 8, 9 and 10, the circuits for the coil of the starting relay in each of Figures 6 and 6a are omitted in applying the circuits of the latter figures, in connection with the circuits of Figures 8, 9 and 10 to four elevators.

Likewise, a modified control for the return relays RR being illustrated in Figures 8, 9 and 10, those of Figure 5 for controlling these relays are omitted in making such application. Also, a modified arrangement of interconnecting the generators is shown in Figure 8. Further modification of the circuits of Figures 6 and 6a to include the maintaining relays is shown in Figure 9. Figure 10 shows circuits for controlling the call relays UCA, UCB and DCA. It is believed that these changes will be understood as the description proceeds.

Floor controller circuits for all seven floors are shown in Figure 10, but for convenience only the floor controller circuits for the first or home station floor are shown in Figure 8 and only those for the first and second floors are shown in Figure 9. The floor controller parts illustrated are shown in the condition which they assume when all cars are positioned at the home station floor. It will therefore be assumed that all cars are at the home station floor with the system disconnected from the power supply.

Upon connection of the system to the power supply, various relays operate immediately. Assuming that all four cars are in service, the in service relay IS for each elevator operates, effecting the engagement of contacts IS802, IS811a, IS820b, IS827c, IS846, IS864a, IS882b and IS900c. Also, the call relays UCA, UCB and DCA for each car operate. Referring to Figure 10, the circuit for coil DCA1216 of elevator No. 1 down call above relay is from supply main I, through bus bar I, contacts 7D1182, 6D1181, 5D1180, 4D1177 and 3D1176 of the down floor relays for the seventh to third floors inclusive, bus bar 3DCA, floor controller stationary contacts 1202 and 1206 for the second and first floors, brush 1207, coil DCA1216 to supply main II. The circuit for coil UCB1217 of elevator No. 1 up call below relay is from bus bar I, through floor controller second floor contact 1203, brush 1204, coil UCB1217, to supply main II. The circuit for coil UCA1220 of elevator No. 1 up call above relay is from bus bar I, through contacts 6U1175, 5U1174, 4U1173, 3U1172 of the up floor relays for the sixth to the third floors inclusive, bus bar 3UCA, floor controller contacts 1205 and 1211 for the second and first floors, brush 1212, coil UCA1220, to supply main II. Thus contacts UCA918, UCA920a, UCA922b, UCA924c, UCB928, UCB930a, UCB932b, UCB934c, UCB961, UCB962a, UCB963b, UCB964c, DCA1012, DCA1014a, DCA1016b and DCA1018c separate. Also, the transfer switch TS operates. The circuit for its coil TS952 is through stationary contacts and brushes 966, 967, 970a, 911a, 972b, 973b, 974c and 975c of the respective floor controllers, these brushes and contacts being in engagement as the respective cars for which they are provided are at the home station. Thus, transfer switch contacts TS926 engage and transfer switch contacts TS927, TS1027, TS1029, TS1031 and TS1033 separate. Contacts TS926 prepare a feed circuit for the coils of the starting relays ST while contacts TS927 break a feed circuit for the coils of the auxiliary car selecting relays ACS.

The connection of the system to the power supply also energizes the car selecting relays for the respective elevators. This circuit is through contacts CS834, CS835a, CS836b and CS837c of the respective car selecting relays in series and thence in parallel branch circuits through the coils of the car selecting relays, that for the coil of elevator No. 1 car selecting relay being through contacts CS840, coil CS801, contacts IS802, floor controller contact 803 and brush 804, in engagement with the car at the home station, contacts ST805 and contacts UD806. The parallel branches for the coils of the other car selecting relays are the same and will not be traced.

The car selecting relays act to select the order in which the cars leave the home station in response to hall calls. The air gap of the car selecting relay of elevator No. 1 being the smallest, this relay operates to engage contacts CS800 and CS851 and separate contacts CS834 and CS840. Contacts CS800 are arranged to engage to establish a self-holding circuit for the coil before contacts CS834 separate, the corresponding contacts of the other car selecting relays being similiarly arranged. The separation of contacts CS834 breaks the circuit for the coils of the other car selecting relays, preventing the operation of these relays.

Contacts CS851 complete a circuit for coil ST847 of elevator No. 1 starting relay. This circuit is through contacts ST913, ST914a, ST915b and ST916c of the respective starting relays, transfer switch contacts TS926, contacts CS851 and IS846 and coil ST847. Elevator No. 1 starting relay, upon operation, separates contacts ST805, ST853, ST913 and ST1000 and engages contacts ST845, ST946, ST1035, ST1042, ST1049 and ST1075. The engagement of contacts ST845 establishes a self-holding circuit through return relay contacts RR844 and contacts IS846. These contacts are arranged to engage before contacts ST913 separate in the operating circuit, the corresponding contacts of the starting relays being similarly arranged. The purpose of contacts ST853, ST946, ST1035, ST1042 and ST1049 will be explained later. The separation of contacts ST805 breaks the circuit for coil CS801 of elevator No. 1 car selecting relay. This relay drops out to reengage contacts CS834, which reestablishes the circuits for the coils of the car selecting relays of elevators Nos. 2, 3 and 4, that for elevator No. 2 car selecting relay coil CS810a being through elevator No. 2 floor controller contact 812a and brush 813a. Of the three energized, car selecting relay for car No. 2 has the smallest air gap. Thus, elevator No. 2 car selecting relay operates, engaging contacts CS807a and CS861a and separating contacts CS835a and CS841a. Contacts CS807a establish a self-holding circuit. Contacts CS835a prevent the operation of the car selecting relays for cars Nos. 3 and 4.

Elevator No. 1 starting relay contacts ST913 and ST1000, together with contacts TS1027, TS1029, TS1031 and TS1033 of the transfer switch, act to prevent the establishment of a circuit for the coil of elevator No. 2 starting relay. Contacts ST913 are in a circuit directly controlling the starting relays, whereas contacts ST1000 and the aforementioned contacts of the transfer switch TS control the circuit for coil MD1010 of the master down call above relay, preventing the operation of this relay to engage its contacts MD936, MD937, MD940 and MD941 in a circuit directly controlling the coils of the starting relays. Thus, under the conditions assumed, the starting relay for one of the cars and the car selecting relay for another car are operated.

Contacts ST1075 complete a circuit for coil ARR1074 of elevator No. 1 auxiliary return relay. This circuit is through contacts ARR1076a, ARR1077b and ARR1078c of elevators Nos. 2, 3 and 4 auxiliary return relays, coil ARR1074 and contacts ST1075. Relay ARR, upon operation, engages contacts ARR1072 and ARR1044, and separates contacts ARR1083, ARR1090 and ARR1097. Contacts ARR1072 establish a self-holding circuit while contacts ARR1044 prepare a circuit for elevator No. 1 return relay coil RR1048. Contacts ARR1083, ARR1090 and ARR1097 prevent the operation of the auxiliary return relays of the other elevators except upon operation of the up and down switches of corresponding elevators. The purpose of this arrangement will be seen as the description proceeds.

In describing the operation of the system, hall calls mainly will be considered, as each car responds to its own car buttons as has been pointed out in describing Figures 5, 6, 7 and 6a.

Assume that a hall call is registered. This causes the starting of car No. 1 to answer the call, contacts ST391 and ST493 (Figure 6) of elevator No. 1 being in engagement. The manner in which this is effected has already been described. Car No. 1, which in effect has been a wild car under the previously assumed conditions, now becomes a wild car in fact. Assume that the call registered is an up call at the third floor. This causes the separation of contacts 3U1172 of the up third floor relay, breaking the circuit for coil UCA1220 of elevator No. 1 up call above relay. The up call above relay UCA therefore drops out to engage contacts UCA918. The engagement of these contacts does not by-pass contacts ST913 to establish a circuit for the coil of the starting relay ST for car No. 2 as elevator No. 1 down auxiliary direction relay contacts DA919 are separated. Contacts 3U1166 of the up third floor relay also separate under the assumed conditions, the circuit for coil UCB1217 of elevator No. 1 up call below relay remaining established, however, as previously traced. Similarly, if the call is a down call instead of an up call, this does not cause the operation of the starting relay for another car. The registration of the down call de-energizes coil DCA1216 of elevator No. 1 down call above relay, causing the engagement of contacts DCA1012. This does not cause the operation of relay MD to establish a by-pass for contacts ST913 as contacts DA1013 and TS1027 are separated.

Upon the establishment of the up direction circuit for car No. 1, contacts UA963 of elevator No. 1 up auxiliary direction relay engage. This completes a circuit for coil MU986 of the master up relay. This relay operates to engage contacts MU929, MU931, MU933 and MU935. The purpose of these contacts will be explained later, they having no effect upon the operation of the elevator under the conditions so far assumed. Also, contacts UA1026 and up and down relay contacts UDR1047 separate and contacts UDR953 engage. The purpose of these contacts will be seen as the description proceeds. In starting car No. 1, up and down switch UD engages contacts UD1073 and separates contacts UD806 and UD1046. The purpose of these contacts will be explained later.

As car No. 1 leaves the home station floor, floor controller brushes 804, 967 and 999 disengage stationary contacts 803, 966 and 999 respectively and floor controller cam 863 disengages floor brush switch 852, closing this switch. Contacts ST946 by-pass brush 967 and contact 966, maintaining the circuit for coil TS952 of the transfer switch. Assuming that no further calls are registered, car No. 1 stops at the third floor to pick up the passenger who registered the up third floor call and takes him to his desired destination.

With no further calls registered, car No. 1 remains idle at the floor at which the passenger alights. The starting relay for elevator No. 1 remains operated.

Upon the registration of another hall call, this call is responded to by car No. 1 as has been set forth in discussing Figures 5, 6, 7 and 6a. So long as any further hall calls which are registered are ahead of car No. 1, this car continues to answer these calls. However, upon registration of a hall call behind car No. 1, the car at the home station having its car selecting relay operated is started in operation to assist car No. 1. It has previously been assumed that the car selecting relay CSa for car No. 2 is operated.

Assume that car No. 1 is set for travel in the up direction and that an up call is registered for a floor below the car. The registration of this up call causes the dropping out of elevator No. 1 up call below relay UCB, due to the separation of back contacts of the up floor relay which registers the call. Assuming that this call is an up third floor hall call, the circuit for coil UCB1217 of elevator No. 1 up call below relay is broken by the separation of contacts 3U1166. This relay, in dropping out, engages its contacts UCB928 and UCB961. The purpose of contacts UCB961 will be explained later. Contacts UCB928 complete a circuit for coil ST865a of elevator No. 2 starting relay. This circuit is through contacts UCB928, contacts MU929 (engaged because car No. 1 is set for upward travel), contacts ST914a, ST915b and ST916c of the starting relays of elevators Nos. 2, 3 and 4 respectively, transfer switch contacts TS926, elevator No. 2 car selecting relay contacts CS867a, contacts IS864a and coil ST865a.

Elevator No. 2 starting relay STa, upon operation, engages contacts ST862a, ST947a, ST1036a, ST1056a, ST1063a and ST1082a, and separates contacts ST814a, ST871a, ST914a and ST1003a. The purpose of contacts ST814a, ST871a, ST1036a, ST1056a and ST1063a will be seen from later description. Contacts ST862a, upon engagement, establish a holding circuit for coil ST865a through contacts RR861a and contacts IS864a. Contacts ST914a prevent the establishment of a circuit for the coil of either elevator No. 3 starting relay or elevator No. 4 starting relay under the conditions so far assumed. The separation of contacts ST814a breaks the circuit for coil CS810a of elevator No. 2 car selecting relay. The reengagement of contacts CS835a upon the dropping out of elevator No. 2 car selecting relay completes a circuit for the coils of elevators Nos. 3 and 4 car selecting relays. The car selecting relay for elevator No. 3 having the smaller air gap, this relay operates to establish a self-holding circuit to break the circuit for the coil of elevator No. 4 car selecting relay and to prepare the circuit for coil ST883b of elevator No. 3 starting relay.

Elevator No. 2 starting relay, upon operation, also engages contacts ST493a and ST391a (see Figure 6a) to cause the starting of car No. 2, as previously described.

Upon the starting of car No. 2, the engagement of contacts UD1080a establishes a circuit for coil ARR1081a of elevator No. 2 auxiliary return relay. This circuit is through contacts UD1080a, coil ARR1081a and contacts ST1082a. Elevator No. 2 auxiliary return relay, upon operation, engages contacts ARR1079a to by-pass contacts UD1080a. It separates contacts ARR1076a, ARR1091a and ARR1098a in circuits for the coils of the auxiliary return relays for the other cars. Elevator No. 1 auxiliary return relay is maintained operated, however, by contacts ARR1072. It also engages contacts ARR1051a, preparing a circuit for coil RR1055a of elevator No. 2 return relay. Contacts UD1053a and UDR1054a prevent the establishment of a circuit for coil RR1055a at this time through contacts ST1035 and ST1036a, both of which are in engagement. Likewise, at least contacts UDR1047 prevent the establishment of a circuit for coil RR1048 of elevator No. 1 return relay under the assumed conditions through contacts ST1035 and ST1036a. This arrangement controls the return of the cars to the home station, as will be seen from later description.

Assume that in the previous example car No. 1 is set for travel in the down direction instead of the up direction and that an up call is registered for a floor above the car. This again is a call behind the car, which causes the starting of car No. 2 from the home station. Assume that car No. 1 is at the third floor and that the button pressed is the up fourth floor hall button. The pressing of this button causes the separation of contacts 4U1167 and 4U1173. The separation of contacts 4U1167 is without effect as the call is above the car. The separation of contacts 4U1173, however, breaks the circuit for coil UCA1220 of elevator No. 1 up call above relay. This relay, in dropping out, engages contacts UCA918. As contacts DA919 of elevator No. 1 down auxiliary direction relay are in engagement because of car No. 1 being set for downward travel, the engagement of contacts UCA918 completes a circuit for coil ST865a of elevator No. 2 starting relay, contacts UCA918 and DA919 by-passing contacts UCB928 and MU929 in the circuit previously traced. The operation of elevator No. 2 starting relay causes the starting of car No. 2 from the home station and the operation of elevator No. 3 car selecting relay CSb as above described.

Assume now that, with car No. 1 at the third floor and set for travel in the down direction, a down call instead of an up call is registered for a floor above the car. This also is a call behind the car, which causes the starting of car No. 2 from the home station. The energization of coil ST865a of elevator No. 2 starting relay is effected under the conditions now assumed through contacts MD936 of the master down call above relay instead of through contacts UCA918 or UCB928, both of which are separated under these conditions. The registration of this down call effects the dropping out of elevator No. 1 down call above relay DCA. For example, the registration of a down call at the fifth floor causes the separation of contacts 5D1180 of the down fifth floor relay. As the car is at the third floor, the separation of these contacts deenergizes coil DCA1216 of elevator No. 1 down call above relay. This relay engages contacts DCA1012 which, owing to the fact that contacts DA1013 are in engagement with car No. 1 set for downward travel, completes a circuit for coil MD1010 of the master down call above relay. This circuit is through contacts DCA1012, contacts DA1013, elevator No. 2 floor controller stationary contact 1001a and brush 1002a, elevator No. 2 starting relay contacts ST1003a, elevator No. 3 floor controller stationary contact 1004b and brush 1005b, elevator No. 3 starting relay contacts ST1006b, elevator No. 4 floor controller stationary contact 1007c and brush 1008c, and elevator No. 4 starting relay contacts ST1009c. The master down call above relay MD, upon operation, engages contacts MD936, completing the circuit for the coil of elevator No. 2 starting relay. Elevator No. 2 starting relay, upon operation, causes the starting of car No. 2 from the home station and the operation of relay CSb as above described. Contacts ST1014a and ST1003a separate at the same time, thereby maintaining relay MD operated until contacts ST862a engage but dropping out relay MD before car selecting relay CSb can operate to cause a false operation of the starting relay STb.

With both cars Nos. 1 and 2 in operation, should another hall call be registered which is behind both cars, a circuit is established to cause the starting of car No. 3 from the home station. The circuit for coil ST883b of elevator No. 3 starting relay is, as regards the portion of the circuit controlled by elevator No. 1, through either contacts UCA918 and DA919, UCB928 and MU929, or MD936, depending upon the position of car No. 1 with respect to the call registered and the direction of travel for which the car is set. As regards the portion of the circuit controlled by car No. 2, the circuit is through either contacts UCA920a and DA921a, contacts UCB930a and MU931, or contacts MD937, depending upon the position of car No. 2 with respect to the call registered and the direction of travel for which it is set. The remainder of the circuit for coil ST883b is through contacts ST915b, ST916c, TS926, CS885b and IS882b. Elevator No. 3 starting relay, upon operation, establishes a self-holding circuit and causes the starting of car No. 3 away from the home station. Elevator No. 3 car selecting relay drops out upon operation of the starting relay, causing the operation of the car selecting relay CSc of elevator No. 4. Contacts ST915b prevent the establishment of a circuit for coil ST901c of elevator No. 4 starting relay upon the engagement of contacts CS903c. Contacts ST1043b and ST1057b establish circuits paralleling the circuit through contacts ST1035 and ST1036a, contacts ST1042 and ST1056a being in engagement. The engagement of contacts UD1087b upon the starting of car No. 3 establishes a circuit for coil ARR1088b of elevator No. 3 auxiliary return relay through contacts ST1089b. This relay operates to engage contacts ARR1086b, by-passing contacts UD1087b. It separates contacts in circuits for the coils of the auxiliary return relays for the other cars, relays ARR and ARRa being maintained operated by their respective holding contacts. It also engages contacts ARR1058b in the circuit for coil RR1062b of elevator No. 3 return relay. This relay is not operated, owing to the fact that contacts UDR1061b are separated at the time contacts ARR1058b engage.

Car No. 4 is started in operation in a similar manner to assist cars 1, 2 and 3 when a hall call is registered which is behind all three of these cars. It is believed that this will be understood without any detailed description of the operations involved.

Thus it is seen from the above discussion that whenever a hall call is registered which is behind all cars in operation, another car is started in operation in response to the registration of the call. As soon as a car in operation has its home station return circuit set up, a call which is registered which is behind all other cars in operation causes the starting of another car from the home station regardless of the position of the call with respect to the car whose home station return circuit is set up provided the call is not a down call for a floor below that car. This is due to the fact that upon the dropping out of the starting relay, say for car No. 1, to set up the home station return circuit for that car, contacts ST913 engage, by-passing contacts UCA918, UCB928 and MD936 in a circuit for the coils of starting relays ST for the other cars. That this may be better understood, assume that cars Nos. 1 and 2 are in operation and that the starting relay for car No. 1 has dropped out and the home station return circuit for car No. 1 is established. Thus contacts ST913 are in engagement. Assuming that car No. 2 is set for upward travel and that an up call is registered for a floor below this car, this causes the operation of the starting relay for a car at the home station regardless of the position of the call with respect to car No. 1, the circuit being through contacts ST913, UCB930a and MU931. If car No. 2 is set for downward travel and an up call is registered above the car, again a circuit is established for the coil of the starting relay for a car at the home station, the circuit being through contacts ST913, UCA920a and DA921a. If the call is a down call above both cars, the circuit is completed through contacts DCA1012, DA1013, DCA1014a and DA1015a for coil MD1010 of the master down call above relay. This relay operates to engage contacts MD937, establishing a circuit through contacts ST913 for the coil of the starting relay for a car at the home station. However, with car No. 2 set for down travel and with the home station return circuit set up for car No. 1, the registration of a down call above car No. 2 but below car No. 1 does not establish a circuit for coil MD1010 inasmuch as contacts DCA1012 of elevator No. 1 down call above relay are separated. Thus contacts MD937 do not engage and a circuit is not established for the coil of the starting relay for a car at the home station. Instead, this call is picked up by car No. 1 on its return to the home station, the manner in which a car is stopped to answer a down call on its way to the home station having been set forth in discussing Figures 5, 6, 7 and 6a.

A down call for a floor below a car may be picked up by that car during its downward travel, regardless of whether the car is on an automatic return to the home station or has its starting relay operated. The car cannot pick up an up call for a floor below on its automatic return to the home station but can respond to such a call if travelling downwardly with its starting relay operated. The system may be arranged so that the registration of an up call below a car set for downward travel with its starting relay operated does not cause the starting of another car from the home station until it is determined whether or not such call is picked up by the car, as in the arrangement of Figures 5, 6, 7 and 6a. It may be considered desirable, however, for certain installations, to cause a car to start from the home station immediately upon registration of such a call under such conditions when another car is in operation set for upward travel, if the call is behind this other car and any other car which is set for upward travel.

Assume, for example, that car No. 1 is set for upward travel. Thus contacts UA983 are in engagement and master up relay MU is operated. Assume that car No. 2 is set for downward travel and that an up call is registered which is below both cars. This causes the dropping out of both elevator No. 1 and elevator No. 2 up call below relays, effecting the engagement of contacts UCB928 and UCB930a respectively. This establishes a circuit through contacts MU929 and MU931 for the coil of the starting relay of a car at the home station, starting this car in operation. If instead of this operation it is desired to provide the same operation as had in the system of Figures 5, 6, 7 and 6a in this respect, this may be done by omitting the master up switch MU and by arranging contacts UA983, UA985a, UA993b and UA996c directly in the circuits for the coils of the starting relays in place of contacts MU929, MU931, MU933 and MU935 respectively.

As in the arrangement for controlling two cars, exemplified by the control system of Figures 5, 6, 7 and 6a alone, a car is not started on an automatic return to the home station so long as a car call for that car is in registration upon reclosure of the hatchway door at the floor at which the car has stopped or is registered before the expiration of the time interval after the door is closed. As regards hall calls, when two or more cars are in operation, any car, upon making a stop under conditions where the hatchway door for that car at the floor at which the stop is made is opened, is automatically started upon a return to the home station upon the expiration of the time interval after the reclosure of the door, provided that at least one other car is still in operation and provided further that there is no call ahead to maintain the direction circuit for the direction in which the car has been travelling, or, if any such call does exist, it is picked up by another car before reclosure of the door, so that the direction circuit is broken at the time the door reaches closed position. If the door is not opened, the car is automatically started upon its return to the home station upon the expiration of the time interval after it is brought to a stop, provided that another car is still in operation and that there is no call ahead to maintain the direction circuit established or, if such call does exist, it is picked up by another car before the expiration of the time interval. In either case, a car may not be automatically started on its return to the home station when a call behind another car is in registration at the time the time interval expires. This will be explained later.

Assume that all four cars are travelling in the up direction, each in response to a car button, and that no other push buttons are pressed. Assume further that car No. 1 picks up its car call before any of the other cars picks up its car call. The breaking of the direction control circuit incident to the answering of this car call prevents the reestablishment of a direction control circuit for this car until the expiration of the time interval provided by relay TR. Contacts UDR1047 of elevator No. 1 up and down relay, reengaging as a result of the breaking of the direction control circuit, prepare a circuit for coil RR1048 of elevator No. 1 return relay. This circuit is completed upon the reengagement of contacts UD1046 of elevator No. 1 up and down switch as the car is brought to a stop and is through contacts M1045 of elevator No. 1 maintaining relay, contacts ARR1044 of elevator No. 1 auxiliary return relay and the circuits involving the series parallel arrangement of contacts ST1035 to ST1071c as illustrated. Elevator No. 1 return relay separates contacts RR844, breaking the circuit for coil ST847 of elevator No. 1 starting relay. The starting relay, in dropping out, separates contacts ST1075, breaking the circuit for coil ARR1074 of the auxiliary return relay. This in turn, by the separation of contacts ARR1044, deenergizes the return relay RR. The return relay reengages its contacts RR844 but this does not reestablish a circuit for coil ST847 as contacts ST845 are separated. Elevator No. 1 starting relay also reengages contacts ST426 (Figure 6) in dropping out, preparing the home station return circuit for this car. Upon reengagement of contacts TR447, this home station return circuit is completed, starting the car on its return to the home station as previously described.

Upon another one of the cars answering its car call under the conditions above assumed, it is caused to automatically start on the return to the home station in a similar manner. The first of the two remaining cars in operation to effect the deenergization of its starting relay as a result of answering its car call under the assumed conditions is caused to automatically start on its return to the home station upon the expiration of the time interval provided by its time relay. The other car, however, remains a wild car after answering its car call, since the dropping out of the up and down switch UD for this car does not establish a circuit for its return relay. Therefore the holding circuit for the starting relay for that car is not broken. Assume, for example, that car No. 4 is the last under the above assumed conditions of operation to drop out its up and down switch UD. Inasmuch as the starting relay for each of the other cars is deenergized, contacts ST1035, ST1036a, ST1042, ST1043b, ST1049, ST1056a, ST1057b, ST1063a and ST1070b are all separated. Therefore the reengagement of contacts UD1067c does not establish a circuit for coil RR1069c of elevator No. 4 return relay. The holding circuit for elevator No. 4 starting relay coil ST901c is therefore not broken and car No. 4 is not started on a return to the home station but remains at the floor at which the stop is made.

Should, under the conditions previously assumed where each car is responding to a car call, a hall call for a floor above the one for which the car call is registered for car No. 1 be in registration at the time car No. 1 picks up its car call, the direction control circuit for car No. 1 is not broken incident to the answering of the car call and contacts UDR1047 do not reengage. Thus, if this hall call is not picked up until after the reclosure of the hatchway door at the floor at which car No. 1 has made a stop, car No. 1 is restarted in the up direction. However, if this hall call is picked up before the reclosure of the hatchway door at the floor at which car No. 1 has made a stop, the reset of the hall button floor relay breaks the direction control circuit for car No. 1 and contacts UDR1047 reengage. This reengagement, together with the reengagement of contacts UD1046, energizes elevator No. 1 return relay RR, which separates its contacts RR844 to break the circuit for elevator No. 1 starting relay ST. Thus, the home station return circuit for car No. 1 is completed upon the reengagement of contacts TR447 (Figure 6), starting the car on its return to the home station.

The picking up of the hall call in the previous example by another car after the restarting of car No. 1 in the up direction from the floor at which it made a stop in response to its car call, causes the breaking of the direction control circuit for car No. 1. This causes car No. 1 to be brought to a stop at the next floor for which normal slow down can be made. Thus, after car No. 1 is brought to a stop and upon the expiration of the time interval provided by elevator No. 1 time relay TR, car No. 1 is automatically started upon its return to the home station.

Each elevator is provided with a maintaining relay, its operating coil being arranged in the hall call pick up circuits. This arrangement is illustrated for elevator No. 1 in Figure 9, where the operating coil of the maintaining relay is designated M1146. This coil is subject to each of brushes 1122, 1124, 1135 and 1137, so that it is energized whenever a hall call is picked up. In order to trace the circuit for this coil, assume that the car is travelling upwardly and that an up second floor hall call is picked up. This circuit, under such assumption, is through coil 2U1105 and contact 2U1111 of the up second floor relay, contact 1117, brush 1124, contacts SR1140, contacts UP1144, coil M1146, coil PR1148 and resistance 1150. The maintaining relay, upon operation, latches its contacts M1151 in engagement and its contacts M1045 in separated condition. Contacts M1151 prepare a circuit for the restoring coil M1154 of the maintaining relay while contacts M1045 control the operation of the return relay to effect the deenergization of the starting relay. The purpose of this arrangement is to prevent the dropping out of the starting relay for a car answering the farthest hall call for the direction in which it is travelling, until the expiration of the time interval provided by the time relay for that car, thereby permitting other cars to set up their home station return circuits and return to the home station.

Assume that a hall call is registered and that two or more cars are in operation running in the up direction in response to this call. Assume further that the call is picked up by car No. 1. As above explained, elevator No. 1 maintaining relay is operated incident to the picking up of the call, latching its contacts M1151 in engagement and M1045 in separated condition. So long as contacts M1045 are separated, a circuit cannot be established for return relay coil RR1048. Thus contacts RR844 remain engaged and elevator No. 1 starting relay ST remains energized.

As has previously been explained, the operation of the pick up holding relay PH incident to the picking up of the call causes the operated floor relay to be reset, the contacts of the pick up holding relay which short-circuit the operating coil of the pick up relay and a portion of the resistance in series therewith being designated PH1147 in Figure 9. The restoring of the call, under the conditions assumed, breaks the direction control circuits for the other cars in operation. This causes each of these cars to be slowed down and brought to a stop at the first floor reached thereby at which normal slow down can be effected. The dropping out of the up and down switches UD for these cars as they are stopped causes the operation of their respective return relays RR to break the holding circuits for their starting relays ST. Thus, upon the expiration of the time interval provided by the time relay for each of these cars, they are automatically started upon their return to the home station.

Upon the pressing of a car button for his desired destination by the passenger entering the car which answered the call, assumed to be car No. 1, elevator No. 1 slow down switch SL is operated as a result of the operation of relay UDR incident to the starting of the car. This switch engages contacts SL1152 before contacts UD1153 separate, thereby completing a circuit for restoring coil M1154 of the maintaining relay. This coil acts to release the latch, thereby resetting the relay. Elevator No. 1 return relay RR is not operated as contacts UDR1047 separate before contacts M1045 reengage. Thus the holding circuit for elevator No. 1 starting relay is not broken and the relay is not dropped out. Furthermore, the pressing of the car button causes the operation of elevator No. 1 car call relay to engage contacts CC850, by-passing contacts RR844 and ST845.

Should, in the above example, a passenger not enter the car and press a car button, upon the expiration of the time interval provided by the time relay TR, contacts TR1155 (Figure 9) reengage to effect the resetting of maintaining relay M. If the starting relays for the other cars are all deenergized at this time, the reengagement of contacts M1045 does not establish a circuit for coil RR1048 of the return relay inasmuch as all the parallel circuits including contacts ST1035 to ST1071c are open under these conditions. Thus, this car remains a wild car as the holding circuit for elevator No. 1 starting relay remains established. However, should the starting relay for any other car be in operated condition at the time the time interval expires, the reengagement of contacts M1045 establishes a circuit for elevator No. 1 return relay through one or more of the parallel circuits controlled by contacts ST1035 to ST1071c. This relay thereupon separates its contacts RR844, breaking the circuit for coil ST847. The starting relay, therefore, drops out to establish the home station return circuit for car No. 1, starting it on its return to the home station. Contacts TR1155 are preferably set to engage sufficiently ahead of the reengagement of contacts TR447 (Figure 6) to insure the dropping out of the starting relay to engage contacts ST426 and separate contacts ST391 by the time contacts TR447 engage.

Assume that the highest call is a down call and that this call is responded to by car No. 1 with one or more of the other cars in operation and with another call or calls registered to maintain the direction control circuits for these other cars. Assume further that the passenger entering car No. 1 at the floor at which the stop is made presses a car button for some lower floor. The pressing of the car button, by causing the engagement of contacts CC850 of elevator No. 1 car call relay, establishes another circuit for coil ST847. Upon car No. 1 answering the car call, its up and down relay UDR and up and down switch UD are dropped out, again establishing a circuit for coil RR1048 of elevator No. 1 return relay, assuming at least one of the cars still in operation. The return relay operates to deenergize elevator No. 1 starting relay and, upon the expiration of the time interval provided by elevator No. 1 time relay TR, car No. 1 is started on its return to the home station.

When all four cars are in operation, the first one to return to the home station is selected to be the next to leave. Assume that with all cars in operation car No. 1 has its home station return circuit set up and is the first to return to the home station. Elevator No. 1 starting relay, upon dropping out to prepare the home station return circuit, engages contacts ST805 in the circuit for the coil CS801 of elevator No. 1 car selecting relay. As car No. 1 arrives at a certain distance from the home station, brush 804 engages contact 803 so that, upon the dropping out of the up and down switch UD as the car is brought to a stop at the home station, a circuit is established for coil CS801 of elevator No. 1 car selecting relay by the reengagement of contacts UD806. This circuit is through contacts CS834, CS835a, CS836b and CS837c of the car selecting relays for all four elevators in series, contacts CS840, coil CS801, contacts IS802, contact 803, brush 804, contacts ST805 and contacts UD806. Elevator No. 1 car selecting relay, upon operation, establishes a self-holding circuit and separates contacts CS834 to prevent the establishment of a circuit for the coil of the car selecting relay for any other car arriving at the home station until the starting relay for car No. 1 is operated.

This arrangement for controlling the energization of the coils of the car selecting relays prevents the energization of more than one car selecting relay at a time and causes the car selecting relay operated to be for the car first to arrive at the home station. This is of particular importance where all four cars are in operation away from the home station and one of them is returned thereto in response to a call registered by the hall button at the home station floor. As this car will be started in the up direction in response to a car button under normal conditions, the operation of the car selecting relay for that car instead of for another car arriving at the home station, say just after the arrival of the first car, prevents the starting of this second car in response to a call behind the other cars in operation. Instead, such call behind is responded to by the car first to arrive at the home station.

For a better understanding of this operation, assume that all four cars are in operation away from the home station, that the home station hall button is pressed, and that car No. 1 returns to the home station in response to this call. Upon the engagement of floor controller brush 1135 (Figure 9) with contact 1131 as the car arrives at a certain distance from the home station, coil M1146 of the maintaining relay is not energized owing to the fact that this coil is short-circuited slightly in advance of the engagement of this brush and contact through an additional contact 1132 and brush 1138 on the floor controller and contacts DN1139 of the down reversing switch. This, the maintaining relay is not operated upon a stop at the home station. The dropping out of the up and down switch UD as the car comes to a stop energizes elevator No. 1 return relay RR, which deenergizes elevator No. 1 starting relay ST. The starting relay, in dropping out, reengages contacts ST805, completing the circuit for elevator No. 1 car selecting relay CS. Thus, should car No. 2, for example, return to the home station on its home station return circuit immediately after the return of car No. 1, car No. 2 car selecting relay cannot be operated as it too must await the dropping out of its up and down switch UD and therefore until the car comes to a stop. Car No. 1 up and down switch UD drops out first under the assumed conditions so that the car selecting relay for car No. 1 is operated instead of the car selecting relay for car No. 2.

Assume that the passenger enters car No. 1 and presses a car button for his destination. With car No. 2 arriving at the home station immediately after car No. 1, assume also that a call is registered which is behind the other cars in operation. If the car selecting relay for car No. 2 were operated, car No. 2 might start in answer to the call behind, before car No. 1. However, as car No. 1 must leave the home station in response to the car call which is registered, it can take care of the call behind the other cars. Thus the prevention of the operation of elevator No. 2 car selecting relay avoids starting a second car in the up direction on an unnecessary trip.

Assume that three of the cars are at the home station. As pointed out before, the other car is not returned to the home station on its automatic home station return circuit but it may be caused to return thereto in response to the pressing of its car button for that floor. Inasmuch as in an installation of more than two cars there is practically no chance of any one car having to bear the brunt of the service, the system as applied to four cars is arranged to maintain operated the starting relay for the car returning to the home station under such conditions, instead of deenergizing this relay and operating the starting relay for another car. The starting relay for the returning car is not deenergized owing to the fact that with only one starting relay operated no circuit can be made for the coil of the return relay for that car. As the return relay is not operated, the holding circuit for the coil of the starting relay is not broken. Thus this car remains in effect the wild car and will be the one to leave the floor in response to a subsequently operated hall button. The car already at the home station having its car selecting relay CS operated, maintains this relay in operated condition so that this car will be the next to leave in response to a hall call after the departure of the other car.

It may be desired in certain installations to permit a car which makes a stop at a floor in response to a car button under conditions where the direction control circuit is broken, to respond to a hall call for a floor above the one at which the stop is made and behind all other cars in operation, when the registration of this call occurs while the car is stopped, provided no up call is in registration for a floor below the car, instead of setting up the home station return circuit to start this car on its return to the home station and starting another car from the home station. An arrangement for providing this control has been illustrated as part of the circuits, and involves the transfer switch TS and the auxiliary car selecting relays ACS.

Assume, for example, that car No. 1 is travelling in the down direction in response to a car call for a floor above the home station and that one or more other cars, for example car No. 2, are travelling in the up direction. As car No. 1 picks up its car call its direction control circuit is broken. Therefore contacts UDR953 separate and contacts DA854 engage. As the car comes to a stop, its return relay RR is energized to break the circuit for its starting relay ST as previously described. Thus contacts ST946 separate and contacts ST853 engage. Assuming no up call in registration for a floor below the car so that contacts UCB961 are separated, the separation of contacts ST946 breaks the circuit for coil TS952 of the transfer switch, inasmuch as with the car away from the home station brush 967 is disengaged from contact 966. The transfer switch TS, upon dropping out, separates contacts TS926 and reengages contacts TS927. This transfers a feed utilized under conditions previously assumed to control the coils of the starting relays ST through the contacts of the car selecting relays CS to the coils of the auxiliary car selecting relays ACS.

Assume further that after car No. 1 is stopped but before the engagement of the contacts of the time relay to establish the home station return circuit, an up call is registered for a floor above the one at which the car is stopped but below car No. 2. This call, being below car No. 2, causes the reengagement of contacts UCB930a of elevator No. 2 up call below relay. As car No. 2 is set for upward travel, contacts MU931 are in engagement. Therefore the engagement of contacts UCB930a prepares a circuit for the coil of one of the auxiliary car selecting relays ACS. The circuits for coils ACS892b and ACS910c of elevators Nos. 3 and 4 auxiliary car selecting relays cannot be completed at this time inasmuch as with these cars at the home station under the conditions assumed, their switches 886b and 904c respectively are open. The circuit for coil ACS874a of elevator No. 2 auxiliary car selecting relay cannot be completed since at least contacts ST871a of its starting relay are separated under the conditions assumed. A circuit can be completed, however, for coil ACS856 of elevator No. 1 auxiliary car selecting relay upon reengagement of contacts TR855 of elevator No. 1 time relay, inasmuch as switch 852 is in engagement owing to car No. 1 being away from the home station, contacts ST853 are in engagement owing to elevator No. 1 starting relay being deenergized, and contacts DA854 of elevator No. 1 down auxiliary direction relay are in engagement as the car is stopped.

Auxiliary car selecting relay ACS upon operation engages contacts ACS857 to complete a circuit for coil ST847 of elevator No. 1 starting relay. The starting relay engages contacts ST845 to establish its self-holding circuit, contacts RR844 having reengaged immediately after the holding circuit was broken as previously set forth. It also separates contacts ST853 to deenergize the auxiliary car selecting relay ACS, contacts ST845 being set to engage before the separation of contacts ST853 to insure the establishment of the holding circuit. Contacts TR855 are set to reengage to cause the operation of the starting relay slightly ahead of the reengagement of contacts TR447 (Figure 6), the corresponding contacts of the time relay for the other cars being arranged in a similar manner. Thus starting relay contacts ST426 (Figure 6) are separated before the reengagement of contacts TR447, thereby preventing the completion of the home station return circuit. Car No. 1, therefore, upon reengagement of contacts TR447, establishes a circuit through the contacts of the auxiliary floor relay FR for the floor for which the call behind car No. 2 is registered and through contacts ST391 of the starting relay to establish a direction control circuit to cause the car to start in the up direction from the floor at which the stop is made. Thus car No. 1 is started in the up direction to answer the call behind car No. 2 instead of starting another car from the home station to answer this call.

If, in the above example, car No. 2 had been travelling in the down direction, the registration of an up call above both cars after car No. 1 was brought to a stop but before the establishment of its home station return circuit would have caused car No. 1 to be started in the up direction to answer the call instead of starting another car from the home station. It is believed that this will be understood from the above description, the circuit for coil ACS856 of elevator No. 1 auxiliary car selecting relay being through contacts UCA920a and DA921a instead of contacts UCB930a and MU931.

With car No. 2 travelling in the down direction, the registration of a down call above both cars after car No. 1 was brought to a stop but before the establishment of its home station return circuit, again would have caused car No. 1 to be started in the up direction to answer the call instead of starting another car from the home station. The completion of the circuit for coil ACS856 of elevator No. 1 auxiliary car selecting relay under such conditions is effected by the master down call above relay MD. The registration of a down call above both cars causes the dropping out of their respective down call above relays DCA, effecting the engagement of contacts DCA1012 and DCA1014a. This establishes a circuit for coil MD1010 of the master down call above relay, the circuit being through contacts DCA1012, contacts UA1026 (closed because the direction circuit for car No. 1 is broken), contacts TS1027 (closed because the transfer switch is deenergized), contacts DCA1014a, contacts DA1015a (closed because car No. 2 is set for downward travel), contact 1004b, brush 1005b, contacts ST1006b, contact 1007c, brush 1008c and contacts ST1009c. The master down call above relay therefore operates to engage contacts MD936, MD937, MD940 and MD941, contacts MD937 by-passing contacts UCA920a, DA921a, UCB930a and MU931 to establish a circuit for coil ACS856. The contacts of the up auxiliary direction relays UA for the various elevators in the circuit for coil MD1010 prevent the operation of the master down call above relay MD under conditions where a down call above all operating cars is registered but one or more of these cars is set for upward travel and therefore is in condition to answer this call.

The same operation is had if the car which made the stop, car No. 1 in the examples previously given, had been travelling in the up direction instead of in the down direction. In all examples given where car No. 1 responds to the call behind car No. 2 instead of starting another car from the home station, elevator No. 1 starting relay upon operation incident to car No. 1 responding to the call behind car No. 2, engages contacts ST946 to reestablish the circuit for coil TS952 of the transfer switch. This permits the starting of another car from the home station immediately upon the registration of another call which is behind all cars in operation.

If, in any of the above examples, the call were registered after the reengagement of contacts ST426 upon the expiration of the time interval, the home station return circuit for car No. 1 would be established and the car started on its return to the home station. Thus, instead of causing car No. 1 to answer the call, a car is started away from the home station. This is due to the fact that as soon as the home station return circuit is established for car No. 1, contacts UDR953 engage, reestablishing a circuit for coil TS952 of the transfer switch. Thus contacts TS926 are engaged and contacts TS927 separated so that the registration of the call establishes a circuit for say coil ST883b of elevator No. 3 starting relay, assuming car No. 3 to be at the home station and its car selecting relay operated, either through contacts UCA929a and DA921a, contacts UCB930a and MU931, or contacts MD937.

If, in the previous examples, the call which is registered while car No. 1 is stopped is an up call for a floor below the car, the home station return circuit for car No. 1 is established immediately upon the expiration of the time interval and the car started upon its return to the home station. Also, a car is started from the home station immediately the call is registered, since the call is behind car No. 2. These operations are due to the fact that as the call is below car No. 1, the registration of the call effects the engagement of contacts UCB961, causing reoperation of the transfer switch TS. As the call is behind car No. 2, a circuit is established for the coil of the starting relay of the car selected to be the next to leave the home station through contacts ST913 and either through contacts UCA920a and DA921a or UCB930a and MU931.

If, under the conditions above assumed, i. e., where a hall call is registered while car No. 1 is stopped which is above the car and also behind all other cars in operation, an up call is also registered for a floor below the one at which car No. 1 makes the stop, car No. 1 is started on its return to the home station and another car is started from the home station. If this up call is registered before car No. 1 picks up its car call, the direction control circuit for car No. 1 is maintained established and elevator No. 1 starting relay is maintained operated. This maintains the transfer switch TS in operated condition. If the up call is registered after the direction control circuit for car No. 1 is broken, the call being below car No. 1 causes contacts UCB961 to engage. This causes the reoperation of the transfer switch. Thus, in either case, contacts TS926 are engaged and contacts TS927 separated, thus preparing a feed to the coils of the starting relays ST instead of those of the auxiliary car selecting relays ACS. Therefore, a car is started from the home station instead of having car No. 1 respond to the call registered while it is stopped as in the examples previously given.

If it is preferred always to start a car from the home station upon registration of a hall call behind other cars in operation instead of having a car which makes a stop with its direction control broken answer such calls under certain conditions such as above set forth, this may be done by omitting the transfer switch and its control circuits and the auxiliary car selecting relays and the control circuits therefor beginning with contacts TS927 of the transfer switch. This would involve joining the wires at the point where contacts TS926 are removed and omitting the by-pass circuits involving, for example, contacts UA1026 and TS1027 around the contacts of the various down auxiliary direction relays DA in the circuit for coil MD1010.

When a wild car is idle at some intermediate floor and the other three cars are standing at the home station, a passenger upon entering one of the cars at the home station and pressing a car button for his destination causes the wild car to be started on its automatic return to the home station. Assume that car No. 1 is the wild car idle at some intermediate floor and that a passenger enters car No. 2 at the home station and presses a car button. This causes the operation of the car call relay CCa of elevator No. 2, which engages its contacts CC866a to establish a circuit for coil ST865a for elevator No. 2 starting relay. This relay engages contacts ST1036a, completing a circuit for coil RR1048 of elevator No. 1 return relay. This relay separates contacts RR844 to break the circuit for coil ST847 of elevator No. 1 starting relay, which drops out, starting car No. 1 on its return to the home station.

A similar operation is had where all four cars are at the home station. Under such conditions one of the cars has its starting relay ST operated and its auxiliary return relay ARR operated, the operation of the auxiliary return relay for the car having its starting relay operated being assured by the arrangement of back contacts on each of the other auxiliary return relays in series in a circuit controlling the energization of the coil of this auxiliary return relay. Assume that relays ST and ARR are operated for car No. 1 and that a passenger enters car No. 2 instead of car No. 1 and presses a car button for his destination. This causes the operation of the starting relay for car No. 2, which causes the deenergization of the starting relay for car No. 1 as above set forth, so that car No. 2 becomes a wild car instead of car No. 1.

The non-start relays NS act, as set forth in describing the system of Figures 5, 6, 7 and 6a, to insure the answering of all registered hall calls. The contacts of the non-start relays are arranged in the circuit controlling the feed to the coils of the starting relays. The coils of the non-start relays are connected as shown in Figure 5. Thus, when the car is in operation, the circuit for the coil of the non-start relay for that car is completed each time a stop is made so long as there are hall calls yet to be responded to and, if all cars are idle, the circuit for the coil of the non-start relay for the car having its starting relay operated is completed immediately upon registration of a hall call. This has all been explained in connection with Figure 5. Assume that car No. 1 is a wild car idle at some intermediate floor and that it does not start in operation in response to the pressing of a hall button within a certain time interval after the button has been pressed. Upon the expiration of this time interval, elevator No. 1 non-start relay engages contacts NS942 to establish a circuit for the coil of the starting relay of the car at the home station whose car selecting relay CS is operated, starting this car in operation. If all four cars are at the home station with the starting relay for car No. 1 operated and car No. 1 does not start in operation within the time interval after the registration of a hall call, the engagement of contacts NS942 establishes a circuit for the coil of the starting relay for the car whose car selecting relay CS is operated. If car No. 1 is in operation and a hall call is registered behind the other cars in operation to which car No. 1 should respond but car No. 1 upon making a stop does not restart within the time interval to respond to the call, here again elevator No. 1 non-start relay, by engaging contacts NS942, causes another car to start from the home station.

Resistances 982, 995a, 1024b and 1041c prevent the flow of high circulating currents as the various generators are started in operation as previously explained. The generators, 976, 991a, 1020b and 1037c, with their respective protective resistances in series therewith, are connected in parallel relation by their respective potential relays P.

The functioning of the system as applied to two elevators, as exemplified by Figures 5, 6, 7 and 6a, or as applied to more than two elevators, as exemplified by Figures 8, 9 and 10 in conjunction with Figures 5, 6, 7 and 6a, might be further illustrated by describing the operations obtained under conditions other than those previously assumed, but it is believed that these operations will be understood from previous description, rendering further description unnecessary.

In reviewing the operation of the control system as applied to two elevator cars, as exemplified by Figures 5, 6, 7 and 6a, when both cars are idle, one car has its starting relay operated. This car is usually a wild car standing at some floor other than the home station and the other car is at the home station, although both cars may be at the home station. The hatchway door for each car at the floor at which the car is standing is closed but not locked. Also, the gate of each car is open.

Upon the pressing of the hall button at a floor other than the one at which the car having its starting relay operated is positioned, the motor-generator set for this car is started, the car gate is closed, the hatchway door locked, and the car is started in a direction toward the floor at which the call is registered. As the car arrives at a certain distance from the floor at which the call is registered, it is caused to slow down and finally is brought to a stop when it arrives at the floor landing. The car gate is opened and the hatchway door for the floor at which the stop is made is unlocked incident to the stopping of the car.

The hatchway door being unlocked, the intending passenger opens the door and enters the car. The hatchway door closes automatically upon being released. Upon pressing the car button for his desired destination, the car gate closes, the hatchway door is locked and the car is started in a direction toward the floor for which the car call is registered. Upon arriving at this floor, the car is brought to a stop, the car gate is opened and the hatchway door unlocked, permitting the passenger to leave the car.

If other calls are registered either by car buttons in that car or by hall buttons for floors in the direction in which the car is set to travel, the car stops at each of these floors for which car calls are registered and for which hall calls for the direction in which the car is set to travel are registered. It continues to travel in the same direction after each stop until the farthest floor in that direction for which a call is registered is reached, where it is brought to a stop. This call may be a car call or it may be a hall call for either direction of travel. In case of a hall call, the entering passenger is given preference in determining the direction in which the car is started away from the floor. In case the stop is in response to a car call and hall calls are registered for floors in the opposite direction, the car is automatically started in the opposite direction to answer these calls. If no calls for the opposite direction are registered, the car remains at the floor at which it is stopped. The motor-generator set is maintained operated until all push buttons have been responded to and the gate has been moved to open position upon the last stop being made.

The wild car continues to answer the hall calls that are registered so long as these calls are ahead of the car. The registration of a hall call behind the wild car causes operation of the starting relay for the home station car and this car is started in operation. Each car responds to its own car calls so that the home station car may also be started in operation by a passenger entering the car and registering a car call for his destination. In either case, the car upon starting in operation also becomes a wild car, answering its own car calls and assisting the other wild car in the answering of the hall calls that are registered.

Either car may be returned to the home station in response to a car call or a hall call for that floor. In addition, when both cars are in operation, the starting relay for one of them is dropped out and the car is automatically returned to the home station when conditions permit. Neither car is automatically returned to the home station so long as a car call for that car remains to be responded to. As regards hall calls, the first car to make a stop under conditions where there is no call ahead to maintain its direction control circuit when the stop is made or this circuit is broken incident to the other car picking up the only call maintaining this circuit and where no call behind the other car is in registration as the time interval expires, is automatically started on its return to the home station upon the expiration of the time interval.

If, when a car is being automatically returned to the home station, a call behind the other car is registered, the car is caused to answer this call without completing its return to the home station. If the call is ahead of the car the car is maintained in operation until the floor is reached for which the call is registered, where it is brought to a stop. If the call is behind the car, the car is caused to stop at the next floor reached and reverse its direction of travel to answer the call. The travel of the car to the home station may be interrupted also to respond to a call for the direction in which it is travelling, regardless of whether the call is behind the other car or not. Should the other car reach the home station first, the home station return circuit for the car is broken and it is brought to a stop at the next floor reached.

Should the wild car be returned to the home station on a car call under conditions where a car is already at the home station, the starting relay for the home station car is operated, making this car in effect the wild car and the other car becomes the home station car. With both cars at the home station, should a passenger enter the car not having its starting relay operated and press a car button for his destination, the starting relay for this car is operated and the starting relay for the other car dropped out. Thus the other car becomes the home station car and the car with the car call registered becomes the wild car. Should the wild car be idle at some floor other than the home station and a passenger enter the car at the home station and press a car button, the home station car is started in operation and becomes the wild car and the other car is started on its return to the home station. Should a call be registered to which the car having its starting relay operated can respond and this car does not start to respond to this call within a predetermined time interval, the car at the home station is started in operation to respond to this call.

In applying the control system to more than two elevator cars, as exemplified by Figures 8, 9 and 10 taken in conjunction with Figures 5, 6, 7 and 6a, substantially the same operation is had. The operation is altered in certain respects due to the fact that more cars are available. When all cars are idle, one of the cars has its starting relay operated. Here again the car having the starting relay operated is usually a wild car standing at some floor other than the home station and the other cars are at the home station.

Upon the registration of a hall call, the car having its starting relay operated answers the call. The wild car continues to answer the hall calls that are registered so long as these calls are ahead of the car. The registration of a hall call behind the wild car causes a selected one of the cars at the home station to be started in operation. When one or more cars are at the home station, one of them is always selected to be the next to respond to hall calls. The registration of the call behind the wild car causes the starting relay for the selected car to operate and the starting relay in turn causes another car at the home station to be selected as the next to leave in response to a hall call. Thus, the registration of a hall call behind both cars in operation causes the selected car to be started in operation from the home station and the car remaining at the home station is started in operation upon the registration of a hall call behind all the other cars in operation.

Each car responds to its own car calls and in doing so causes the operation of its starting relay if this relay is not already operated. Thus, any car at the home station may be started in operation on a car call and in doing so it becomes a wild car and acts thereafter to assist the other cars in operation in answering hall calls.

Any car in operation is returned to the home station in response to the registration of its car call for that floor. Also, a car in operation may be returned to the home station in response to the registration of a hall call for that floor. When two or more cars are in operation, all but one of them are automatically returned to the home station when conditions permit. No car is automatically returned to the home station so long as it has a car call to be responded to. As regards hall calls, a car, upon making a stop, is automatically started upon its return to the home station upon the expiration of the time interval if there is no call ahead to maintain its direction control circuit when the stop is made or this circuit is broken incident to another car or cars picking up the only call or calls maintaining this circuit. When only two cars remain in operation, only one of them is started on its automatic return to the home station and the other, upon answering the last call, remains at the floor at which the stop is made. However, should the other car travel to the home station in response to a call and reach the floor ahead of the car on its automatic return to the home station, the home station return circuit for that car is broken and it is brought to a stop at the next floor reached. When the only remaining call is a hall call and two or more cars are responding to this call, the one which picks up the call is maintained in operation as the wild car and each of the others is stopped at the next floor at which a stop can be made and automatically started on its return to the home station.

As soon as a car has its home station return circuit set up, the registration of a call behind the other cars in operation starts another car from the home station regardless of the position of the call with respect to the car whose home station return circuit is set up, provided the call is not a call for the direction in which the car must travel to return to the home station and ahead of the car. Such a call is picked up by the car on its return to the home station.

A car, when on its automatic return to the home station, cannot stop to pick up a hall call for the opposite direction of travel. If the car is travelling toward the home station with its starting relay operated, however, it can pick up a hall call for the opposite direction of car travel provided no calls exist for floors below. The system may be arranged so that another car is not started from the home station upon the registration of such call for the opposite direction of travel until it is determined whether or not the car set for travel toward the home station responds to such call. It may also be arranged so that, if another car is in operation set for travel away from the home station and such call is behind this other car, a car is started from the home station immediately upon registration of such call without waiting to see whether the car travelling toward the home station responds to the call.

When all four cars are in operation, the first one to return to the home station is selected to be the next to leave in response to a hall call.

Should three cars be at the home station and the wild car be returned to the home station on a car call, the starting relay for this car is maintained operated and the car remains the wild car. With all four cars at the home station, should a passenger enter a car not having its starting relay operated and press a car button for his destination, the starting relay for this car is operated and the car becomes a wild car, the starting relay previously operated for another car at the home station dropping out. Similarly, when the wild car is idle at some intermediate floor with the other three cars standing at the home station, a passenger on entering one of the cars at the home station and pressing a car button for his destination causes the wild car to be started on its automatic return to the home station and the car for which the car call is registered becomes a wild car. Should a call be registered to which a wild car can respond and which is behind all other cars in operation and this car does not start to respond to this call within a predetermined time interval, the selected car at the home station is started in operation to respond to this call.

The system may be arranged so that when a car makes a stop in response to a car call under conditions where its direction control circuit is broken, it may respond to a hall call for a floor in a direction from the car away from the home station which is behind all other cars in operation instead of starting another car from the home station, when the registration of this call occurs while the car is stopped, provided no hall call is in registration for a floor toward the home station for travel away from the home station.

An elevator control system such as disclosed in Figures 5, 6, 7 and 6a as applied to two elevators and in Figures 8, 9 and 10 in conjunction with Figures 5, 6, 7 and 6a as applied to two or more elevators has many advantages. When all cars are idle, at least one car is at the home station. This is of particular advantage where the home station is at the lobby floor in that it renders that car available to take care of incoming traffic. Also, one car is available to take care of hall calls. Permitting this car to remain at the floor at which it is stopped in responding to the last call provides economical operation. Also, causing the wild car to respond to the first hall call registered enhances service as the wild car on the average will be nearer the floor for which the call is registered than a car at the home station. Economy of operation is also effected by having the wild car or cars answer all hall calls until a hall call is registered which is behind all cars in operation. When more than one car is in operation, a car is returned to the home station as soon as there are no calls registered which require further operation of that car. This is of particular advantage where the home station is at the lobby floor as it insures a car at the home station for use by incoming traffic as much of the time as service demands permit. This is furthered by causing a wild car, when idle at a floor, to return to the home station immediately a car is sent away from the home station by an entering passenger. By permitting any car to be the wild car after all calls are responded to, the service provided by the cars and therefore the total travel and total number of stops for each car tends to be equalized.

The control system may be arranged so that the wild car, instead of remaining at the floor at which the last stop is made after all calls have been responded to, travels to a selected floor, for example the floor midway between the two terminals. This may be done, for example, by disconnecting in the control system for each elevator the wire through contacts CC441, PC427 and HC414 in Figure 6 from the wire joining contacts ST426 and IS413, reconnecting this wire to the floor brush switch for the floor selected as the "stand by" floor and repositioning contacts IS413 to control both the circuit through contacts ST426 and the circuit through contacts CC441, ST426 and IS413. With this arrangement, the car which remains a wild car, after the home station return circuit for each of the other cars in operation has been set up, travels to the "stand by" floor after the last call has been responded to. Such arrangement may be considered desirable for certain installations in which it is preferred to have the wild car, when idle, to be at a floor which on the average is nearer the floor for which the first hall call is thereafter registered, rather than to gain in power consumption by permitting the wild car to remain at the floor at which the last stop is made.

In certain installations it may be desired to have a certain one of the cars always the wild car. This may be done in the control system illustrated by permanently connecting the coil of the starting relay ST for that car, for example coil ST453 of Figure 6, directly to supply main I, thereby rendering all contacts now shown in controlling circuits for the coil, except contacts IS454, ineffective to control the starting relay. With this arrangement, this particular car has its starting relay permanently operated, thus preventing the setting up of its automatic home station return circuit so that such car will always remain the wild car. It is to be understood that, with the system arranged so that a certain car is always the wild car, the control system illustrated could be modified in several respects, many of these modifications being by way of simplification. The permanent energization of the starting relay is resorted to simply to illustrate how such result may be obtained.

In the previous description, a "call behind" a car has been defined as an up call below that car when the car is set for upward travel and as an up or a down call above that car when the car is set for downward travel. It is to be understood that this may be varied, particularly where the operation of the system in responding to calls is modified.

In any of the arrangements previously discussed, there may be incorporated the feature of starting a home station car in operation to assist a wild car when the number of calls to be responded to exceeds a predetermined number by utilizing for instance the principles set forth in the patent to Lindquist, Dunn and Larson No. 1,904,647, granted April 18, 1933, to effect the control of the operation of the starting relays.

Although the invention is particularly applicable to elevator systems involving two or more elevators, certain of the features of the invention are also applicable to single elevator installations. Among these is the initiation of slow down upon the disengagement of a circuit controlling device, actuated in accordance with movement of the car, from a cooperating stationary device for the floor at which the stop is to be made, thereby assuring uniform slow down with accurate stopping.

It is contemplated that many of the features of the invention disclosed may be used in connection with apparatus and circuits different from those specifically described and also in connection with other forms of elevator control. For example, certain features of the invention are applicable to collective control installations in which only one hall button is provided at each landing. This is especially so as regards starting a car in operation to assist in answering of hall calls and the automatic return of a car to the home station. With such system arranged to start a car from the home station in response to a "call behind", a "call behind" would preferably be one for a landing which each car in operation has passed in the direction in which it is set for travel when the call is registered. As a further example, certain features of the invention are applicable to collective control installations in which a car, once started in either direction, is maintained set for travel in that direction until the terminal floor in that direction is reached, regardless of the calls registered. A system of this character as applied to an elevator installation in which both an up hall button and a down hall button is provided at each intermediate floor is disclosed in Patent No. 1,904,647, above referred to. In such a system with both up and down hall buttons, a "call behind" would preferably be, when each car in operation is set for upward travel, an up hall button at a landing below such car or cars and, when such car or cars are set for downward travel, a down hall button at a landing above such car or cars.

Various alterations may be made. The manner of selecting the cars for starting from the home station may be changed. In certain installations it may be considered desirable, when both cars are at the home station, if a two car installation, or when two or more cars are at the home station, if an installation of more than two cars, to permit any one of them to start in response to a hall call, without being preselected. Also, in certain installations of more than two cars, there may always be more than one wild car. Alterations in the control of the hoisting motor may be made and power supply may be either from direct current or alternating current supply mains. Other forms of control mechanism may be employed. The system of control disclosed is very complex and admits of many other variations which do not depart from the spirit and scope of the invention. Many apparently widely different embodiments of the invention can be made within the scope of the invention and many different combinations of features discussed may be employed other than those for which specific examples have been given. It is therefore intended that all matter contained in the above description or shown in the accompanying drawings shall be interpreted as illustrative and not in a limiting sense.

What is claimed is:

1. An elevator system comprising; a plurality of elevator cars; a plurality of landings served by the cars; call registering means for each of said landings; means for causing one of said cars to respond to the calls that are registered, so long as it is the only car in operation; and means for causing a second car to start in operation in response to a subsequently registered call to assist said one car in answering calls, provided such subsequent call is behind said one car.

2. An elevator system comprising; a plurality of elevator cars; a plurality of landings served by the cars; call registering means for each of said landings; means responsive to the first call that is registered for starting one of said cars in operation; and means for causing a second car to start in operation in response to the next call registered, provided such call is behind said one car.

3. An elevator system comprising; a plurality of elevator cars; a plurality of landings served by the cars; call registering means for each of said landings; means responsive to the first call that is registered for starting one of said cars in operation; means responsive to the first one of the subsequently registered calls that is behind said one car for starting a second car in operation; and means for causing the calls that are registered to be answered by said one car when it is the only car in operation and for causing said second car to assist said one car in answering calls when said second car is started in operation.

4. An elevator system comprising; a plurality of elevator cars; a plurality of landings served by the cars; call registering means for each of said landings; means for causing each call that is registered to be answered by a car; and means controlled by the positions of the cars with respect to the landings for which calls are registered for determining the number of cars in operation responding to calls.

5. An elevator system comprising; a plurality of elevator cars; a plurality of landings served by the cars; call registering means for each of said landings; means for causing each call that is registered to be answered by a car; and means controlled by the direction of travel of the cars responding to calls and their positions with respect to the landings for which calls are registered for determining the number of cars in operation responding to calls.

6. An elevator system comprising; a plurality of elevator cars; a plurality of landings served by the cars; call registering means for each of said landings; means responsive to the first call that is registered for starting one of the cars in operation; and means controlled by the position of such car with respect to the landings for which calls are subsequently registered for causing a second car to start in operation when a call is registered which is behind said one car.

7. An elevator system comprising; a plurality of elevator cars; a plurality of landings served by the cars; call registering means for each of said landings; means responsive to the first call that is registered for starting one of the cars in operation; and means controlled by the direction in which said one car is set for travel and its position with respect to the landings for which calls are subsequently registered for causing another car to start in operation in response to a registered call behind said one car.

8. An elevator system comprising; a plurality of elevator cars; a plurality of landings served by the cars; call registering means for each of said landings; means for causing the calls that are registered to be answered by the cars that have been started in operation to respond to calls; means for causing one of said cars to be a wild car and the other cars to be home station cars; means responsive to the first call that is registered for starting said wild car in operation; and means controlled by the direction in which said wild car is set for travel and its position with respect to the landings for which calls are registered while it is responding to calls for causing a car to start in operation from the home station in response to the registration of a call behind said wild car.

9. An elevator system comprising; a plurality of elevator cars; a plurality of landings served by the cars; call registering means for each of said landings; means for causing one of said cars to operate as a wild car; means for causing the calls that are registered to be answered by said wild car when it is the only car in operation; and means responsive to a registered call which is behind said wild car for starting a second car in operation, said last named means being ineffective to start such second car in operation in response to a registered call which is ahead of said wild car.

10. An elevator system comprising; a plurality of elevator cars; a plurality of landings served by the cars; call registering means for each of said landings; a home station; means for causing each of the cars but one to be a home station car and said one car to operate as a wild car; means for causing all calls that are registered to be answered by said wild car, provided such calls are ahead of the car; and means responsive to the first call registered behind said wild car for starting a car in operation from the home station to assist said wild car in answering calls that are registered.

11. An elevator system comprising; a plurality of elevator cars; a plurality of landings served by the cars; call registering means for each of said landings; a home station; means for causing each of the cars but one to be a home station car and said one car to operate as a wild car; means responsive to the first call that is registered for starting the wild car in operation; means responsive to a subsequently registered call, provided it is behind said wild car, for starting a car in operation from the home station; and means for causing the calls that are registered to be answered by said wild car when it is the only car in operation but, when a car is started in operation from the home station, for causing such car to assist said wild car in answering calls that are registered.

12. An elevator system comprising; two elevator cars; a plurality of landings served by the cars; call registering means for each of said landings; a landing serving as a home station; means for causing one of said cars to operate as a wild car, remaining at a landing at which a stop is made when no calls are to be responded to, and for causing the other car to remain at the home station so long as no call is registered which is behind the wild car; means responsive when said wild car is idle at a landing, to the first call that is registered for starting the wild car in operation; means responsive to the first one of the subsequently registered calls that is behind said wild car for starting the car at the home station in operation; and means for causing the calls that are registered to be answered by said wild car when it is the only car in operation but, when the other car is started in operation, for causing said other car to assist said wild car in answering calls that are registered.

13. An elevator system comprising; a plurality of elevator cars; a plurality of landings served by the cars; call registering means for each of said landings; a landing serving as a home station; means for causing one of said cars to operate as a wild car, remaining at a landing at which a stop is made when no calls are to be responded to, and for causing the other cars to remain at the home station so long as no call is registered which is behind the wild car; means responsive when said wild car is idle at a landing, to the first call that is registered for starting the wild car in operation; means responsive, when the wild car is the only car in operation, to the first one of the subsequently registered calls that is behind said wild car for starting a car in operation from the home station and, when more than one car is in operation responding to calls, to the first one of the subsequently registered calls that is behind all of such cars for starting another car in operation from the home station; and means for causing the calls that are registered to be answered by said wild car when it is the only car in operation but, when one or more other cars are in operation, for causing such cars to assist said wild car in answering calls that are registered.

14. An elevator system comprising; a plurality of elevator cars; a plurality of landings served by the cars; call registering means for each of said landings; a landing serving as a home station; means for each car responsive to registered calls, when the car is in operation responding to calls, for intercepting the car during its travel in a given direction at the landings for which calls are registered; means for starting a car from the home station in response to the registration of a call under conditions where all cars are at the home station; and means for starting a second car from the home station in response to a subsequently registered call, provided such call is behind the car previously started from the home station.

15. An elevator system comprising; a plurality of elevator cars; a plurality of landings served by the cars; call registering means for each of said landings; a landing serving as a home station; means for each car responsive to registered calls, when the car is in operation responding to calls, for intercepting the car during its travel in a given direction at the landings for which calls are registered; means for starting a selected car from the home station in response to the first call registered under conditions where all cars are at the home station; and means for starting a car from the home station in response to a registered call, provided such call is behind each car in operation responding to calls.

16. An elevator system comprising; a plurality of elevator cars; a plurality of landings served by the cars; an up call registering means for each of said landings; a down call registering means for each of said landings; a home station for said cars; means for each car responsive to registered calls for causing, when the car is in operation responding to calls, the car to stop during its upward travel at the landings for which up calls are registered and during its downward travel at the landings for which down calls are registered; means responsive to the first call that is registered for starting one of said cars in operation; and means responsive to a registered call for a direction of travel away from the home station and for a landing which said one car has in effect passed or, when said one car is set for travel toward the home station, to a registered call for a direction of travel toward the home station and for a landing which said one car has in effect passed, for starting a car in operation from the home station, said last named means being ineffective to start a car in operation from the home station in response to a registered call for a direction of travel away from the home station and for a landing which said one car has not in effect passed or to a registered call for a direction of travel toward the home station and for a landing which said one car when set for travel toward the home station has not in effect passed.

17. An elevator system comprising; two elevator cars; a plurality of intermediate floors and a lobby floor served by the cars, said lobby floor serving as a home station; an up control for each of said intermediate floors; means for causing one of said cars to operate as a wild car, remaining at a floor at which a stop is made when no control is to be responded to, and for causing the other car to be a home station car; means for each car for causing that car to stop during its upward travel in response to operated up controls at intermediate floors for which such operated up controls are provided; and means responsive, when said wild car is set for upward travel, to the operation of an up control for any of said intermediate floors which said wild car has passed for starting the home station car in operation to assist the wild car, said last named means being ineffective to start the home station car in operation to assist the wild car in response to an up control for any of said intermediate floors which said wild car in its upward travel has not yet passed.

18. An elevator system comprising; two elevator cars; a plurality of intermediate floors and a lobby floor served by the cars, said lobby floor serving as a home station; an up control for each of said intermediate floors; a down control for each of said intermediate floors; means for causing one of said cars to operate as a wild car, remaining at a floor at which a stop is made when no controls are to be responded to, and for causing the other car to be a home station car; means for each car responsive to operated controls for causing that car, when in operation responding to controls, to stop during its upward travel at intermediate floors for which up controls are operated and during its downward travel at intermediate floors for which down controls are operated; means responsive, when both cars are idle, to the first control that is operated for starting the wild car in operation; and means responsive, when the wild car is set for upward travel, to the operation of an up control, provided it is for one of said intermediate floors which said wild car has passed, and, when said wild car is set for downward travel, to the operation of a down control, provided it is for one of said intermediate floors which said wild car has passed, for starting the home station car in operation from the lobby floor.

19. An elevator system comprising: two elevator cars; a plurality of intermediate floors and a lobby floor served by the cars, said lobby floor serving as a home station; an up control at each of said intermediate floors; a down control at each of said intermediate floors; means for causing one of said cars to operate as a wild car, remaining at a floor at which a stop is made when no controls are to be responded to, and for causing the other car to be a home station car; means for each car for causing that car, when in operation responding to controls, to stop during its upward travel in response to up controls at intermediate floors at which such up controls are located and to stop during its downward travel in response to down controls at intermediate floors at which such down controls are located and also in response to an up control at the intermediate floor at which such up control is located, provided no controls at floors below are to be responded to; means responsive, when both cars are idle, to the first control that is operated for starting the wild car in operation; and means for starting the home station car in operation from the lobby floor in response to the operation of an up control for any of said intermediate floors which said wild car has passed, provided it is set for travel in the direction in which it passed such floor, and in response to the operation of a down control for any intermediate floor which said wild car has passed, provided said wild car is set for downward travel and has passed such floor in that direction.

20. An elevator system comprising: two elevator cars; a plurality of intermediate floors and a lobby floor served by the cars, said lobby floor serving as a home station; an up control at each of said intermediate floors; a down control at each of said intermediate floors; a control in each car for each of said intermediate floors; means for causing one of said cars to operate as a wild car, remaining at a floor at which a stop is made when no controls are to be responded to, and the other car to be a home station car; means for each car responsive to operated controls for causing that car, when in operation responding to controls, to stop during its upward travel at intermediate floors for which up controls and controls in that car are operated and during its downward travel at intermediate floors for which down controls and controls in that car are operated; means responsive, when both cars are idle, to the operation of a control at an intermediate floor for starting the wild car in operation; and means for starting the home station car in operation from the lobby floor in response to the operation of a control in the home station car, or in response to the operation of an up control for any of said intermediate floors, provided said wild car is set for upward travel and has passed the floor at which such control is located, or in response to the operation of a down control for any of said intermediate floors, provided said wild car is set for downward travel and has passed such floor.

21. An elevator system comprising; a plurality of elevator cars; a plurality of floors served by the cars, the lobby floor serving as a home station for the cars; an up control for each of the intermediate ones of said floors; a down control for each of the intermediate ones of said floors; means for each car responsive to operated controls for causing that car, when in operation responding to controls, to stop during its upward travel at floors for which up controls are operated and during its downward travel at floors for which down controls are operated and at a floor for which an up control is operated, provided no control for a floor below is operated; and means responsive to an operated up control for any intermediate floor, provided each car in operation responding to controls has its direction of travel set and has in effect passed such floor in the direction in which it is set for travel, for starting a car in operation from the home station.

22. An elevator system comprising; a plurality of elevator cars; a plurality of floors served by the cars, the lobby floor serving as a home station for the cars; an up control for each of the intermediate ones of said floors; a down control for each of the intermediate ones of said floors; means for each car responsive to operated controls for causing that car, when in operation responding to controls, to stop during its upward travel at floors for which up controls are operated and during its downward travel at floors for which down controls are operated; and means responsive, when each car in operation responding to controls is set for downward travel, to an operated down control for any intermediate floor which such car has in effect passed for starting a car in operation from the home station, said last named means being ineffective to start a car in operation from the home station when such down control is for an intermediate floor which has not in effect been passed by all of such cars.

23. An elevator system comprising; a plurality of elevator cars; a plurality of floors served by the cars, the lobby floor serving as a home station for the cars; an up control for each of the intermediate ones of said floors; a down control for each of said intermediate floors; means for each car for causing that car, when it is in operation responding to said controls, to stop during its travel in either direction in response to operated controls for the direction in which it is travelling at floors for which such controls are provided; means for causing a car, under conditions where it is the only car in operation and no control remains to be responded to after it makes a stop at a floor, to remain at the floor at which such stop is made; and means responsive to the first control that is operated after that car makes such a stop for causing that car to restart in operation and thereafter responsive to the operation of an up control for any of said intermediate floors which that car has passed in its upward travel, or to the operation of a down control for any of said intermediate floors which that car has passed in its downward travel, for causing a car to start in operation from the home station, said last named means being ineffective to cause a car to start in operation from the home station when said up control is for an intermediate floor which said car in operation has not passed in its upward travel or when said down control is for an intermediate floor which said car in operation has not passed in its downward travel.

24. An elevator system comprising; a plurality of elevator cars; a plurality of landings served by the cars; an up control at each of said landings; a down control at each of said landings;

an additional landing serving as a home station; means responsive to operated controls for causing any car, which is in operation responding to controls, to stop during its upward travel at the landings at which up controls are located and during its downward travel at the landings at which down controls are located; means for selecting a car at the home station; and additional means operable, under conditions in which a car is idle at the home station and has been selected by said selecting means, in which at least one other car is in operation responding to controls, and in which a control is operated for a direction of travel away from the home station at any landing which all said other cars in operation have in effect passed, regardless of the number of said other cars in operation, to start said selected car from the home station in response to such control toward the landing at which such control is located, said additional means being ineffective to start said selected car when at least one of said cars in operation is set for travel away from the home station and has not in effect reached the landing at which such control is located.

25. An elevator system comprising; a plurality of elevator cars; a plurality of landings served by the cars; an up control at each of said landings; a down control at each of said landings; an additional landing serving as a home station; means responsive to operated controls for causing any car, which is in operation responding to controls, to stop during its upward travel at the landings at which up controls are located and during its downward travel at the landings at which down controls are located; means for selecting a car at the home station; and additional means operable, under conditions in which a car is idle at the home station and has been selected by said selecting means, in which at least one other car is in operation responding to controls, in which all of such cars in operation are set for travel toward the home station, and in which a control is operated for a direction of travel toward the home station at any landing which all said other cars in operation have in effect passed, regardless of the number of said other cars in operation, to start said selected car from the home station in response to such control toward the landing at which such control is located, said additional means being ineffective to start said selected car when any of such cars in operation set for travel toward the home station has not in effect reached the landing at which such control is located.

26. An elevator system comprising; a plurality of elevator cars; a plurality of landings served by the cars; actuating and stopping mechanism for each car; a plurality of up hall push buttons, one at each of said landings; a plurality of down hall push buttons, one at each of said landings; a plurality of push buttons in each car, one for each of said landings; an additional landing serving as a home station for said cars; stop controlling means for each car for causing operation of said mechanism for that car, during travel of the car in either direction, to stop the car in response to operated car buttons in the car at the landings for which such buttons are provided and, when the car is in operation responding to push buttons, to stop the car in response to operated hall buttons for the direction in which the car is travelling at the landings at which such buttons are located and, provided no hall button or car button in that car for a landing beyond remains to be responded to, in response to an operated hall button for the opposite direction of car travel at the landing at which such hall button is located; means for each car for causing that car, under conditions where it is the only car in operation and no hall button or car button in that car is to be responded to upon the expiration of a predetermined time interval after a stop is made at a landing, to remain at the landing at which such stop is made; means for selecting a car at the home station for response to hall buttons; and start controlling means for each car for causing operation of said mechanism for that car, under conditions where all cars are idle at the home station and that car has been selected by said selecting means or under conditions where that car is idle at one of said landings other than the home station and the other cars are idle at the home station, to start the car in response to the first hall button that is operated toward the landing at which such button is located, for causing operation of said mechanism for that car, under conditions where that car is idle at any of said landings including the home station, to start the car in response to the first of its car buttons that is operated toward the landing for which such button is provided, and for causing operation of said mechanism for that car, under conditions where that car is idle at the home station and has been selected by said selecting means and one or more other cars are in operation responding to push buttons, to start the car in response to the operation of a hall button for a direction of travel away from the home station, provided each of said other cars in operation has in effect passed the landing at which the button is located in its travel in the direction in which such other car is then set for travel or in response to the operation of a hall button for a direction of travel toward the home station, provided each of said other cars in operation is set for travel in a direction toward the home station and has in effect passed the landing at which such button is located, toward the landing at which such button is located.

27. An elevator system comprising; a plurality of elevator cars; a plurality of landings served by the cars; call registering means for each of said landings; means for causing the calls that are registered to be answered by said cars; means for causing one or more cars to be in operation answering calls, determined by the calls that are registered; means for causing all but one car to return to a predetermined one of said landings when all calls are responded to; and means controlled by said calls for determining the cars which are returned.

28. An elevator system comprising; a plurality of elevator cars; a plurality of landings served by the cars; call registering means for each of said landings; a home station; means for causing the calls that are registered to be answered by said cars; means for causing one or more cars to be in operation answering calls, determined by the calls that are registered; means for causing all but one of said cars to be returned to the home station when all calls are responded to and for causing said one car to remain at the landing at which its last stop is made; and means controlled by said calls for determining which of the cars is not returned to the home station.

29. A control system for two or more elevator cars operating as a group in which a plurality of landings are served by the cars and in which one of said landings serves as a home station comprising; call registering means for each of said landings; means controlled by the calls that are registered for determining the number of cars in operation answering calls; means operable when more than one car is in operation responding to calls for causing all but one of them to start on a return to the home station under certain conditions of operation; and means controlled by the calls which remain to be responded to for determining which of the cars are started on such return.

30. An elevator system comprising; two elevator cars; a plurality of landings served by the cars; call registering means for each of said landings; a home station; means for causing the calls that are registered to be answered by said cars; means controlled by the calls that are registered for determining whether one or both cars are to be in operation answering calls; means operable when both cars are in operation answering calls for causing one of them to be returned to the home station when all calls are responded to; and means controlled by said calls for determining which car is returned.

31. An elevator system comprising; a plurality of elevator cars; a plurality of landings served by the cars; a plurality of up controls, one for each of said landings; a plurality of down controls, one for each of said landings; an additional landing serving as a home station for said cars; means for each car for causing that car, during its travel in either direction responding to said controls, to stop in response to operated controls for the direction in which the car is travelling at the landings for which such controls are provided; means for causing one or more of said cars to be in operation responding to controls, determined by the controls that are operated; means operable, under conditions where more than one car is in operation responding to controls, to cause all but one of such cars to automatically start on a return to the home station when no more controls are to be responded to; and means controlled by the controls operated for selecting a car for return to the home station.

32. An elevator system comprising; a plurality of elevator cars; a plurality of floors served by the cars; an up control for each of said floors; a down control for each of said floors; a floor serving as a home station for the cars; means for causing each car, when in operation responding to controls, to stop in response to operated controls for the direction in which it is travelling at floors for which such controls are provided; means automatically operable to cause any car, upon making a stop at a floor in either direction under conditions where no control for a floor beyond remains to be responded to, to start on a return to the home station; and means for preventing operation of said home station return means to start a car on its return to the home station under such conditions when that car is the only one in operation.

33. An elevator system comprising; two elevator cars; a plurality of landings served by the cars; a plurality of up controls, one for each of said landings; a plurality of down controls, one for each of said landings; an additional landing serving as a home station for said cars; starting means for each car controlled by said controls; means for causing a car, when responding to controls, to stop in response to operated controls for the direction in which it is travelling at landings for which such controls are provided; means for each car for maintaining it set for travel in the same direction as it approached a landing at which a stop is made, so long as a control for a landing beyond remains to be responded to; home station return controlling means operable under conditions where both cars are in operation responding to controls for automatically causing one of the cars, upon making a stop at a landing in either direction in which its direction of travel is not maintained set, to start on a return to the home station after the stop is made; and means for preventing operation of said home station return controlling means to cause the car to start on its return to the home station when a control is to be responded to for the direction in which said other car is set for travel and for a landing which said other car has passed in its travel in that direction and for causing the car instead to start toward the landing for which such control is provided.

34. An elevator system comprising; two elevator cars; a plurality of landings served by the cars; a plurality of up controls, one for each of said landings; a plurality of down controls, one for each of said landings; an additional landing serving as a home station for said cars; means for causing a car, when responding to controls, to stop in response to operated controls for the direction in which it is traveling at landings for which such controls are provided and, provided no control for a landing beyond remains to be responded to, in response to an operated control for the opposite direction of car travel at the landing for which such control is provided; means responsive to controls that are operated for causing each car to restart in the same direction as it approached the landing at which the stop is made, so long as a control for a landing beyond remains to be responded to to maintain the car set for travel in that direction; home station return controlling means operable under conditions where both cars are in operation responding to controls for automatically causing one of them, after making a stop in which its direction of travel is not maintained set, to start from the landing at which such stop is made on a return to the home station; and means for preventing operation of said home station return controlling means to cause a car to start on its return to the home station when a control is to be responded to for a direction of travel away from the home station and for a landing which the other car has passed in its travel in the direction in which it is set or when said other car is set for travel toward the home station and a control for a direction of travel toward the home station for a landing which said other car has passed is to be responded to, and for causing the car instead to start toward the landing for which such control is provided.

35. An elevator system comprising; a plurality of elevator cars; a plurality of floors served by the cars; an up control for each of said floors; a down control for each of said floors; a lobby floor serving as the home station for said cars; means for causing each car, when it is responding to controls, to stop in response to operated controls for the direction in which it is travelling at floors for which such controls are provided and, after each of said stops, to restart in response to controls for floors beyond the one at which the stop is made in the same direction as it approached the floor at which the stop is made, so long as a control for a floor beyond remains to be responded to at the time such stop is made to maintain the car set for travel in that direction; home station return controlling means automatically operable to cause each car, after making a stop at a floor in either direction under conditions where its direction of travel is not maintained set, to start on a return to the home station; and means for preventing operation of said home station return controlling means to start on its return to the home station after making a stop under conditions where its direction of travel is not maintained set the car remaining in operation after the last of the other cars has been automatically started on its return to the home station.

36. An elevator system comprising; a plurality of elevator cars; a plurality of landings served by the cars; a plurality of up controls, one at each of said landings; a plurality of down controls, one at each of said landings; a home station for said cars; starting means for each car controlled by said controls; means for causing each car, when it is responding to controls, to stop in response to operated controls for the direction in which it is travelling at landings at which such controls are located and, provided no control at a landing beyond remains to be responded to, in response to an operated control for the opposite direction of car travel at the landing at which such control is located; means for maintaining each car set for travel in the same direction as it approached a landing at which a stop is made, so long as a control at a landing beyond remains to be responded to; home station return controlling means automatically operable to cause a car which makes a stop at a landing in either direction under conditions where its direction of travel is not maintained set, to be started by its starting means on a return to the home station; and means for preventing operation of said home station return controlling means to start a car on a return to the home station under conditions where such car is the only one in operation responding to controls, and for causing such car instead to remain at the landing at which a stop is made after all controls have been responded to.

37. An elevator system comprising; a plurality of elevator cars; a plurality of landings served by the cars; a plurality of up controls, one at each of said landings; a plurality of down controls, one at each of said landings; a home station for said cars; means for causing each car, when in operation responding to controls, to stop in response to operated controls for the direction in which it is travelling at landings at which such controls are located and, provided no control at a landing beyond remains to be responded to, in response to an operated control for the opposite direction of car travel at the landing at which such control is located; means responsive to controls that are operated for causing each car in operation responding to controls to restart after each stop in the same direction as it approached the landing at which the stop is made, so long as its direction of travel is maintained set by a control at a landing beyond remaining to be responded to; home station return controlling means for automatically causing a car which makes a stop at a landing in either direction under conditions where its direction of travel is not maintained set, to start on a return to the home station upon the expiration of a predetermined time interval after the stop is made, provided that at the expiration of said time interval another car is in operation responding to controls; and means for causing a car to remain at the landing at which a stop is made when no controls remain to be responded to, under conditions where that car is the only one in operation responding to controls.

38. An elevator system comprising; a plurality of elevator cars; a plurality of landings served by the cars; actuating and stopping mechanism for each car; a plurality of up controls, one at each of said landings; a plurality of down controls, one at each of said landings; a home station for said cars; stop controlling means for causing operation of said mechanism for a car in operation responding to controls, to stop the car in response to operated controls for the direction in which the car is travelling at landings at which such controls are located and, provided no control at a landing beyond remains to be responded to, in response to an operated control for the opposite direction of car travel at the landing at which such control is located; start controlling means responsive to controls that are operated for causing said mechanism for a car in operation responding to controls to restart the car after each stop in the same direction as the car approached the landing at which the stop is made, so long as a control at a landing beyond remains to be responded to at the time such stop is made to maintain the car set for travel in that direction; home station return controlling means automatically operable to cause said mechanism for a car which makes a stop at a landing in either direction, to start the car on a return to the home station upon the expiration of a predetermined time interval after the stop is made, provided that another car is in operation responding to controls at the time the time interval expires and that the maintenance of the direction of travel of the car is discontinued as the stop is made or, if the direction of travel be maintained set due to a control remaining to be responded to, another car responds to such control before said start controlling means causes the car to be restarted by its actuating and stopping mechanism in response to such control; and means for causing a car to remain at the landing at which a stop is made when no controls are to be responded to at the expiration of said predetermined time interval, under conditions where that car is the only one in operation responding to controls.

39. An elevator system comprising; a plurality of cars; a plurality of landings served by the cars; actuating and stopping mechanism for each car; a plurality of up hall push buttons, one at each of said landings; a plurality of down hall push buttons, one at each of said landings; a landing serving as a home station for said cars; stop controlling means for causing a car in operation responding to push buttons to be stopped by its actuating and stopping mechanism in response to operated hall buttons for the direction in which the car is travelling at landings at which such buttons are located and, provided no hall button for a landing beyond remains to be responded to, in response to an operated hall button for the opposite direction of car travel at the landing at which such hall button is located; start controlling means responsive to hall buttons that are operated for causing said mechanism for a car in operation responding to push buttons to restart the car after each stop in the same direction as the car approached the landing at which the stop is made, so long as a hall button for a landing beyond remains to be responded to at the time such stop is made to maintain the car set for travel in that direction; home station return controlling means for automatically causing said mechanism for a car which makes a stop at a landing in either direction, to start the car on a return to the home station upon the expiration of a predetermined time interval after the stop is made, provided that another car is in operation responding to push buttons and that no hall button for a landing beyond is to be responded to when the stop is made so that the direction of travel of the car is not maintained set or, if the direction of travel be maintained set due to a hall button remaining to be responded to, another car responds to such hall button before that car is started by its mechanism in response to such hall button; and means for causing operation of said mechanism for a car, under conditions where that car is the only one in operation responding to push buttons and makes a stop in either direction under the further conditions that its direction of travel is not maintained set but a hall button at a landing in a direction from the landing at which such stop is made opposite to that in which the car arrived at such landing is to be responded to, to start the car in response to such hall button upon the expiration of said time interval toward the landing at which the button is located, but if no hall button is to be responded to upon the expiration of said predetermined time interval after such stop is made at a landing, for causing the car to remain at the landing at which such stop is made.

40. An elevator system comprising; a plurality of elevator cars; a plurality of landings served by the cars; actuating and stopping mechanism for each car; a plurality of up hall push buttons, one at each of said landings; a plurality of down hall push buttons, one at each of said landings; a plurality of push buttons in each car, one for each of said landings; an additional landing serving as a home station for said cars; stop controlling means for causing each car, during its travel in either direction, to be stopped by its actuating and stopping mechanism in response to operated car buttons in the car at the landings for which such buttons are provided and, when the car is in operation responding to push buttons, to be stopped by its actuating and stopping mechanism in response to operated hall buttons for the direction in which the car is travelling at the landings at which such buttons are located and, provided no hall button or car button in that car for a landing beyond remains to be responded to, in response to an operated hall button for the opposite direction of car travel at the landing at which such hall button is located; start controlling means responsive to push buttons that are operated for causing said mechanism for a car in operation responding to push buttons to restart the car after each stop in the same direction as the car approached the landing at which the stop is made, so long as a hall button or a car button in that car for a landing beyond remains to be responded to at the time such stop is made to maintain the car set for travel in that direction; home station return controlling means for automatically causing said mechanism for a car which makes a stop at a landing in either direction, to start the car on a return to the home station upon the expiration of a predetermined time interval after the stop is made, provided that another car is in operative responding to push buttons and that no hall button or car button in the car for a landing beyond is to be responded to when the stop is made so that the direction of travel of the car is not maintained set or, if the direction of travel be maintained set due to a hall button remaining to be responded to, such hall button is responded to by another car before that car is started by its mechanism in response to such hall button; means for preventing operation of said home station return controlling means to cause a car to be started by its mechanism on a return to the home station under such conditions when a car button in the car for a landing other than the one at which such stop is made is operated before the expiration of said time interval after the stop is made and for causing the car instead to be started by its mechanism toward the landing for which the car button is provided; and means for causing said mechanism for a car, which is the only one in operation responding to push buttons and makes a stop in either direction under the conditions that its direction of travel is not maintained set and no car button in the car is operated before the expiration of said predetermined time interval after the stop is made but a hall button at a landing in a direction from the landing at which such stop is made opposite to that in which the car arrived at such landing is to be responded to, to start the car in response to such hall button upon the expiration of said time interval toward the landing at which the button is located, but if no hall button or car button in that car is to be responded to upon the expiration of said predetermined time interval after such stop is made at a landing, for causing the car to remain at the landing at which such stop is made.

41. An elevator system comprising; a plurality of elevator cars; a plurality of landings served by the cars; actuating and stopping mechanism for each car; a plurality of up hall push buttons, one at each of said landings; a plurality of down hall push buttons, one at each of said landings; a plurality of push buttons in each car, one for each of said landings; a landing serving as a home station for said cars; stop controlling means for causing each car, during its travel in either direction, to be stopped by its actuating and stopping mechanism in response to operated car buttons in the car at the landings for which such buttons are provided and, when the car is in operation responding to push buttons, to be stopped by its actuating and stopping mechanism in response to operated hall buttons for the direction in which the car is travelling at the landings at which such buttons are located and, provided no hall button or car button in that car for a landing beyond remains to be responded to, in response to an operated hall button for the opposite direction of car travel at the landing at which such hall button is located; start controlling means responsive to push buttons that are operated for causing said mechanism for a car in operation responding to push buttons to restart the car after each stop in the same direction as the car approached the landing at which the stop is made, so long as a hall button or car button in that car for a landing beyond remains to be responded to at the time such stop is made to maintain the car set for travel in that direction; home station return controlling means for automatically causing said mechanism for a car which makes a stop at a landing in either direction, to start the car on a return to the home station upon the expiration of a predetermined time interval after the stop is made, provided that another car is in operation responding to push buttons, that no hall button or car button in that car for a landing beyond is to be responded to when the stop is made so that the direction of travel of the car is not maintained set or, if the direction of travel be maintained set due to a hall button remaining to be responded to, such hall button is responded to by another car before that car is started by its mechanism in response to such hall button, and that no car button in that car is operated before the expiration of such time interval; means for preventing said mechanism for a car on its automatic return to the home station stopping the car on such return at any landing in response to the hall button at that landing for the opposite direction of travel but for causing said mechanism to stop the car on such return in response to a hall button for the direction in which the car is travelling at the landing at which the button is located; and means for causing operation of said mechanism for a car, under conditions where all other cars are at or being returned to the home station and that car makes a stop in either direction under the further conditions that its direction of travel is not maintained set by a hall button or car button in that car and no car button in that car is operated before the expiration of said predetermined time interval after the stop is made but a hall button at a landing in a direction from the landing at which such stop is made opposite to that in which the car arrived at such landing is to be responded to, to start the car in response to such hall button upon the expiration of said time interval toward the landing at which the button is located, but if no hall button or car button in that car is to be responded to upon the expiration of said predetermined time interval after such stop is made for causing the car to remain at the landing at which such stop is made.

42. An elevator system comprising; a plurality of elevator cars; a plurality of landings served by the cars; call registering means for each of said landings; a home station; means for causing one of said cars to respond to the calls that are registered and the other cars to remain at the home station so long as certain call combinations exist; means for causing a car to start in operation from the home station to assist said one car when certain other call combinations exist; and means for causing all but one of the cars to return to the home station when all calls are responded to, the car which is not returned being determined by the calls which were registered.

43. A control system for an installation of two or more elevator cars in which a plurality of landings are served by the cars and in which a home station is provided for the cars, comprising; call registering means for each of said landings; means for causing each of the cars but one to be a home station car and said one car to operate as a wild car; means for causing the wild car to respond to all calls that are registered, so long as it is the only car in operation answering calls; means responsive to a registered call behind the wild car for causing a car to start in operation from the home station to assist the wild car in answering calls; means operable when more than one car is in operation responding to calls for causing all but one of them to be automatically started on a return to the home station under certain conditions; and means controlled by the calls for selecting a car for return to the home station and for determining when it is to be automatically started on such return.

44. A control system for two or more elevator cars serving a plurality of landings and a home station, comprising; call registering means for each of said landings; means for causing each of the cars but one to be a home station car and said one car to operate as a wild car; means for causing the wild car to respond to all calls that are registered, so long as it is the only car in operation answering calls; means responsive to a registered call behind the wild car for causing a car to start in operation from the home station to assist the wild car in answering calls; and means operable when more than one car is in operation responding to calls for causing the first of such cars to make a stop at a landing under conditions where no call for a landing beyond remains to be responded to and no call is in registration which is behind all of the other cars in operation responding to calls to be automatically started on a return to the home station.

45. An elevator system comprising; two elevator cars; a plurality of landings served by the cars; an up control for each of said landings; a down control for each of said landings; a home station; means for causing one of the cars to be a home station car and the other car to operate as a wild car; means for causing a car, when in operation responding to controls, to stop in response to operated controls for the direction in which it is travelling at landings for which such controls are provided; means responsive to the first control that is operated for starting the wild car in operation; means responsive to an operated control for the direction in which the wild car is set to travel and for a landing which the wild car has passed for starting the home station car in operation to assist the wild car; and home station return controlling means operable when both cars are in operation to cause the first of them to make a stop at a landing under conditions where no control for a landing beyond remains to be responded to and no control is to be responded to for the direction in which the other car is set for travel and for a landing which said other car has passed to start on a return to the home station after such stop is made.

46. A control system for two or more elevator cars in an installation in which a plurality of intermediate landings and a lobby are served by the cars and in which the lobby serves as a home station for the cars, comprising; an up control for each of said landings; a down control for each of said landings; means for causing each of the cars but one to be a home station car and said one car to operate as a wild car; means for causing a car, when in operation responding to controls, to stop in response to operated controls for the direction in which it is travelling at landings for which such controls are provided and, provided no control for a landing beyond is to be responded to, in response to an operated control for the opposite direction at the landing for which such control is provided; means responsive to the first control that is operated for starting the wild car toward the landing for which such control is provided; means responsive, when the wild car is set for upward travel, to an operated up control for a landing which the wild car has passed and, when the wild car is set for downward travel, to an operated up control or an operated down control for a landing which the wild car has passed for starting a car in operation from the home station to assist the wild car; means for preventing starting a car in operation from the home station to assist the wild car in response to said up control when the wild car is set for upward travel and has not passed the landing for which the up control is provided or in response to said up control or said down control when the wild car is set for downward travel and has not passed the landing for which such control is provided; means for causing each car in operation responding to controls to restart after each stop in the same direction as it approached the landing at which the stop is made, so long as a control for a landing beyond remains to be responded to; and home station return controlling means operable when more than one car is in operation to cause one of them to start on a return to the home station when it makes a stop at a landing under conditions where no up control or down control for a landing beyond remains to be responded to.

47. An elevator system comprising; two elevator cars; a plurality of landings served by the cars; call registering means for each of said landings; a home station; means for causing the calls that are registered to be answered by said cars; means controlled by the calls that are registered for determining whether one or both cars are to be in operation answering calls; means operable when both cars are in operation answering calls for causing one of them to be returned to the home station when all calls are responded to; and means for interrupting the return of a car to the home station in response to a registered call behind the other car, regardless of the position of said one car with respect to the landing for which such call is registered.

48. An elevator system comprising; two elevator cars; a plurality of landings served by the cars; call registering means for each of said landings; a landing serving as a home station for said cars; means responsive to registered calls for causing a car, when it is responding to calls, to stop at landings for which calls are registered; means operable under conditions where both cars are in operation responding to calls for automatically causing a car to start on a return to the home station after it makes a stop under conditions where no call for a landing beyond remains to be responded to and no call is to be responded to which is behind the other car; and means responsive to a registered call behind the other car for causing the car being returned to the home station to stop on its return at the landing for which such call is registered, provided the landing is ahead of the car and, if the landing is in the opposite direction from the car being returned to the home station, for causing the car to stop at the next landing reached during its return and start in the opposite direction to respond to such call.

49. An elevator system comprising; two elevator cars; a plurality of landings served by the cars; call registering means for each of said landings; a landing serving as a home station for said cars; means responsive to registered calls for causing a car, when it is responding to calls, to stop at landings for which calls are registered; means operable under conditions where both cars are in operation responding to calls for automatically causing a car to start on a return to the home station after it makes a stop under conditions where no call for a landing beyond remains to be responded to and no call is to be responded to which is behind the other car; and means responsive to a registered call behind the other car for a landing behind the car being returned to the home station for causing the car being returned to stop at the next landing reached during its return and start in the opposite direction to respond to such call.

50. An elevator system comprising; two elevator cars; a plurality of landings served by the cars; a plurality of up call registering means, one for each of said landings; a plurality of down call registering means, one for each of said landings; an additional landing serving as a home station for said cars; means for causing said cars to respond to calls that are registered; means operable, under conditions where both cars are in operation responding to calls, to cause one of the cars to automatically start on a return to the home station when no more controls are to be responded to; and means responsive to the registration of a call behind the other car for a landing which is in a direction toward the home station from the car being automatically returned to the home station for causing the car being returned to stop during its return at the landing for which the call is registered and responsive to the registration of a call behind the other car for a landing which is in a direction from said car being returned to the home station away from the home station for causing the car being returned to stop at the next landing reached during its return and start in the opposite direction to respond to such call.

51. An elevator system comprising; two elevator cars; a plurality of landings served by the cars; a plurality of up controls, one for each of said landings; a plurality of down controls, one for each of said landings; a home station for said cars; means responsive to the controls that are operated for controlling the starting of the cars; means for causing a car, when in operation responding to said controls, to stop during its travel in either direction in response to operated controls for the direction in which the car is travelling at the landings for which such controls are provided; means operable, under conditions where both cars are in operation responding to controls, to cause one of them to automatically start on a return to the home station when no more controls are to be responded to; and means responsive to the operation of a control for a direction of travel away from the home station and for a landing which the other car has passed in the direction in which it is then set, for causing the car which is being automatically returned to the home station to stop at the landing for which the control is provided when such landing is in a direction from such car toward the home station and, if it be for a landing in the opposite direction from the car, for causing the car to stop at the next landing toward the home station and start in the opposite direction to respond to such control.

52. An elevator system comprising; two elevator cars; a plurality of landings served by the cars; a plurality of up controls, one for each of said landings; a plurality of down controls, one for each of said landings; a home station for said cars; means responsive to the controls that are operated for controlling the starting of the cars; means for causing a car, when in operation responding to said controls, to stop during its travel in either direction in response to operated controls for the direction in which the car is travelling at the landings for which such controls are provided; home station return controlling means operable, under conditions where both cars are in operation responding to controls, to cause one of them to automatically start on a return to the home station when no more controls are to be responded to; and means responsive, when one car has been started on a return to the home station by said home station return controlling means and the other car is set for travel toward the home station, to the operation of a control for a direction of travel toward the home station for a landing behind both cars for causing the car being returned to stop at the next landing reached and to start in the opposite direction to respond to such control.

53. An elevator system comprising; two elevator cars; a plurality of landings served by the cars; a plurality of up controls, one for each of said landings; a plurality of down controls, one for each of said landings; an additional landing serving as a home station for said cars; means responsive to the controls that are operated for controlling the starting of the cars; means for causing a car, when in operation responding to said controls, to stop during its travel in either direction in response to operated controls for the direction in which the car is travelling at the landings for which such controls are provided; means operable, under conditions where both cars are in operation responding to controls, to cause one of them to automatically start on a return to the home station when no more controls are to be responded to; and means responsive, when one car is being returned to the home station, to the operation of a control for a direction of travel toward the home station and for a landing between the home station and the car being returned to the home station for causing the car being returned to stop at that landing and responsive, when one car is being returned to the home station and the other car is set for travel toward the home station, to the operation of a control for a direction of travel toward the home station for a landing behind both cars for causing the car being returned to stop at the next landing reached and to start in the opposite direction to respond to such control.

54. An elevator system comprising; two elevator cars; a plurality of intermediate landings and a lobby served by the cars, said lobby serving as a home station; a plurality of up controls, one at each of said landings; a plurality of down controls, one at each of said landings; means for causing said cars to respond to controls that are operated; means operable under conditions where both cars in operation responding to controls, to cause a car to automatically start on a return to the home station after it makes a stop at a landing under conditions where no control at a landing beyond remains to be responded to and no control is to be responded to for the direction in which the other car is set for travel and at a landing which said other car has passed in its travel in that direction; and means responsive to the operation of an up control at a landing which such other car has passed for causing the car being returned to the home station to stop during its return at the landing at which the control is located, provided such landing is below the car being returned and no control at a landing below such landing is to be responded to, and, if such landing is above the car, for causing the car to stop at the next landing reached and start in the up direction to respond to such control and responsive, when the other car is set for travel in the down direction, to the operation of a down control for a landing which such other car has passed and which is above the car being returned to the home station for causing the car being returned to stop at the next landing reached and start in the up direction to respond to such control.

55. An elevator system comprising; two elevator cars; a plurality of landings served by the cars, one of said landings being a home station; means for each of said landings for registering a call for travel away from the home station; means for causing said cars to respond to calls that are registered; means operable, under conditions where both cars are in operation responding to controls, to cause one of the cars to automatically start on a return to the home station when no more calls are to be responded to; and means for causing the car which is being automatically returned to the home station to stop in response to a call behind the other car at the landing for which such call is registered, provided no call is to be responded to for a landing beyond.

56. An elevator system comprising; two elevator cars; a plurality of landings served by the cars; a plurality of up call registering means, one for each of said landings; a plurality of down call registering means, one for each of said landings; a home station for said cars; call registering means for said home station; means for causing said cars to respond to calls that are registered; means operable, under conditions where both cars are in operation responding to controls, to cause one of them to automatically start on a return to the home station when no more controls are to be responded to; and means for causing the car which is being automatically returned to the home station to stop at a landing in response to a call registered for that landing for travel toward the home station, and in response to a call registered for a landing for travel away from the home station provided such call is behind the other car and no call is to be responded to for a landing beyond but for preventing such car stopping in response to such call for travel away from the home station when the call is ahead of such other car.

57. An elevator system comprising; two elevator cars; a plurality of landings served by the cars; a plurality of up controls, one for each of said landings; a plurality of down controls, one for each of said landings; a home station for said cars; means responsive to the controls that are operated for controlling the starting of the cars; means for each car for causing that car, when the car is in operation responding to said controls, to stop during its travel in either direction in response to operated controls for the direction in which the car is travelling at the landings for which such controls are provided; means operable, under conditions where both cars are in operation responding to controls, to cause one of them to automatically start on a return to the home station when no more controls are to be responded to; means for causing the car which is automatically returning to the home station to stop at a landing in response to the control for that landing for travel toward the home station; and means for causing the car which is automatically returning to the home station to stop at a landing in response to the control for that landing for travel away from the home station, provided the other car has passed the landing in the direction in which it is then set for travel and no control for a landing beyond is to be responded to, but for preventing the car stopping in response to such control for travel away from the home station when the other car has not passed the landing in the direction in which it is then set for travel.

58. An elevator system comprising; two elevator cars; a plurality of landings served by the cars, one of said landings serving as a home station; means in each car for each of said landings for registering a call for that landing; means for causing one of the cars to be a home station car and the other car to operate as a wild car; means for causing each car to respond to calls registered within the car; and means for causing the home station car to become the wild car upon the arrival of the other car at the home station in response to a car call.

59. An elevator system comprising; two elevator cars; a plurality of landings served by the cars, one of said landings serving as a home station; means at each of said landings for registering a call for that landing; means in each car for each of said landings for registering a call for that landing; means for causing each of the cars to respond to calls registered within the car; means for causing one of the cars to operate as a wild car, responding to all calls registered from the landings so long as it is the only car in operation responding to calls; means for causing the other car to remain at the home station so long as no call is registered from within that car and no call behind the wild car is registered from a landing; and means for causing the car at the home station to become the wild car upon arrival of the other car at the home station in response to a car call registered from within said other car for the landing serving as the home station.

60. An elevator system comprising; two elevator cars; a plurality of landings served by the cars, one of said landings being a home station; means in each car for each of said landings for registering a call for that landing; means for causing one of the cars to be a home station car and the other car to operate as a wild car; means for causing each car to respond to calls registered within the car; and means responsive to the registration of a call from within the home station car, under conditions where the other car is idle at any of said landings, for causing that car to become the wild car instead of said other car and for causing said other car, if idle at a landing other than the home station, to be returned to the home station to serve as the home station car.

61. An elevator system comprising; two elevator cars; a plurality of landings served by the cars; means at each of said landings for registering a call for that landing; means in each car for each of said landings for registering a call for that landing; a home station for the cars; means in each car for registering a call for the home station; means for causing each of the cars to respond to calls registered within the car; means for causing one of the cars to operate as a wild car, responding to all calls registered from the landings so long as it is the only car in operation responding to calls and to remain at a landing at which a stop is made when no calls remain to be responded to; means for causing the other car to remain at the home station so long as no call is registered from within that car for any of said landings and no call behind the wild car is registered from a landing; and means responsive to the registration of a call from within the home station car for any of said landings, under conditions where the other car is idle at any of said landings, for causing that car to become the wild car instead of said other car and for causing said other car to be returned to the home station to serve as the home station car.

62. An elevator system comprising; two elevator cars; a plurality of landings served by the cars, one of said landings serving as a home station; means at each of said landings for registering a call for that landing; means in each car for each of said landings for registering a call for that landing; means for causing each of the cars to respond to calls registered within the car; means for causing one of the cars to operate as a wild car, responding to all calls registered from the landings so long as it is the only car in operation responding to calls and to remain at a landing at which a stop is made when no calls remain to be responded to; means for causing the other car to remain at the home station so long as no call is registered from within that car for any of said landings and no call behind the wild car is registered from a landing; and means responsive to the registration of a call from within the home station car for any of said landings under conditions where the other car is idle at any of said landings, for causing that car to become the wild car instead of the other car and for causing said other car, if idle at a landing other than the one serving as the home station, to be returned to the home station to serve as the home station car.

63. An elevator system comprising; two elevator cars; a plurality of landings served by the cars, one of said landings serving as a home station; call registering means for each of said landings; means for causing the cars to respond to the calls which are registered; means operable when both cars are in operation responding to calls for causing one of them to automatically return to the home station when no more calls are to be responded to; and means responsive to the return of the other car to the home station in response to the registration of a call for the landing which serves as the home station for causing the car being automatically returned to the home station to stop at the next landing reached.

64. An elevator system comprising; two elevator cars; a plurality of landings served by the cars, one of said landings serving as a home station for both cars; a hall button at the landing serving as the home station; a plurality of up hall buttons, one at each of the other of said landings; a plurality of down hall buttons, one at each of the other of said landings; a plurality of car buttons in each car, one for each of said landings; means for each car responsive to the car buttons in that car that are operated for controlling the starting of the car; means responsive to the hall buttons that are operated for controlling the starting of the cars; means for each car for causing that car, during its travel in either direction responding to buttons, to stop in response to operated hall buttons for the direction in which the car is travelling and to operated car buttons in that car at the landings for which such buttons are provided; means operable, under conditions where both cars are responding to buttons, to cause one of them to automatically start on a return to the home station when no more hall buttons or car buttons in that car are to be responded to; and means for causing the car being automatically returned to the home station to stop at the next landing reached upon the arrival of the other car at the landing serving as the home station in response to the hall button at that landing or to the car button in that car for that landing.

65. An elevator system comprising; a plurality of elevator cars; a plurality of landings served by the cars; call registering means for each of said landings; a home station for the cars; means for causing each of said cars but one to be a home station car and said one car to operate as a wild car, remaining at a landing at which a stop is made when no calls are to be responded to; means for causing the wild car, when idle at a landing, to respond to any call that is registered; and means for causing a car at the home station to start in operation in response to such call in the event that the wild car does not start in operation within a predetermined time interval after the call is registered.

66. An elevator system comprising; a plurality of elevator cars; a plurality of landings served by the cars; call registering means for each of said landings; a home station for the cars; means for causing each of said cars but one to be a home station car and said one car to operate as a wild car, remaining at a landing at which a stop is made when no calls are to be responded to; means for causing the wild car to respond to all calls so long as each of such calls is registered while the car is idle at a landing or, if the car is in operation, it is the only one in operation responding to calls; and means for causing a car at the home station to start in operation in response to the registration of a call in the event that the wild car, if idle at a landing or, if responding to calls, after making a stop at a landing, does not start in operation within a predetermined time interval.

67. An elevator system comprising; a plurality of elevator cars; a plurality of landings served by the cars; call registering means for each of said landings; a home station for the cars; means for causing one or more of the cars to operate as wild cars and the other cars to remain at the home station; and means for causing a car at the home station to start in operation in response to the registration of a call which is ahead of a wild car but, if one or more other cars are operating as wild cars, is behind such cars, in the event that the first mentioned wild car, if stopped at a landing at the time such call is registered or, if running at such time, after making a stop at a landing, does not start in operation within a predetermined time interval.

68. An elevator system comprising; a plurality of elevator cars; a plurality of landings served by the cars; a plurality of up controls, one for each of said landings; a plurality of down controls, one for each of said landings; a home station for said cars; means for each car for causing that car, when in operation responding to controls, to stop during its travel in either direction in response to operated controls for the direction in which the car is travelling at landings for which such controls are provided and, provided no control for a landing beyond remains to be responded to, in response to an operated control for the opposite direction of travel at the landing for which such control is provided; and means operable, under conditions where one car is travelling toward the home station in response to a control and at least one other car is travelling away from the home station in response to a control, to start a car from the home station in response to the operation of a control for travel away from the home station for a landing which is ahead of said car travelling toward the home station but behind each of said cars travelling away from the home station, said last mentioned means being ineffective to start a car away from the home station under such conditions in the event that said control for travel away from the home station is for a landing ahead of a car travelling away from the home station.

69. An elevator system comprising; a plurality of elevator cars; a plurality of landings served by the cars; a plurality of up controls, one for each of said landings; a plurality of down controls, one for each of said landings; a home station for said cars; starting means for each car controlled by said controls; means for causing a car, when responding to controls, to stop in response to operated controls for the direction in which the car is travelling at landings for which such controls are provided; means for maintaining a car set for travel in the same direction as it approaches a landing at which a stop is made, so long as a control for a landing beyond remains to be responded to; home station return controlling means operable under conditions where two or more cars are in operation responding to controls for causing each of such cars but one, upon making a stop at a landing in either direction, in which its direction of travel is not maintained set, to start on a return to the home station after the stop is made; and means for preventing operation of said home station return controlling means to cause a car to start on its return to the home station if, while the car is stopped, a control is operated for a landing in a direction from the car away from the home station provided, in case the control is for travel away from the home station, each of the other cars in operation has passed the landing for which the control is provided in its travel in the direction in which it is then set or, if the control is for travel toward the home station, each of said other cars in operation is set for travel toward the home station and has passed the landing for which the control is provided, and for causing said car instead to start toward the landing for which such control is provided.

70. In a control system for a plurality of cars operable past a plurality of landings, push buttons for each of said landings, means for each car responsive to any of said push buttons for causing the associated car to start, and means responsive to the positions of said cars for preventing the starting of more than one of said cars in response to any push button.

71. A control system for a plurality of elevator cars operable past a floor comprising a control for said floor; starting means for each of said cars disposed to respond to said floor control; selecting mechanism responsive to the positions of said cars; and means controlled by said selecting mechanism for controlling the response of said starting means to said floor control.

72. A control system for a plurality of elevator cars operable past a plurality of floors; a control for each of said floors; starting means for each of said cars disposed to respond to said controls; position controlled mechanism for each of said cars; and means responsive to said position controlled mechanism for determining which of said starting means shall respond to operation of one of said floor controls.

73. A control system for a plurality of elevator cars operable past a floor comprising control means for said floor; car actuating and stopping mechanism for each of said cars disposed to respond to said control means to cause the associated car to start, travel to and stop at said floor; selecting mechanism controlled in accordance with the positions of said cars; and means responsive to said selecting mechanism for determining which of said car actuating and stopping mechanisms shall respond to operation of said floor control means.

74. A control system for a plurality of elevator cars operable past a plurality of floors comprising a control for each of said floors; car actuating and stopping mechanism for each of said cars disposed to respond to operated ones of said controls for causing the respective cars to start, travel to, and stop successively at the corresponding floors in the natural order of such floors, regardless of the order of operation of said controls; zoning mechanism responsive to the relative positions of said cars; and means responsive to said zoning mechanism for controlling the response of said car actuating and stopping mechanism to said floor controls.

75. A control system for a plurality of elevator cars operable past a plurality of floors comprising control means for each of said floors; mechanism effective, in the event more than one of said cars are at one of said floors, to cause one of said more than one cars to start in response to a control for a second one of said floors, and mechanisms rendered effective by the departure from said floor of said one car to cause another of said more than one cars to start in response to a control for a third one of said floors.

76. A control system for a plurality of elevator cars operable past a plurality of floors comprising control means for each of said floors; mechanism effective, in the event more than one of said cars are at one of said floors for starting one of said more than one cars and for preventing the starting of the others of said more than one cars in response to operation of said control means for a second of said floors, said mechanism comprising means effective to thereafter cause the starting of another of said more than one cars upon operation of a control means for a floor which said one car has passed.

77. A control system for a plurality of elevator cars operable past a plurality of floors comprising a control for each of said floors; starting means for each of said cars; and mechanism, effective in the event more than one of said cars are at one of said floors, to render the starting means for one of said cars responsive to a control for another of said floors, said mechanism comprising means rendered effective as said one car recedes from said one floor to render the starting means for another of said cars responsive to controls for floors between said one floor and the position of said one car.

78. A control system for two or more elevator cars operable past a plurality of floors; a control for each of said floors; starting means for each of said cars disposed to respond to said controls; and means, effective in the event two of said cars are at different floors, to render the starting means for one of said cars responsive only to those of said controls corresponding to floors in advance of the position of said one car, and to render the starting means for the other of said two cars responsive only to those of said controls corresponding to floors between the positions of said two cars.

79. A control system for a plurality of elevator cars operable past a plurality of floors comprising control means for each of said floors, starting means for each of said cars disposed to respond to said control means, selecting means for determining which of said starting means shall respond to operation of a control, means comprising direction determining means for determining the direction in which each of said cars is conditioned to start, and means controlled by said direction determining means for controlling said selecting mechanism.

HAROLD WATERS.
ARTHUR WILLARD PAULSON.
MATHEW TROSTER, Jr.